US012658173B2

(12) United States Patent
Su et al.

(10) Patent No.: US 12,658,173 B2
(45) Date of Patent: Jun. 16, 2026

(54) TEXT READING METHOD AND DEVICE

(71) Applicant: HUAWEI TECHNOLOGIES CO., LTD., Shenzhen (CN)

(72) Inventors: Qing Su, Beijing (CN); Feng Sun, Nanjing (CN); Chu Yang, Shenzhen (CN); Lin Cao, Nanjing (CN); Xiaoyue Huo, Shenzhen (CN); Hongfeng Ni, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 271 days.

(21) Appl. No.: 18/556,656

(22) PCT Filed: Mar. 31, 2022

(86) PCT No.: PCT/CN2022/084595
§ 371 (c)(1),
(2) Date: Oct. 20, 2023

(87) PCT Pub. No.: WO2022/222728
PCT Pub. Date: Oct. 27, 2022

(65) Prior Publication Data
US 2024/0194182 A1     Jun. 13, 2024

(30) Foreign Application Priority Data

Apr. 20, 2021    (CN) ......................... 202110425978.2
Apr. 30, 2021    (CN) ......................... 202110485195.3

(51) Int. Cl.
*G10L 13/08*          (2013.01)
*G06F 3/0488*      (2022.01)
*G10L 13/047*      (2013.01)
(52) U.S. Cl.
CPC ............ *G10L 13/08* (2013.01); *G06F 3/0488* (2013.01); *G10L 13/047* (2013.01)

(58) Field of Classification Search
CPC ...... G10L 13/08; G10L 13/047; G06F 3/0488
See application file for complete search history.

(56) References Cited

U.S. PATENT DOCUMENTS

| | | | |
|---|---|---|---|
| 11,320,983 B1 * | 5/2022 | Boyers | ................ G06F 3/04817 |
| 2015/0181050 A1 * | 6/2015 | Nishii | .................. H04N 1/0044 |
| | | | 358/1.15 |
| 2022/0148563 A1 * | 5/2022 | Shirai | ..................... G10L 13/08 |

FOREIGN PATENT DOCUMENTS

| | | |
|---|---|---|
| CN | 101137054 A | 3/2008 |
| CN | 110347309 A | 10/2019 |
| WO | 2020023070 A1 | 1/2020 |

OTHER PUBLICATIONS

Wu Yunbo etal.: "Analysis of the Controlling Model About Subnet Interconnecting Node in Broadband IP" Journal of Southwest China Normal University (Natural Science ), vol. 26 No.2 ,Apr. 2001, with English abstract total 5 pages.

* cited by examiner

*Primary Examiner* — Ibrahim Siddo

(57)     ABSTRACT

An electronic device displays a first user interface; receives a first operation of a user; obtains first content of the first user interface in response to the first operation; displays a second user interface, where content displayed in the second user interface includes a text in the first content, and the second user interface covers a part of a display area of the first user interface; reads a first sentence in the content of the second user interface; and displays marking information of a text that is in the second user interface and that corresponds to the first sentence that is being read. Embodiments of this application are used for text reading.

20 Claims, 49 Drawing Sheets

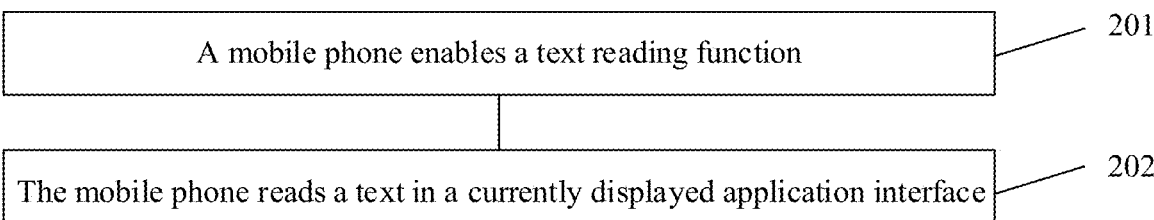

A mobile phone enables a text reading function — 201

The mobile phone reads a text in a currently displayed application interface — 202

FIG. 2

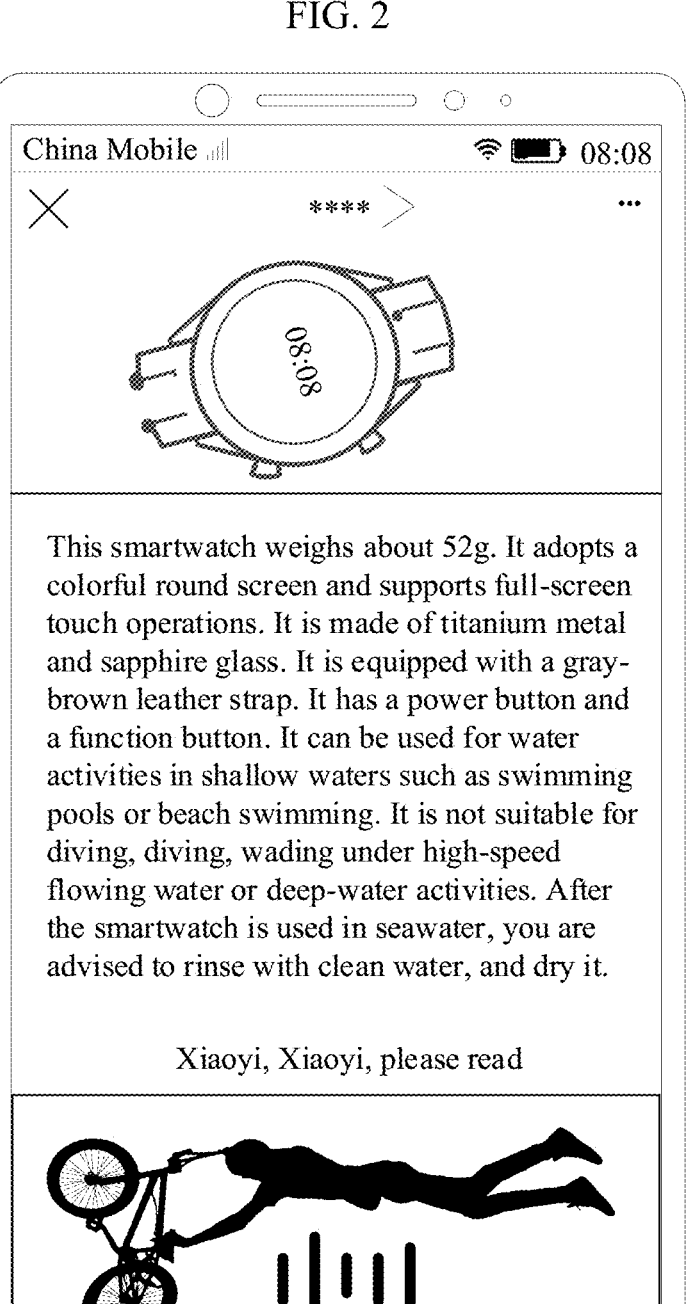

China Mobile 📶                    🛜 🔋 08:08

✕          **** ＞                    •••

This smartwatch weighs about 52g. It adopts a colorful round screen and supports full-screen touch operations. It is made of titanium metal and sapphire glass. It is equipped with a gray-brown leather strap. It has a power button and a function button. It can be used for water activities in shallow waters such as swimming pools or beach swimming. It is not suitable for diving, diving, wading under high-speed flowing water or deep-water activities. After the smartwatch is used in seawater, you are advised to rinse with clean water, and dry it.

Xiaoyi, Xiaoyi, please read

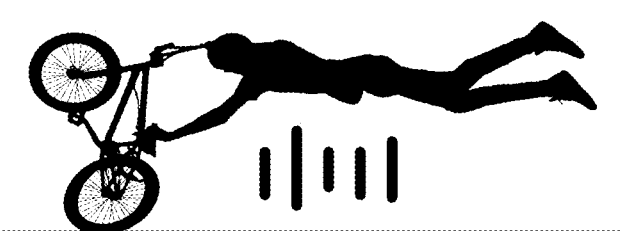

FIG. 3

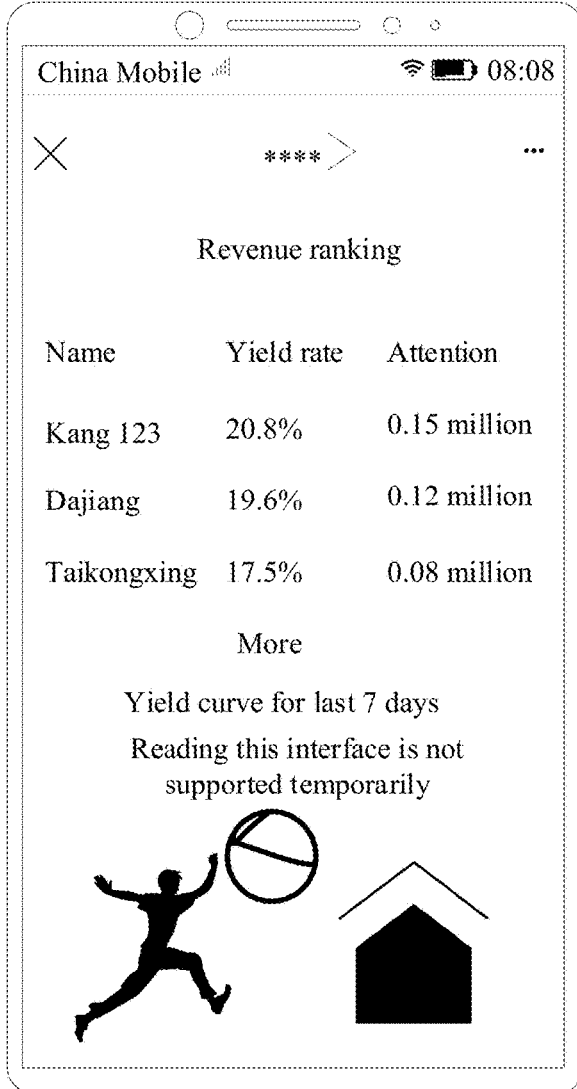
(a)
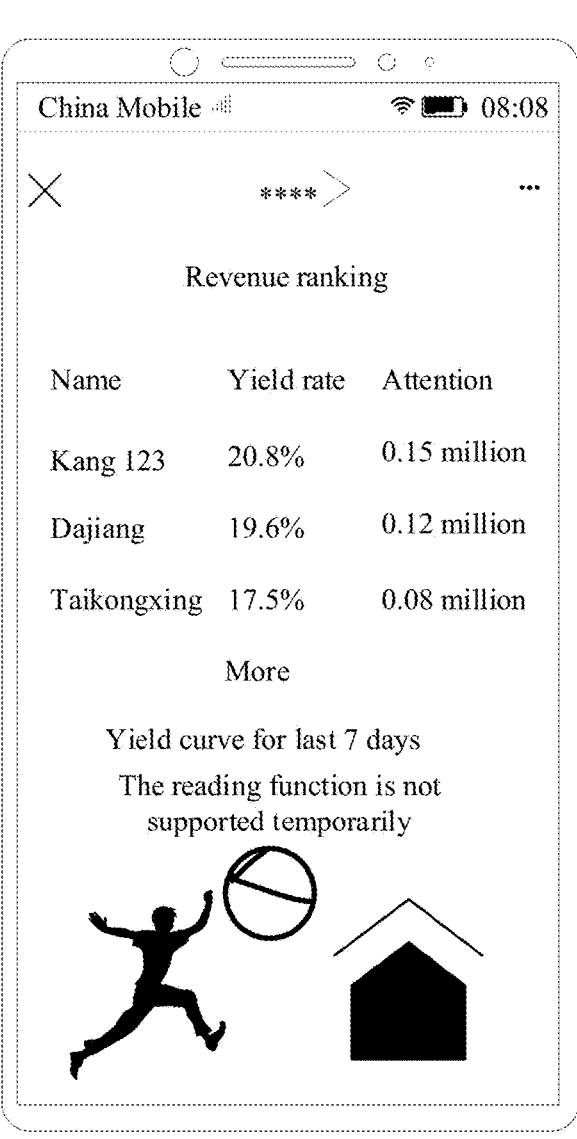
(b)
FIG. 5

CONT.
FROM

TO

CONT.
FROM

CONT.
FROM

China Mobile         08:08

✕      ✱✱✱✱ ❯      •••

08:08

This smartwatch weighs about 52g. It adopts a colorful round screen and supports full-screen touch operations. It is made of titanium metal and sapphire glass. It is equipped with a gray-brown leather strap. It has a power button and a ⊖ Reading paused        ⊗ operations.

It is made of titanium metal and sapphire glass.

It is equipped with a gray-brown leather strap.
It has a power button and a function button.
It can be used for water activities in shallow waters such as swimming pools or beach swimming.

CONT.
FROM

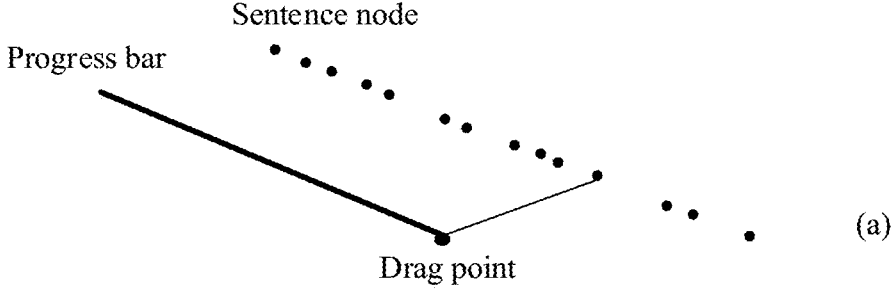
(a)
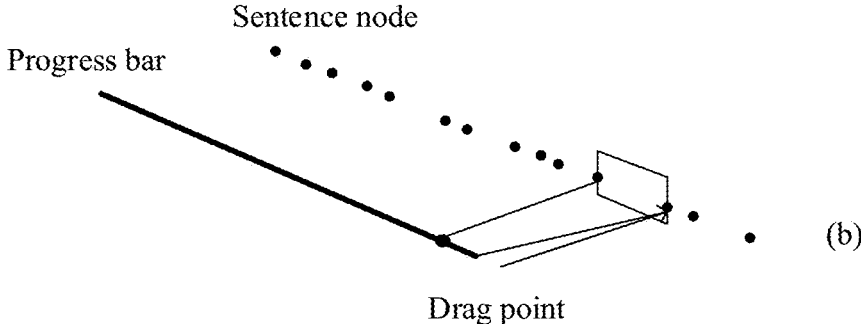
(b)
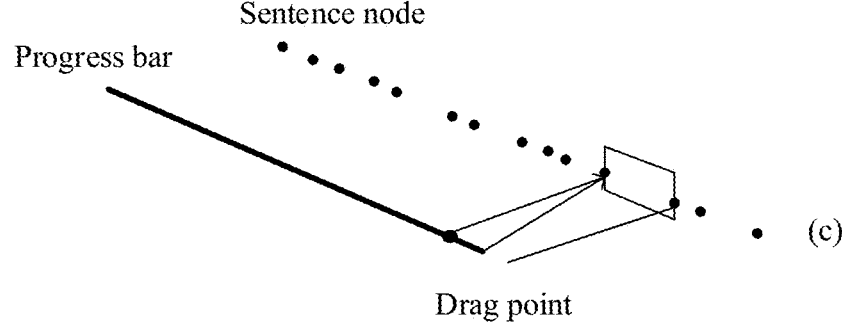
(c)
FIG. 8E

CONT.
FROM

CONT. FROM FIG. 9B(a)

China Mobile 📶 📶 08:08

✕ **** 〉 ⋯

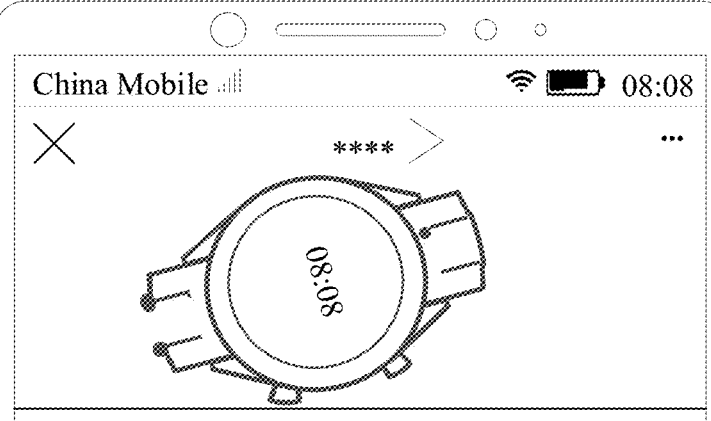

This smartwatch weighs about 52g. It adopts a colorful round screen and supports full-screen touch operations. It is made of titanium metal and sapphire glass. It is equipped with a gray-brown leather strap. It has a power button and a function button. It can be used for water activities in shallow waters such as swimming pools or beach swimming. It is not suitable for diving, diving, wading under high-speed flowing water or deep-water activities. After the smartwatch is used in seawater, you are advised to rinse with clean water, and dry it.

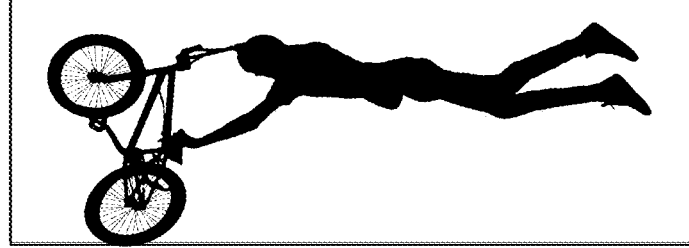

FIG. 9B(b)

CONT. FROM FIG. 10(a)

CONT. FROM FIG. 10(a)

CONT. FROM FIG. 10(a)

TO FIG. 10(c)

CONT.
FROM

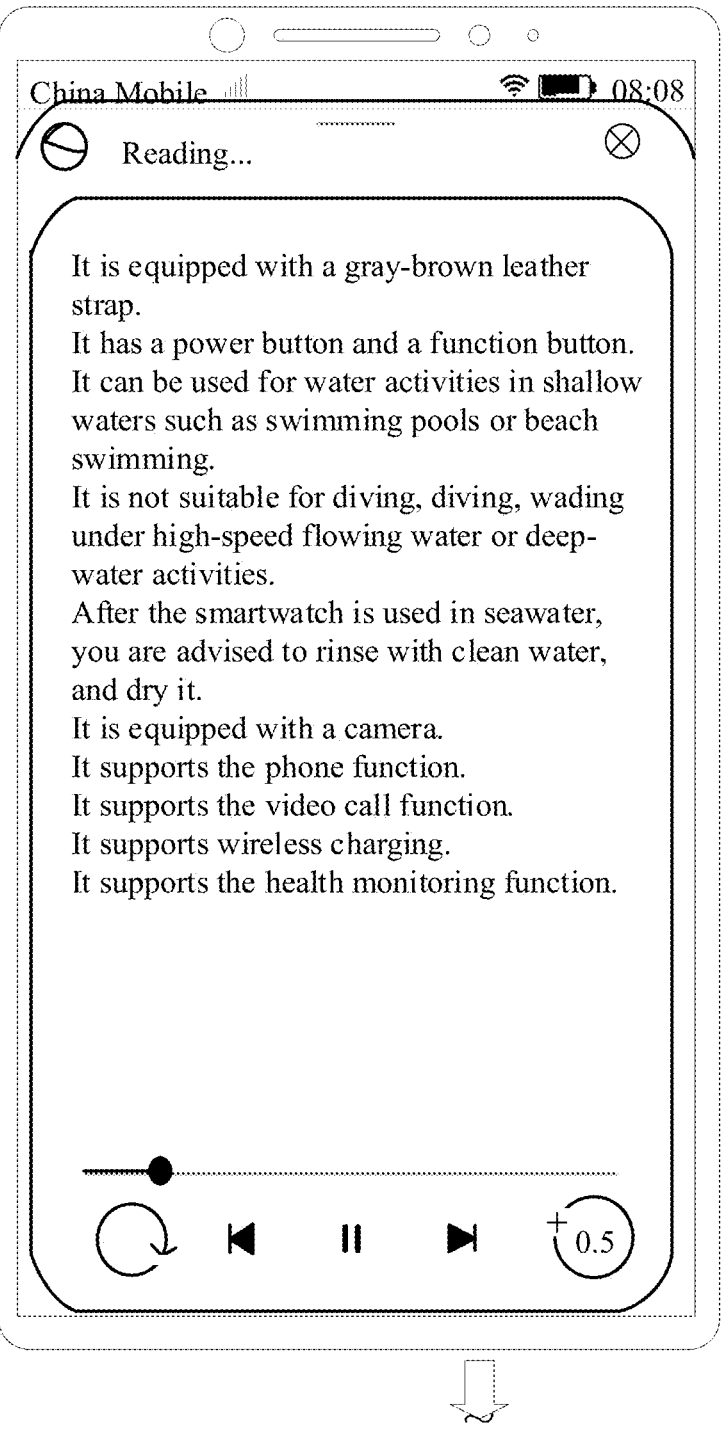

China Mobile

Reading...

It is equipped with a gray-brown leather strap.
It has a power button and a function button.
It can be used for water activities in shallow waters such as swimming pools or beach swimming.
It is not suitable for diving, diving, wading under high-speed flowing water or deep-water activities.
After the smartwatch is used in seawater, you are advised to rinse with clean water, and dry it.
It is equipped with a camera.
It supports the phone function.
It supports the video call function.
It supports wireless charging.
It supports the health monitoring function.

CONT.
FROM

CONT.
FROM

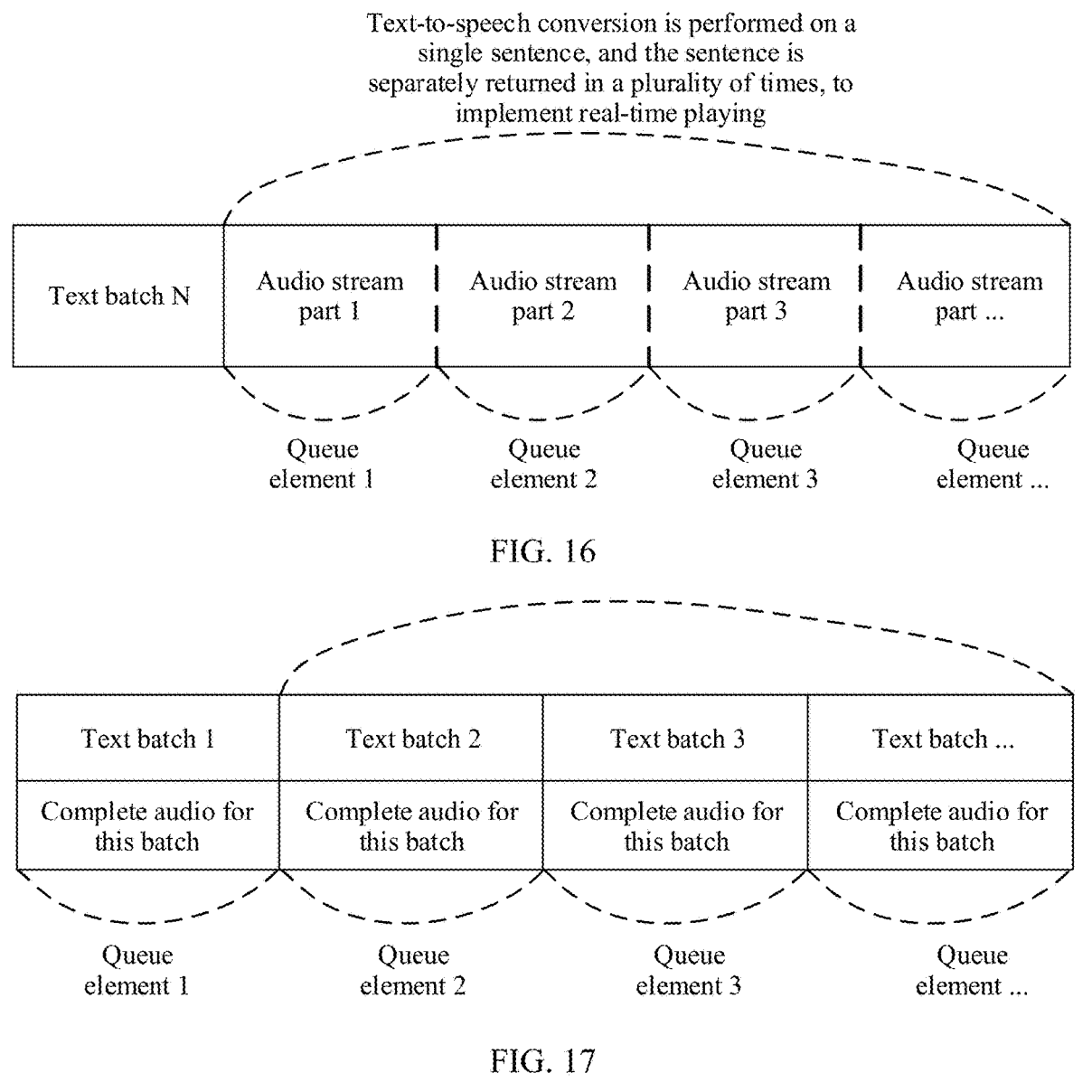

Text-to-speech conversion is performed on a
single sentence, and the sentence is
separately returned in a plurality of times, to
implement real-time playing

| Text batch N | Audio stream part 1 | Audio stream part 2 | Audio stream part 3 | Audio stream part ... |
|---|---|---|---|---|

| | Queue element 1 | Queue element 2 | Queue element 3 | Queue element ... |

FIG. 16

| Text batch 1 | Text batch 2 | Text batch 3 | Text batch ... |
|---|---|---|---|
| Complete audio for this batch | Complete audio for this batch | Complete audio for this batch | Complete audio for this batch |

| Queue element 1 | Queue element 2 | Queue element 3 | Queue element ... |

FIG. 17

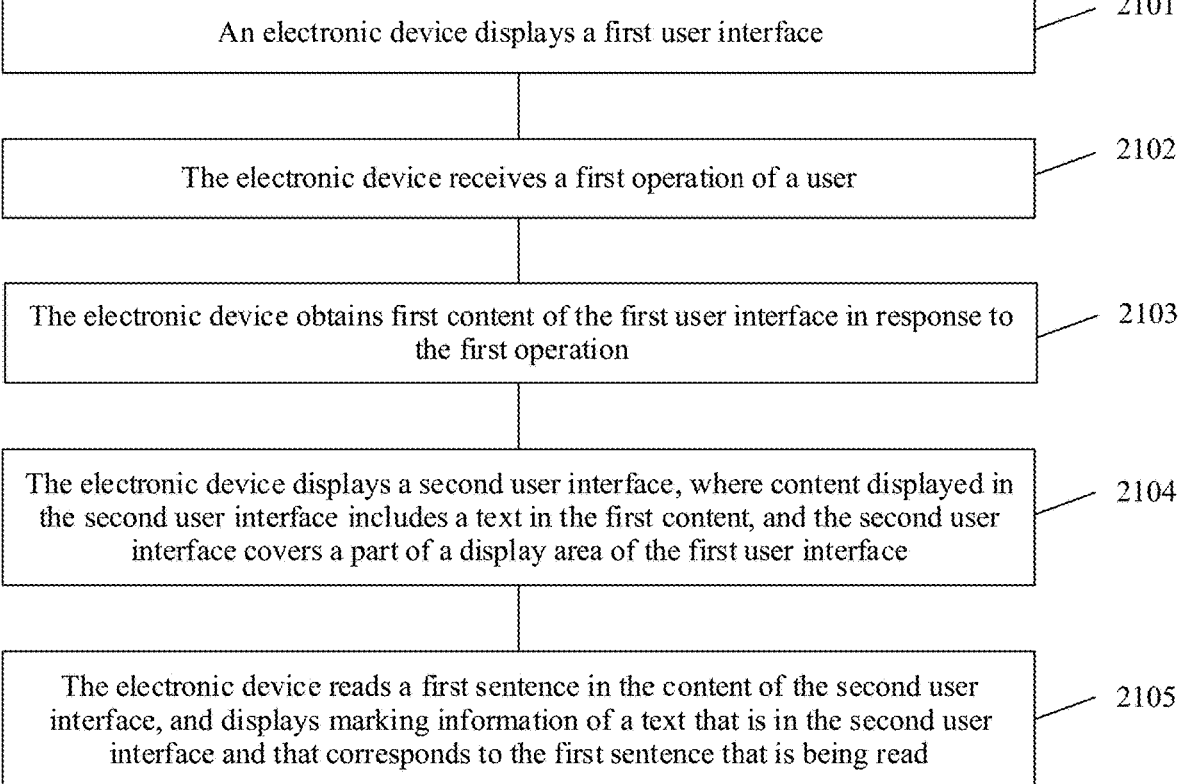

An electronic device displays a first user interface ⟋ 2101

The electronic device receives a first operation of a user ⟋ 2102

The electronic device obtains first content of the first user interface in response to the first operation ⟋ 2103

The electronic device displays a second user interface, where content displayed in the second user interface includes a text in the first content, and the second user interface covers a part of a display area of the first user interface ⟋ 2104

The electronic device reads a first sentence in the content of the second user interface, and displays marking information of a text that is in the second user interface and that corresponds to the first sentence that is being read ⟋ 2105

TEXT READING METHOD AND DEVICE

CROSS REFERENCE TO RELATED APPLICATIONS

This application is a national stage of International Application No. PCT/CN2022/084595 filed on Mar. 31, 2022, which claims priority to Chinese Patent Application No. 202110425978.2, filed on Apr. 20, 2021 and Chinese Patent Application No. 202110485195.3, filed on Apr. 30,2021. All of the aforementioned applications are hereby incorporated by reference in their entireties

TECHNICAL FIELD

Embodiments of this application relate to the field of electronic technologies, and in particular, to a text reading method and a device.

BACKGROUND

Listening to books is a common requirement of users. In the past, people mainly listened to story telling programs on the radio. With the emergence of the mobile internet, people began to obtain various types of information through mobile phones. For example, reading various types of articles through a mobile phone is a habit that is common among people. However, when people are in a relatively bumpy scenario such as walking, driving, or riding, or in a scenario in which, for example, eyes are tired or the light is dim, it is difficult to read an article by using a mobile phone. In this case, if the mobile phone can read the article for the user, such a pain point of the user can be resolved.

SUMMARY

Embodiments of this application provide a text reading method and a device, so as to convert a text displayed in a user interface by an electronic device into playable audio data to implement text reading, and prompt, by using a reading control panel superimposed in the user interface for display, a user in real time with a sentence that is being read. In addition, a reading sentence can be switched at any time based on an instruction of the user.

To achieve the foregoing objective, the following technical solutions are used in embodiments of this application.

According to an aspect, an embodiment of this application provides a method for reading displayed content, which may be applied to an electronic device. The method includes: An electronic device displays a first user interface; receives a first operation of a user; obtains first content of the first user interface in response to the first operation; displays a second user interface, where content displayed in the second user interface includes a text in the first content, and the second user interface covers a part of a display area of the first user interface; reads a first sentence in the content of the second user interface, and displays marking information of a text that is in the second user interface and that corresponds to a first sentence that is being read.

In this solution, the electronic device can read the text in the first user interface, and display the marking information by using the second user interface superimposed on a part of the display area of the first user interface, so as to dynamically and intuitively prompt the user with the content that is being read. Interaction with the user is good, and user experience is relatively high. For example, the first user interface may be an interface of a target application, and the second user interface may be an interface corresponding to a reading control panel.

In a possible design, before the electronic device displays the second user interface, the method further includes: recognizing one or more sentences for the obtained first content of the first user interface.

To be specific, the electronic device recognizes and divides, by using one sentence as a granularity, the text in the obtained content of the first user interface.

In another possible design, the method further includes: The electronic device detects a second operation of the user; and controls, in response to the second operation based on a text location or text content corresponding to the second operation, the electronic device to read a second sentence corresponding to the second operation, or read from a location of the second sentence.

In this solution, the user may indicate the electronic device to read a sentence at any expected location, so as to perform flexible, refined, and precise reading control by using one sentence as a granularity.

In another possible design, the method further includes: The electronic device displays marking information of a text that is in the second user interface and that corresponds to the second sentence that is being read.

To be specific, as a reading sentence is switched, the electronic device may display, explicitly and dynamically in real time, marking information of the sentence that is being read. Interaction with the user is relatively strong.

In another possible design, the method further includes: when the second operation is a touch operation performed by the user on a text location corresponding to the second sentence displayed in the second user interface; and determining, based on the detected touch operation, to obtain a voice corresponding to the second sentence, and reading the voice.

In this way, the user may instruct, by performing a touch operation on a location of a sentence that is expected to be read in the second user interface, the electronic device to read the sentence.

In another possible design, the method further includes: The electronic device displays the second user interface based on the one or more recognized sentences, where each of the one or more sentences displayed in the second user interface corresponds to one control. The determining, based on the detected touch operation, to obtain a voice corresponding to the second sentence, and reading the voice specifically includes: triggering, based on the touch operation corresponding to the second operation, a control corresponding to the second sentence; obtaining, in response to the control event, the voice of the second sentence corresponding to the control, and reading the voice.

In this solution, the electronic device may determine, by using the control event, a sentence specified by a user and corresponding to the control event, and read the sentence, so as to perform flexible, refined, and precise reading control by using one sentence as a granularity.

In another possible design, the method further includes: The electronic device indexes the one or more recognized sentences. The method further includes: The content displayed in the second user interface further includes a player control, and the player control is capable of controlling a reading progress or a reading speed. The player control includes a progress bar, and the progress bar matches an index of the one or more sentences, and is used for control based on a granularity of the recognized sentence. The player control includes a move-down control, the move-down control is configured to control a current reading progress to switch to a next sentence; and/or the player control includes a move-up control, and the move-up control is configured to control a current reading progress to switch to a previous sentence.

In this way, when the user drags the progress bar or indicates the electronic device to read a next sentence or a previous sentence, the electronic device may determine a to-be-read sentence by performing index matching on the sentence.

In another possible design, the method further includes: The electronic device detects a third operation of the user; and adjusts, in response to the third operation, a size of a window corresponding to the second user interface.

To be specific, the user may indicate the electronic device to adjust the size of the window corresponding to the second user interface, for example, to minimize the second user interface, or to switch the second user interface between half-screen display and full-screen display.

In another possible design, the method further includes: The electronic device detects a fourth operation of the user; and minimizes, in response to the fourth operation, the window corresponding to the second user interface, and continues reading current text content without interruption. After minimizing the window corresponding to the second user interface, the method further includes: restoring the second user interface by using a card corresponding to a reading function, and displaying the currently read text content and a progress.

To be specific, after minimizing the window corresponding to the second user interface, the electronic device may continue reading the text without interruption. In addition, the second user interface disappears, and display of the second user interface may be restored by using a corresponding card.

In another possible design, the player control includes a refresh control, and the method further includes: The electronic device stops, in response to the refresh control, reading the current text, and re-obtains second content of the first user interface for reading.

The second content may be the same as or different from the first content. The electronic device may re-obtain content in the current first user interface in response to an operation that the user indicates to refresh, and read a text in the re-obtained content.

In another possible design, the method further includes: The electronic device separately sends the one or more recognized sentences to a server for text-to-speech conversion processing; receives and buffers a voice obtained through processing by the server; and reads, in real time, the voice obtained through processing by the server, or sequentially buffers, based on the one or more recognized sentences, the voice obtained through processing by the server.

To be specific, the electronic device and the server sequentially perform text-to-speech conversion and perform buffering based on the sentences.

In another possible design, the method further includes: The electronic device buffers, by using two queues, the voice obtained through processing by the server, where a first queue is used to buffer one or more voice packages of a sentence that is currently being processed by the server, and a second queue is used to buffer a voice corresponding to one or more sentences that have been processed by the server. The reading a first sentence in the content of the second user interface includes: if a voice currently received from the server is a voice of the first sentence, obtaining, from the first queue, the voice corresponding to the first sentence for reading; or if a voice currently received from the server is not a voice of the first sentence, obtaining, from the second queue, the voice corresponding to the first sentence for reading.

In this way, each voice package is obtained through synthesis, and then is stored into the first queue. The first queue enables the user to quickly hear a reading sound after waiting for one voice package to be obtained through synthesis. The user waits a short time for starting to read, and the time required for starting to read may be reduced to a 10-ms level, so that real-timeliness of reading is relatively good. In addition, because an audio synthesis speed is relatively high, a sentence buffered in the second queue is generally ahead of a sentence that is being played. When the user drags the progress bar, if a progress obtained after the dragging falls into the second queue, an effect of immediately playing can be achieved without waiting. Therefore, real-time response is strong.

In another possible design, before the electronic device displays the second user interface, the method further includes: The electronic device processes the obtained first content of the first user interface to remove non-text information to obtain the text in the first content; and displays the processed text in the second user interface.

That is, the electronic device displays the text obtained by processing in the second user interface only after removing the non-text information that is not suitable for reading, so that reading content is consistent with content displayed in the second user interface.

In another possible design, before the electronic device displays the second user interface, the method further includes: The electronic device performs sentence segmentation on the processed text based on a special punctuation mark, to obtain the one or more recognized sentences.

That is, the electronic device displays the text in the second user interface only after dividing the text by sentence.

In another possible design, the method further includes: The electronic device controls the reading progress or the reading speed in response to a voice instruction of the user.

In this way, the user may control the progress or the speed of reading the text by using the voice instruction.

In another possible design, the method further includes: The electronic device detects a fifth operation of the user; and displays text content in the second user interface in a scrolling manner in response to the fifth operation of the user, and continues reading the current text content without interruption.

In this solution, the text content displayed in the second user interface may be displayed in a scrolling manner, to help the user view or switch a to-be-read sentence.

According to another aspect, an embodiment of this application provides an apparatus for reading displayed content. The apparatus is included in an electronic device. The apparatus has a function of implementing behavior of the electronic device in any method in the foregoing aspect and the possible designs, so that the electronic device performs the method for reading displayed content performed by the electronic device in any possible design of the foregoing aspect. The function may be implemented by hardware, or may be implemented by hardware executing corresponding software. The hardware or the software includes at least one module or unit corresponding to the foregoing function. For example, the apparatus may include a display unit, a processing unit, a reading unit, and the like.

According to still another aspect, an embodiment of this application provides an electronic device, including: a screen, configured to display a user interface; one or more processors; a memory; and one or more computer programs. The one or more computer programs are stored in the memory, the one or more computer programs include instructions, and when the instructions are executed by the electronic device, the electronic device is enabled to perform the method for reading displayed content performed by the electronic device in any possible design of the foregoing aspects.

According to yet another aspect, an embodiment of this application provides an electronic device, including one or more processors and a memory. The memory stores code. When the code is executed by the electronic device, the electronic device is enabled to perform the method for reading displayed content performed by the electronic device in any possible design of the foregoing aspects.

According to still yet another aspect, an embodiment of this application provides a computer readable storage medium, including computer instructions. When the computer instructions are run on an electronic device, the electronic device is enabled to perform the method for reading displayed content in any possible design of the foregoing aspects.

According to a further aspect, an embodiment of this application provides a computer program product. When the computer program product is run on a computer, the computer is enabled to perform the method for reading displayed content performed by the electronic device in any possible design of the foregoing aspects.

According to a still further aspect, an embodiment of this application provides a chip system, and the chip system is applied to an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the method for reading displayed content in any possible design of the foregoing aspects.

For beneficial effects corresponding to the foregoing other aspects, refer to descriptions of beneficial effects in the method aspects. Details are not described herein again.

BRIEF DESCRIPTION OF DRAWINGS

FIG. 2 is a flowchart of a reading method according to an embodiment of this application;

FIG. 3 is a schematic diagram of an interface according to an embodiment of this application;

FIG. 5 is a schematic diagram of a group of interfaces according to an embodiment of this application;

6

Figure 8A:
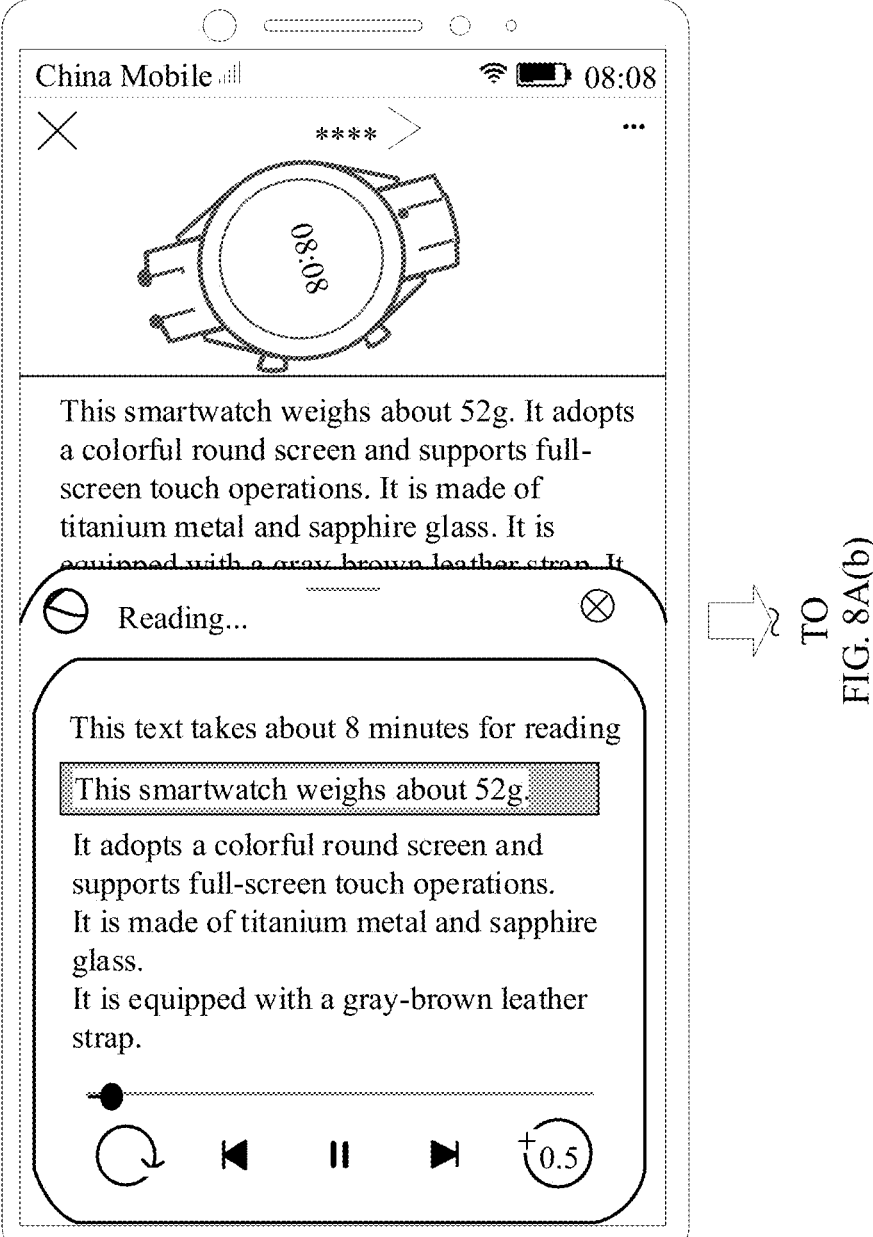
FIG. 8A(a) to FIG. 8A(d) are schematic diagrams of another group of interfaces according to an embodiment of this application.
Figure 8A:
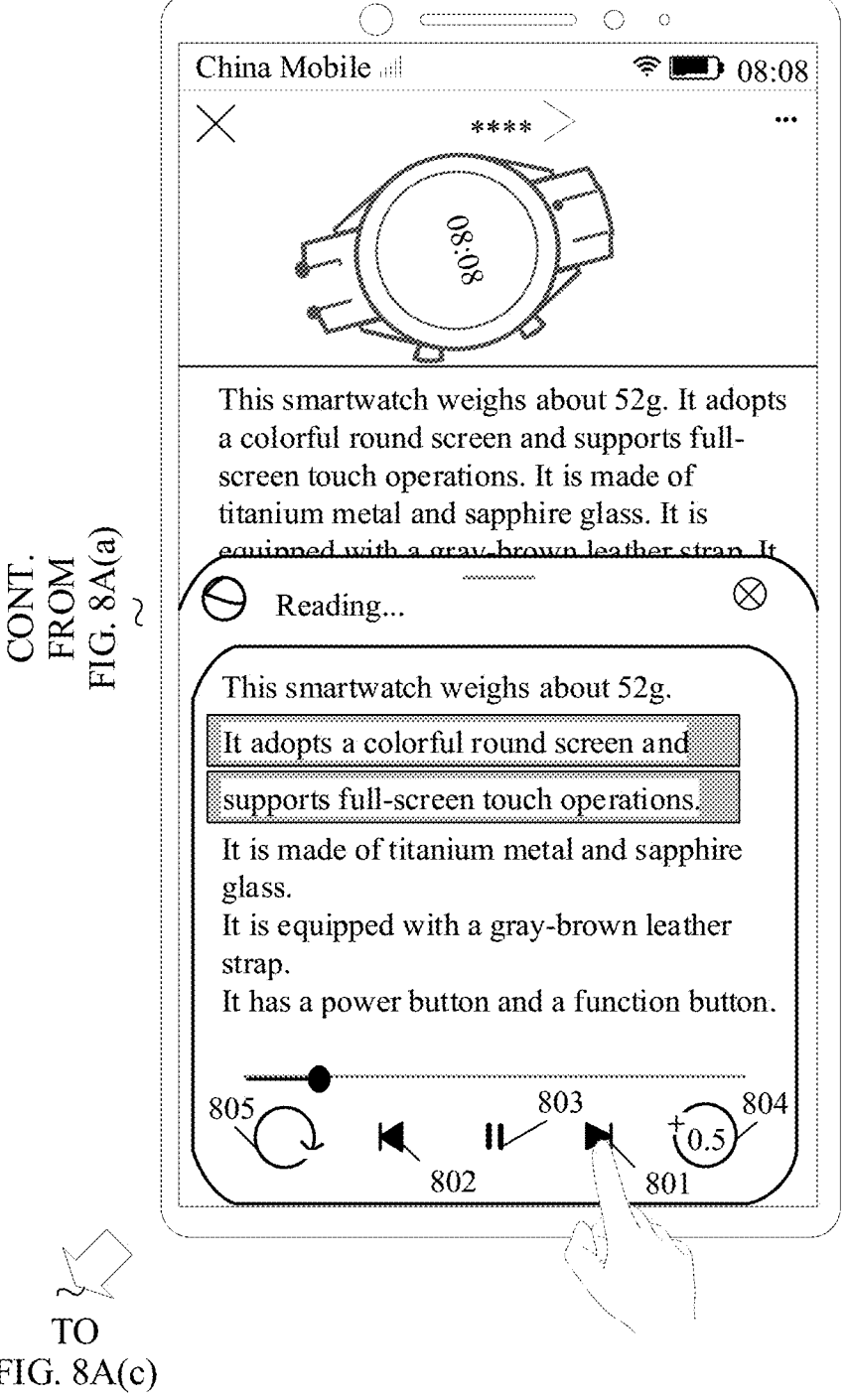
Figure 8A:
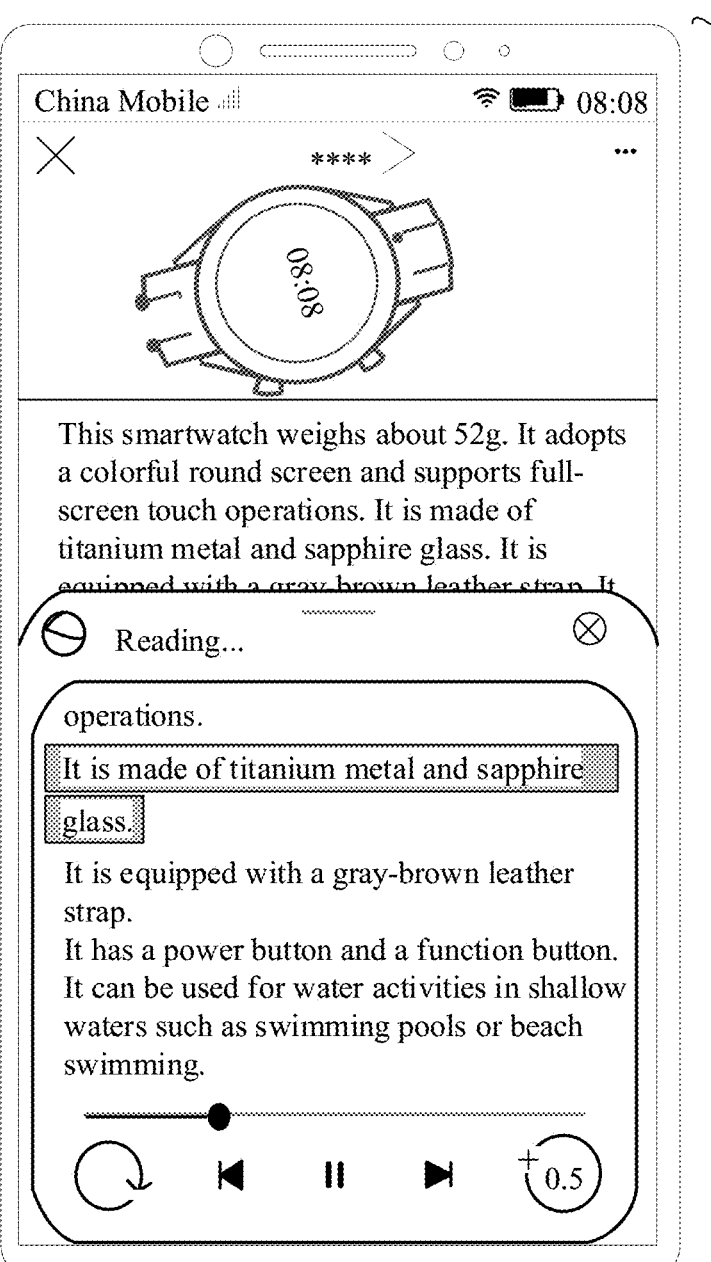
Figure 8A:
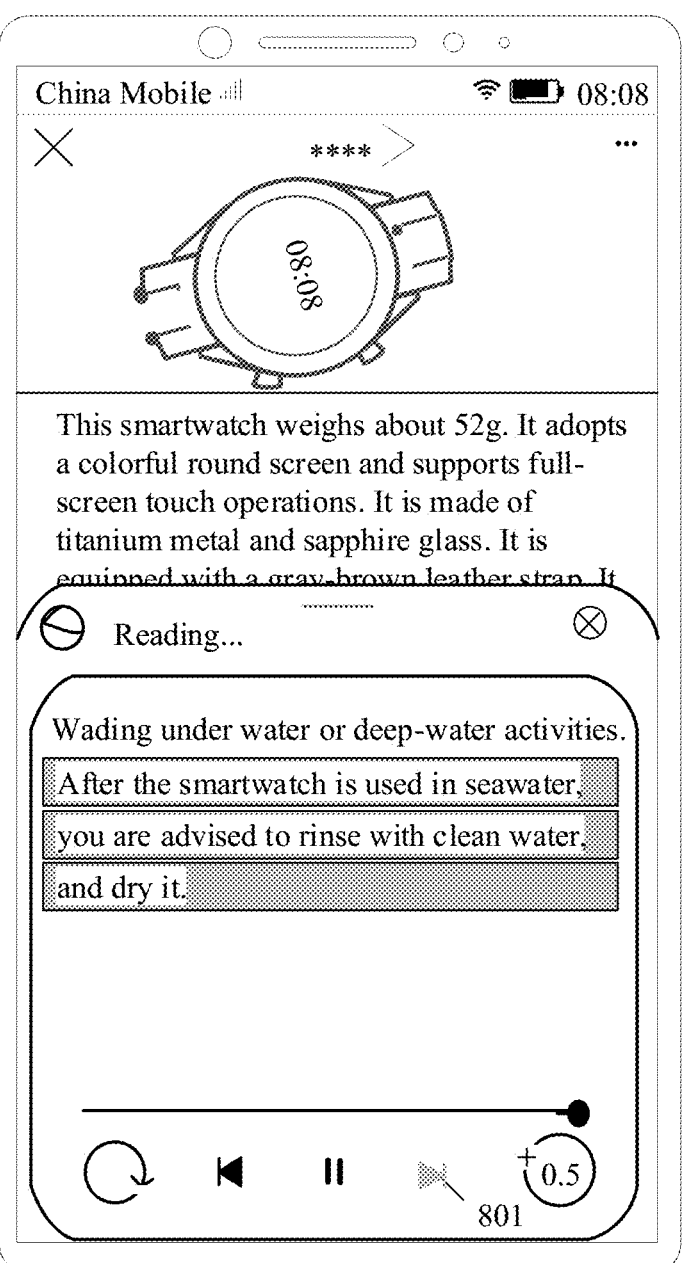
Figure 8B:
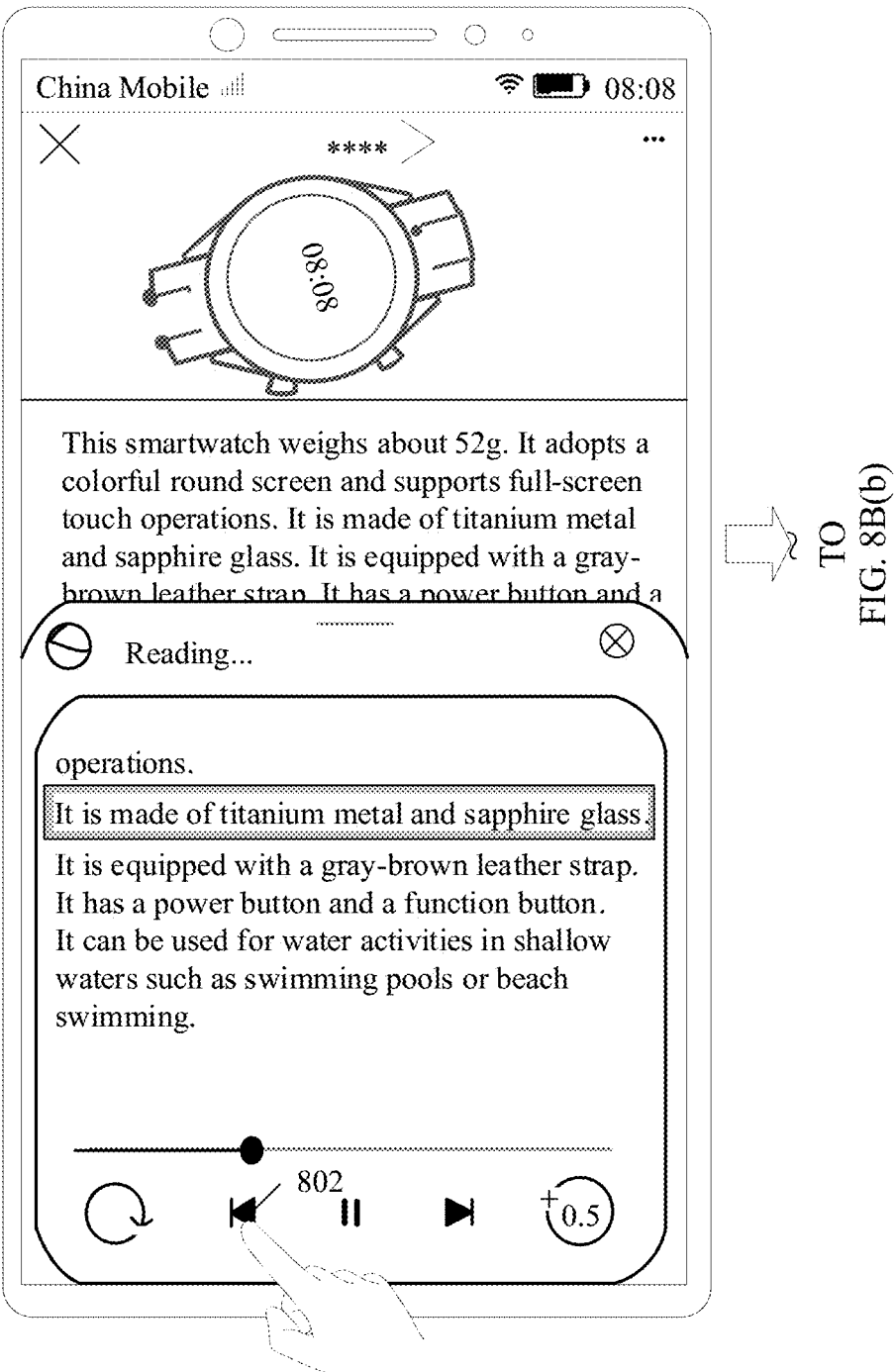
Figure 8B:
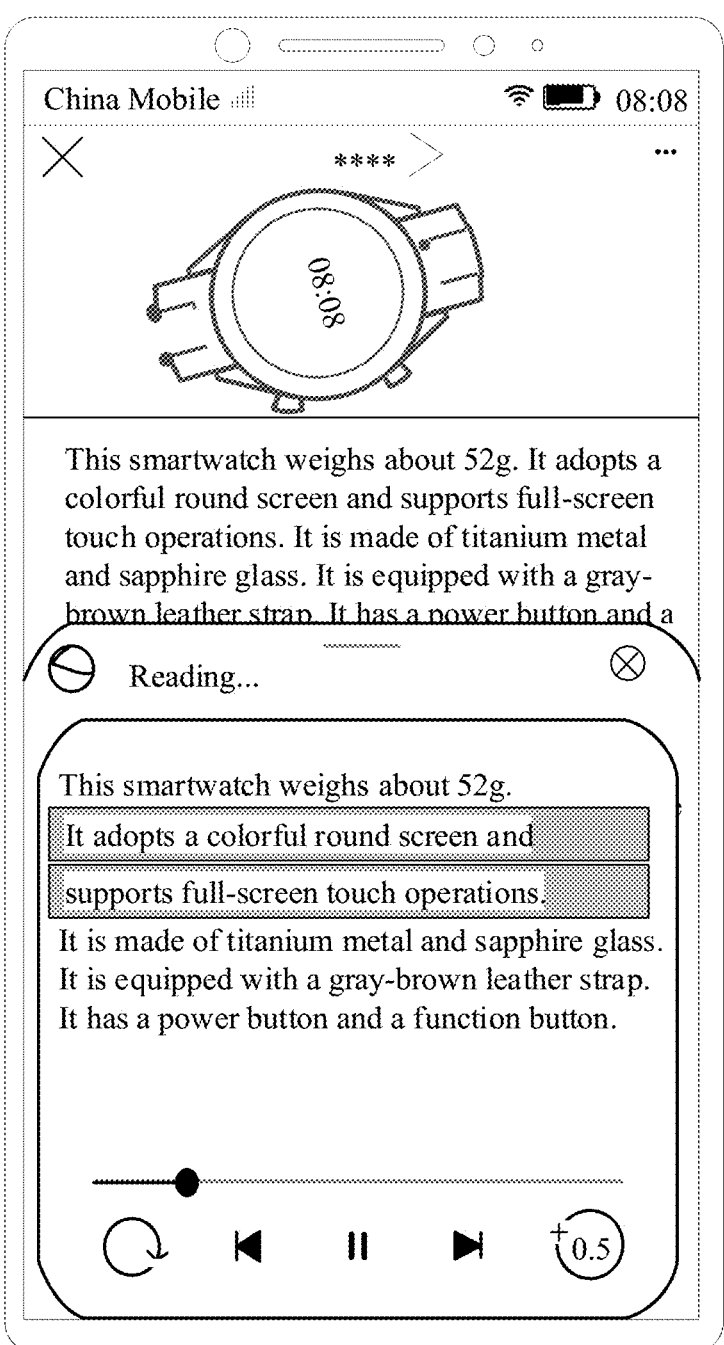
Figure 8C:
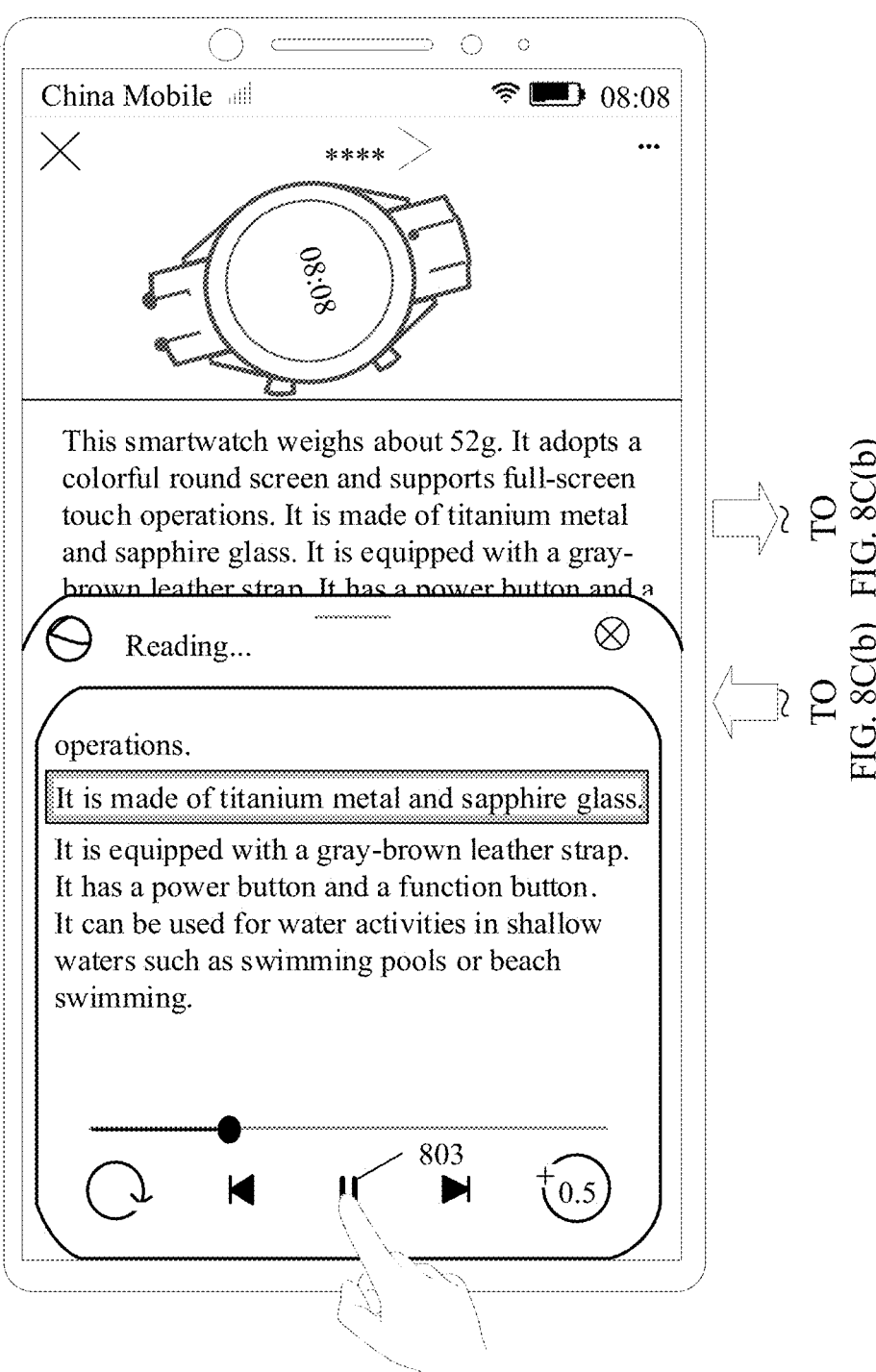
Figure 8D:
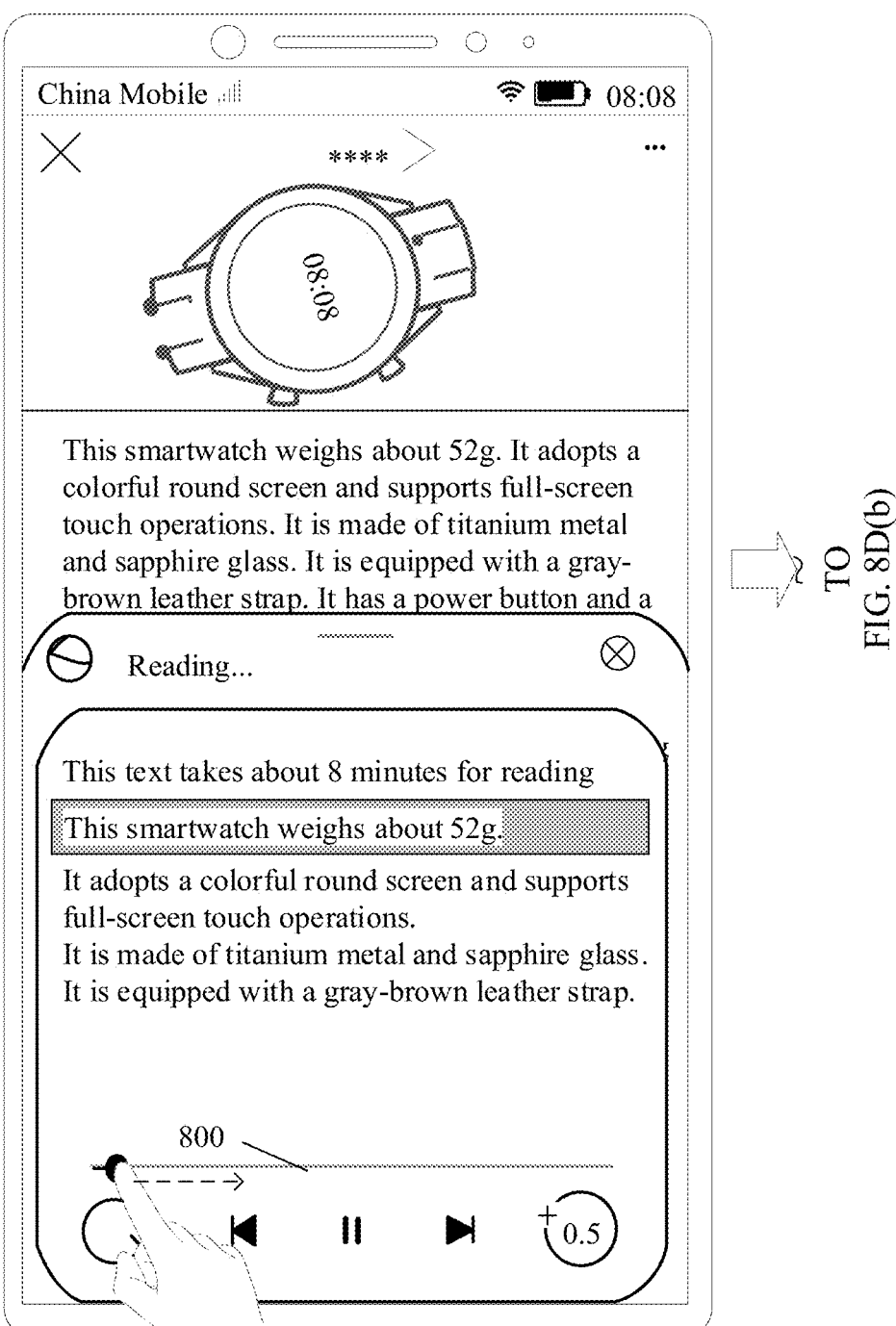
Figure 8D:
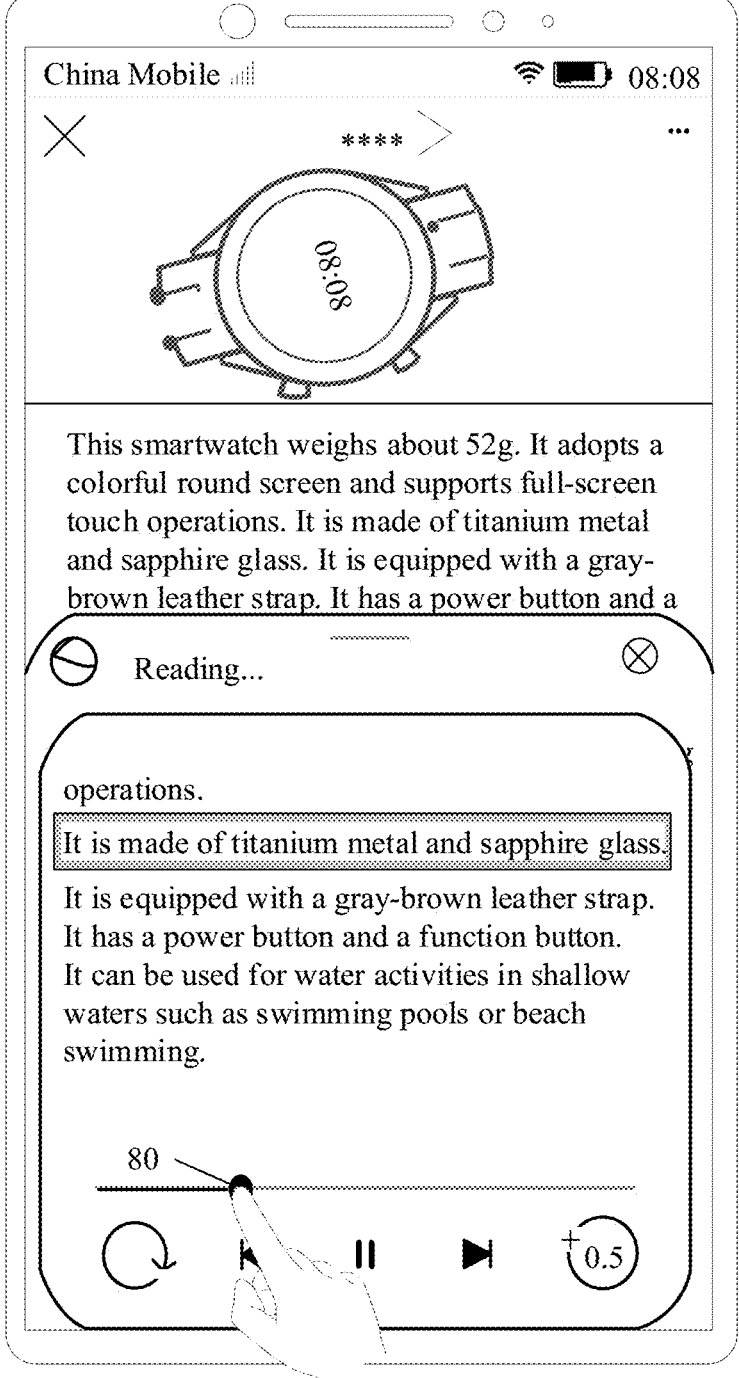
Figure 9A:
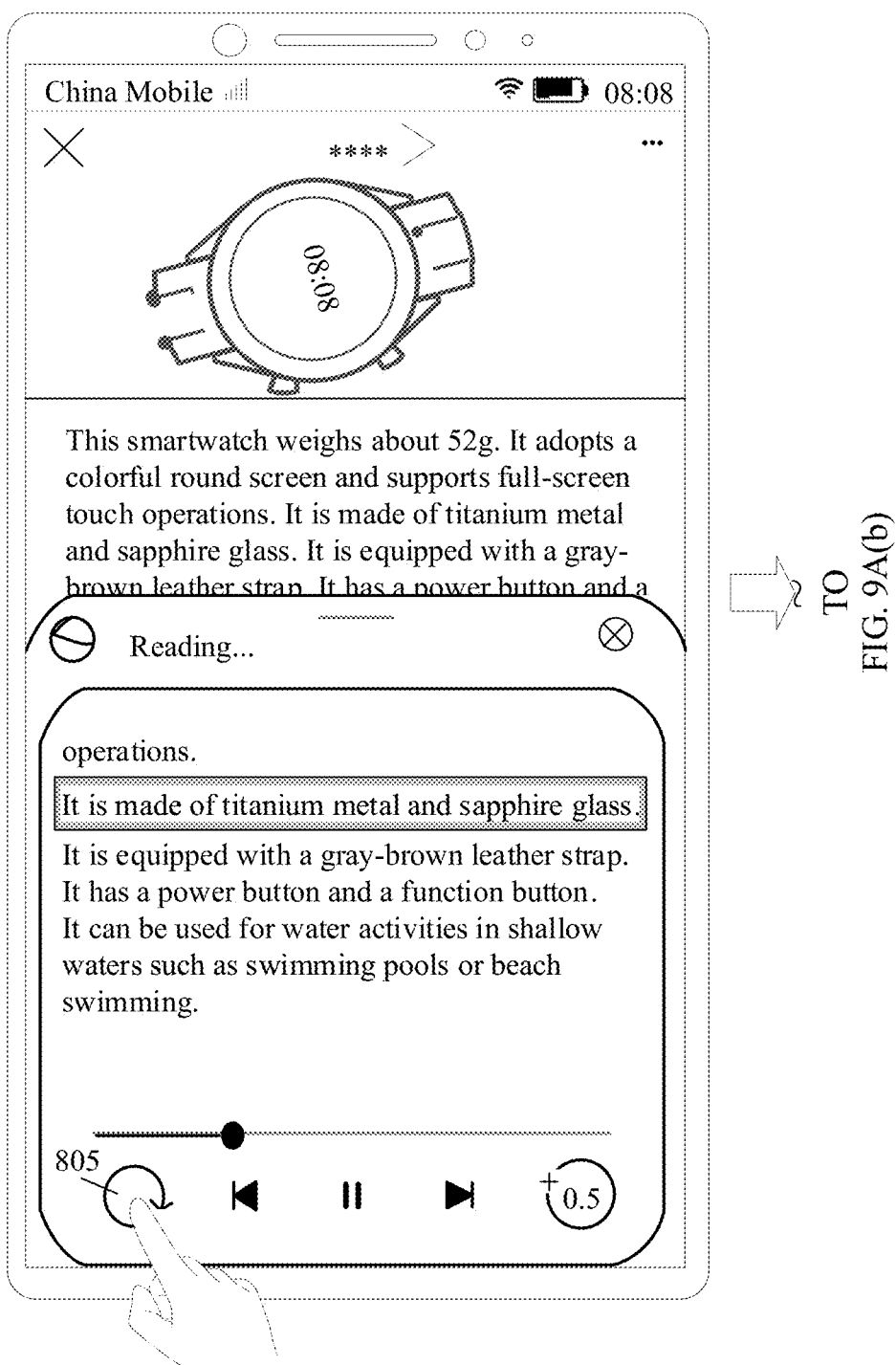
Figure 9A:
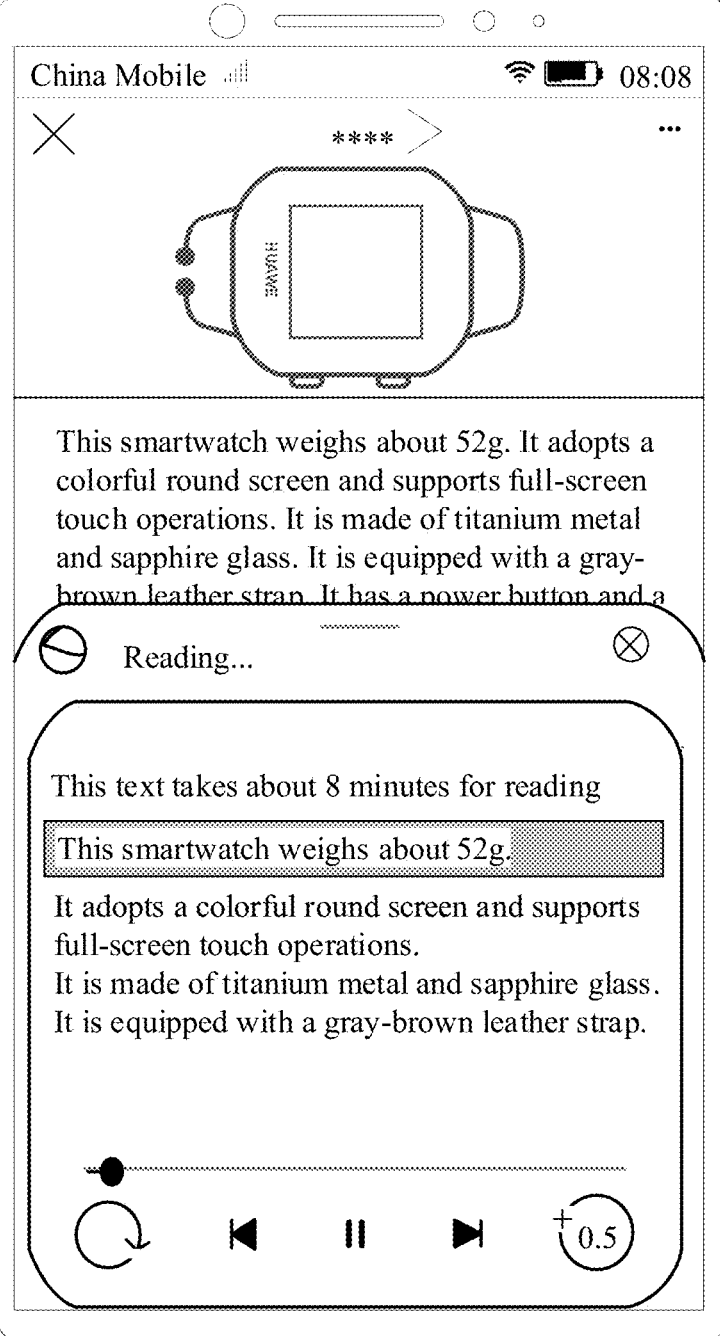
Figure 9B:
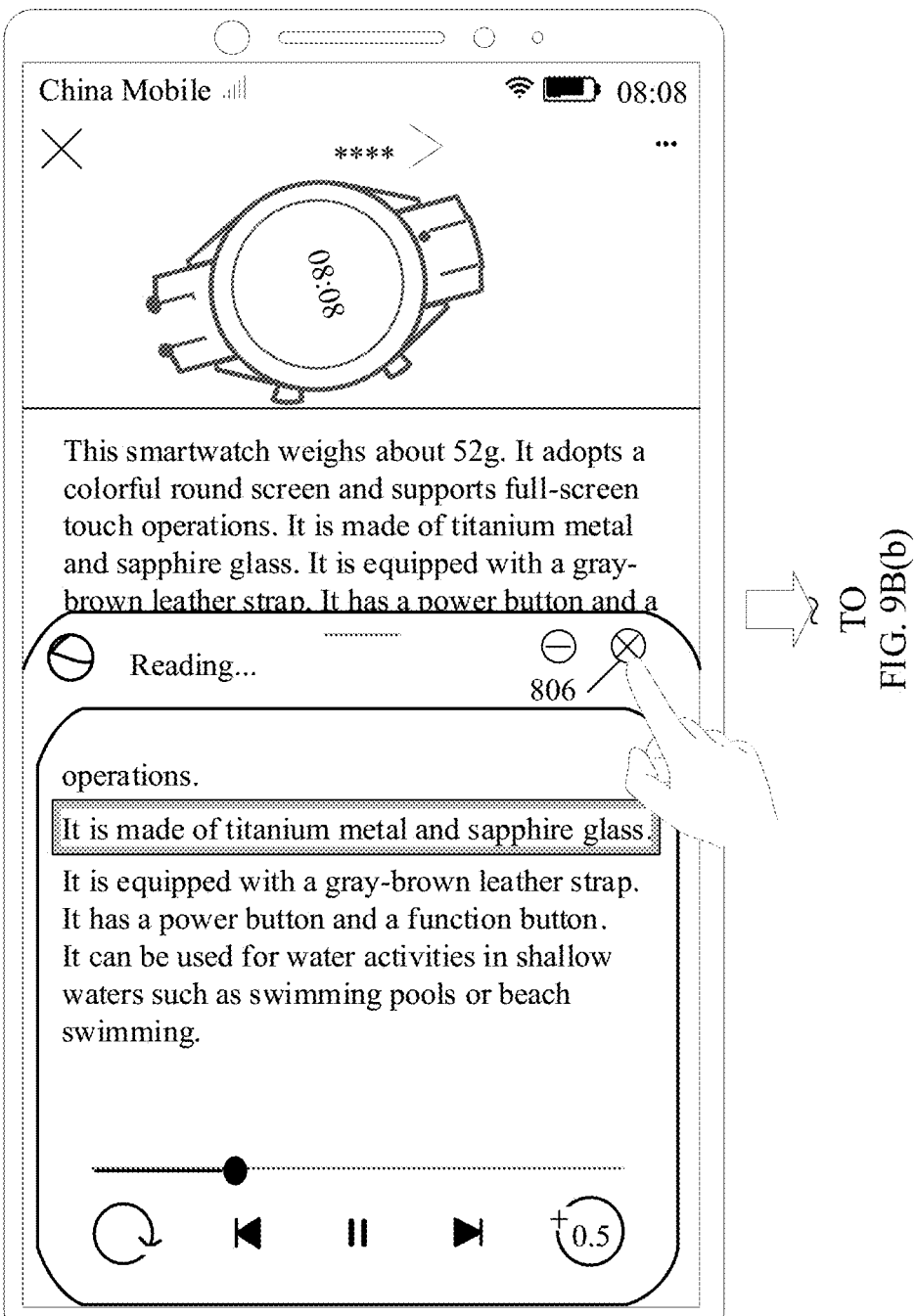
Figure 9C:
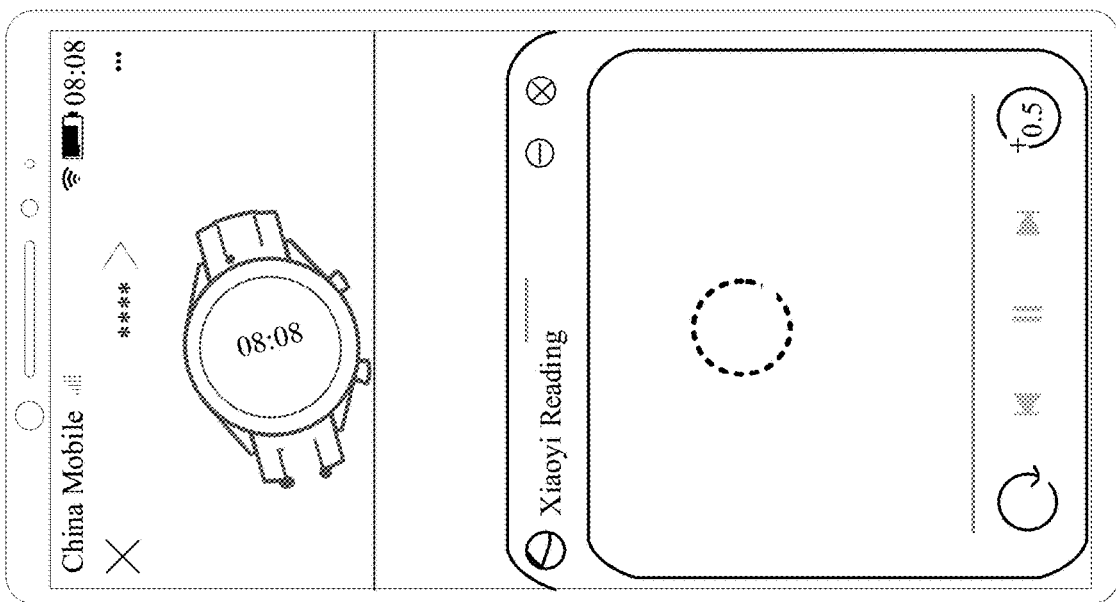
Figure 9C:
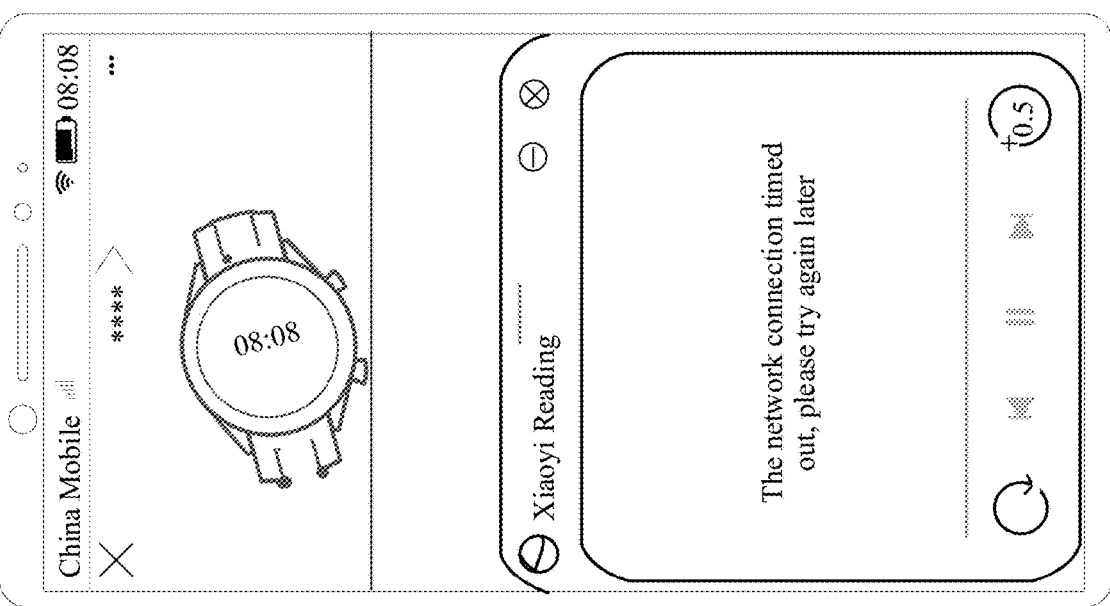
Figure 9C:
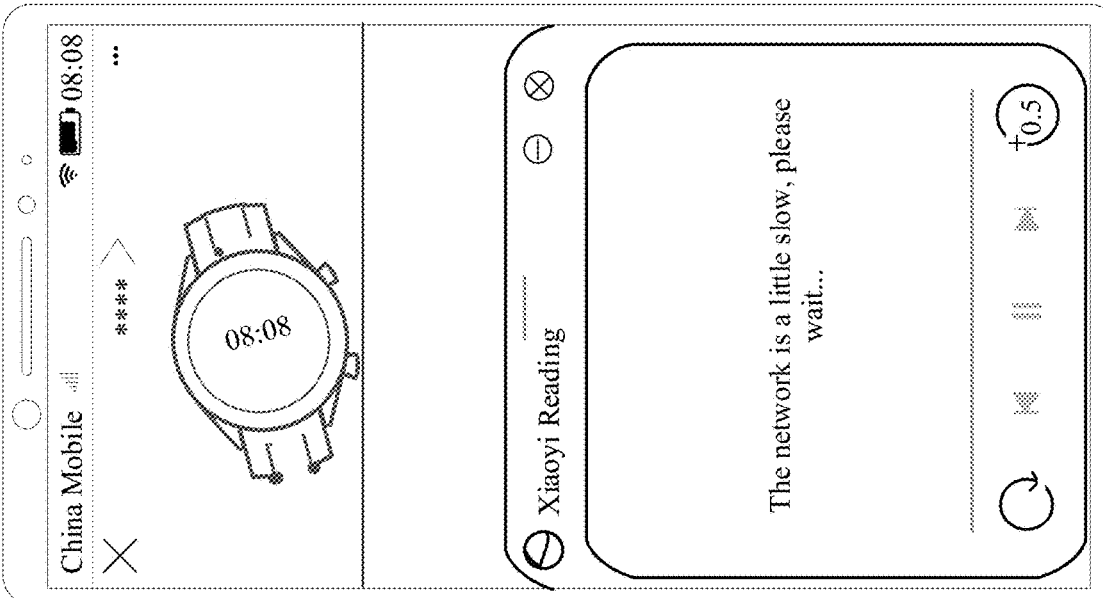
Figure 9C:
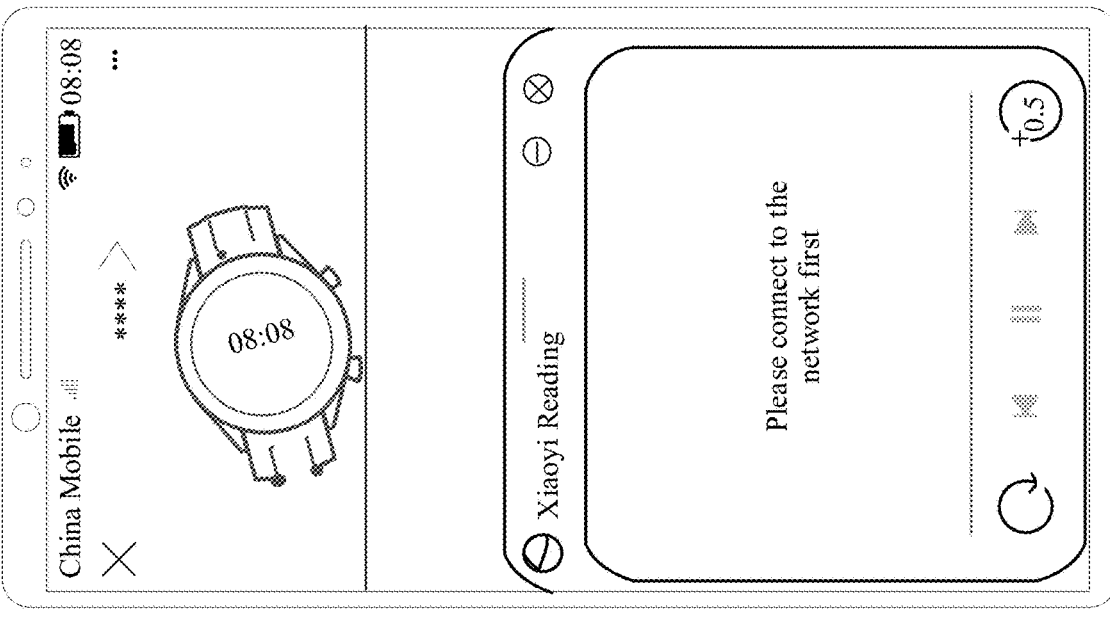
Figure 10A:
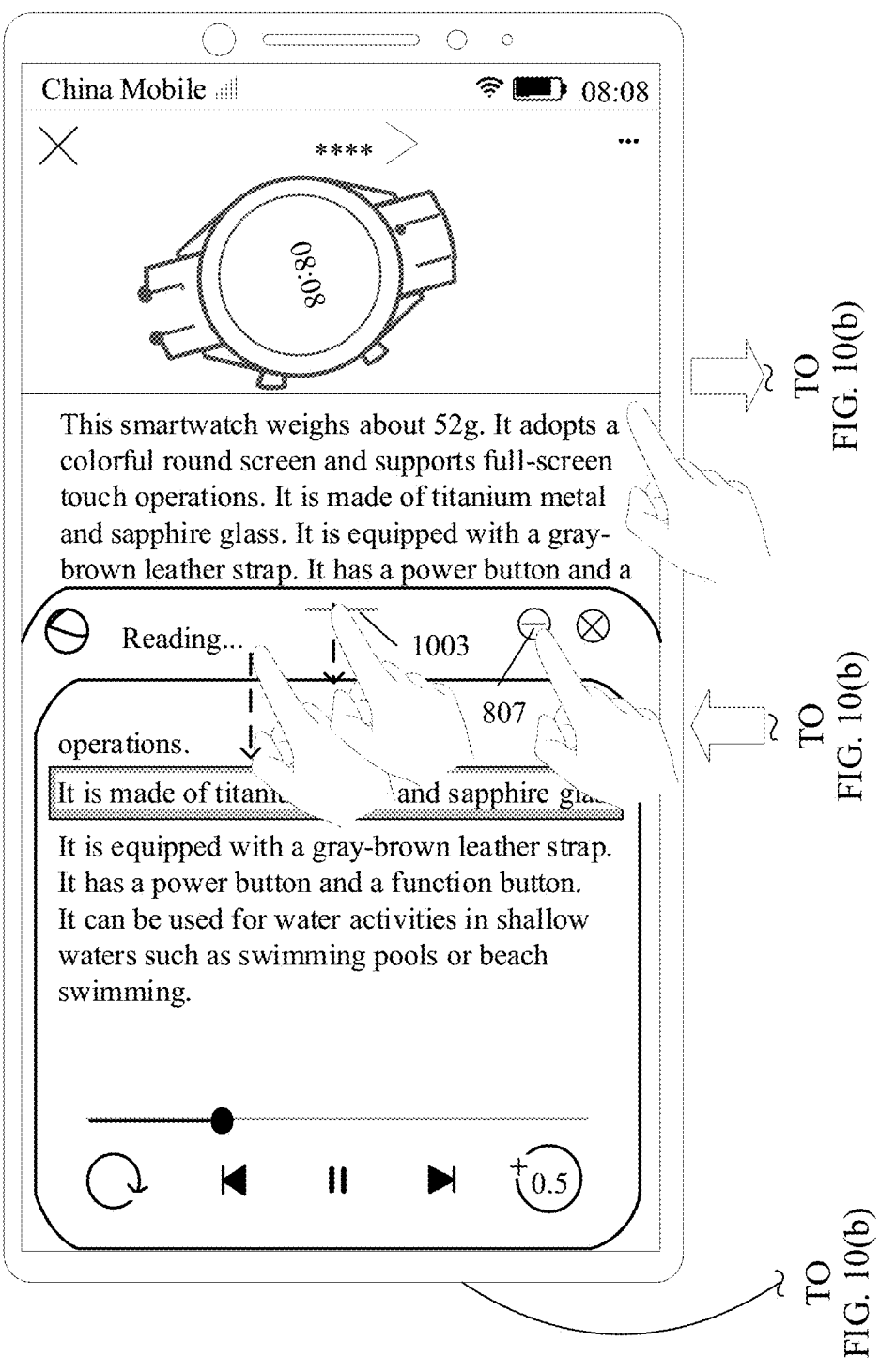
Figure 10B:
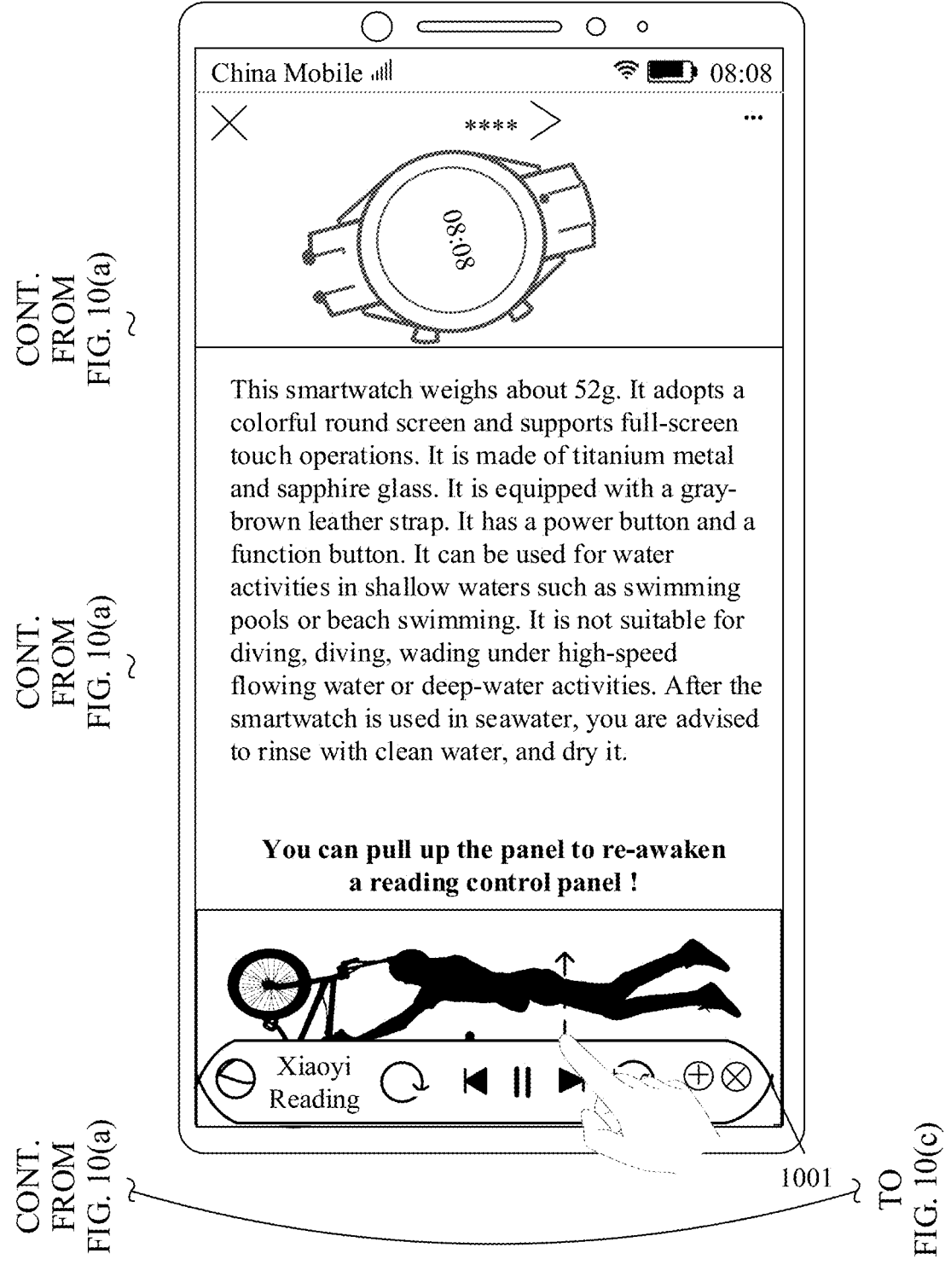
Figure 10C:
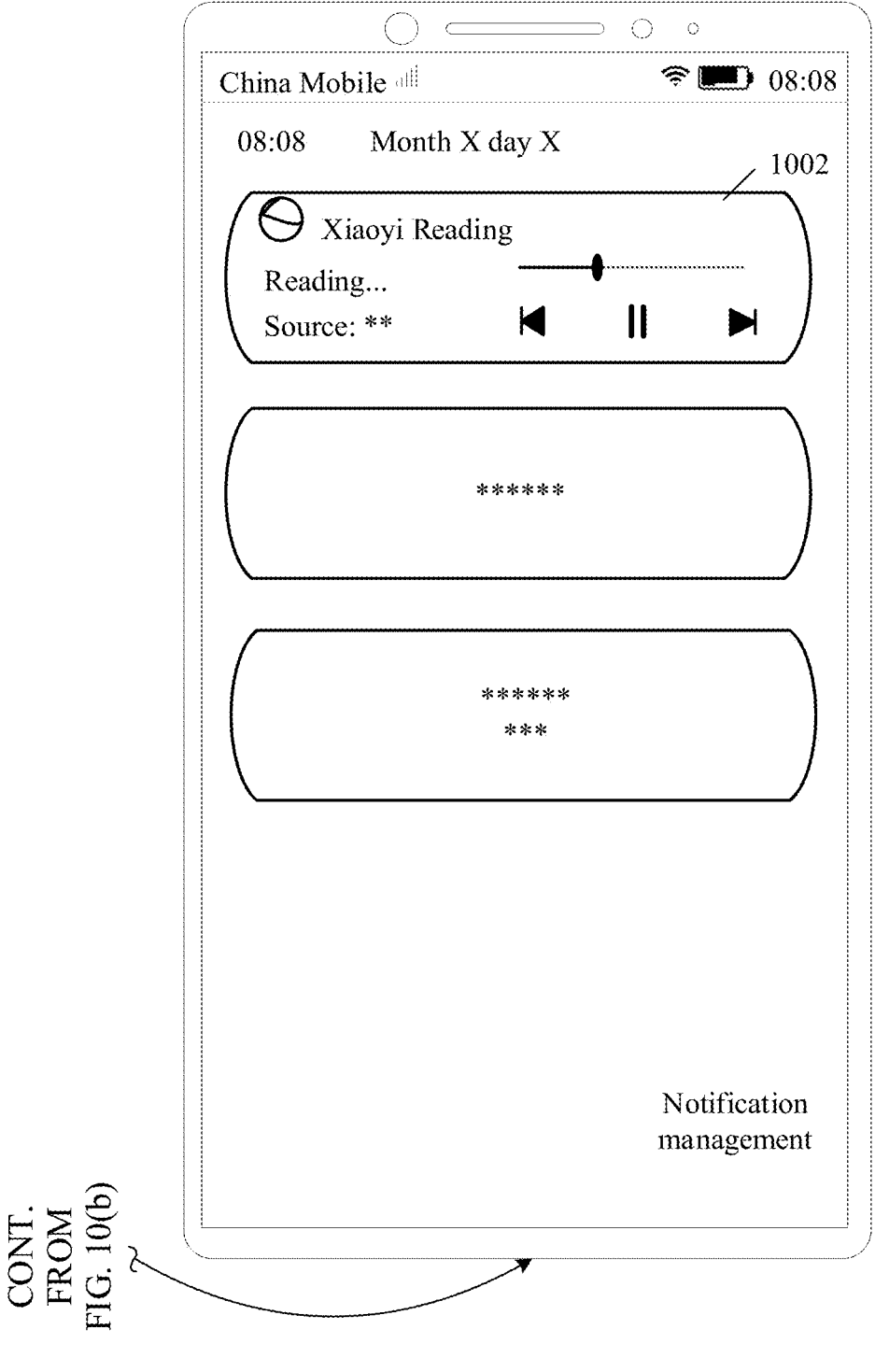
Figure 11A:
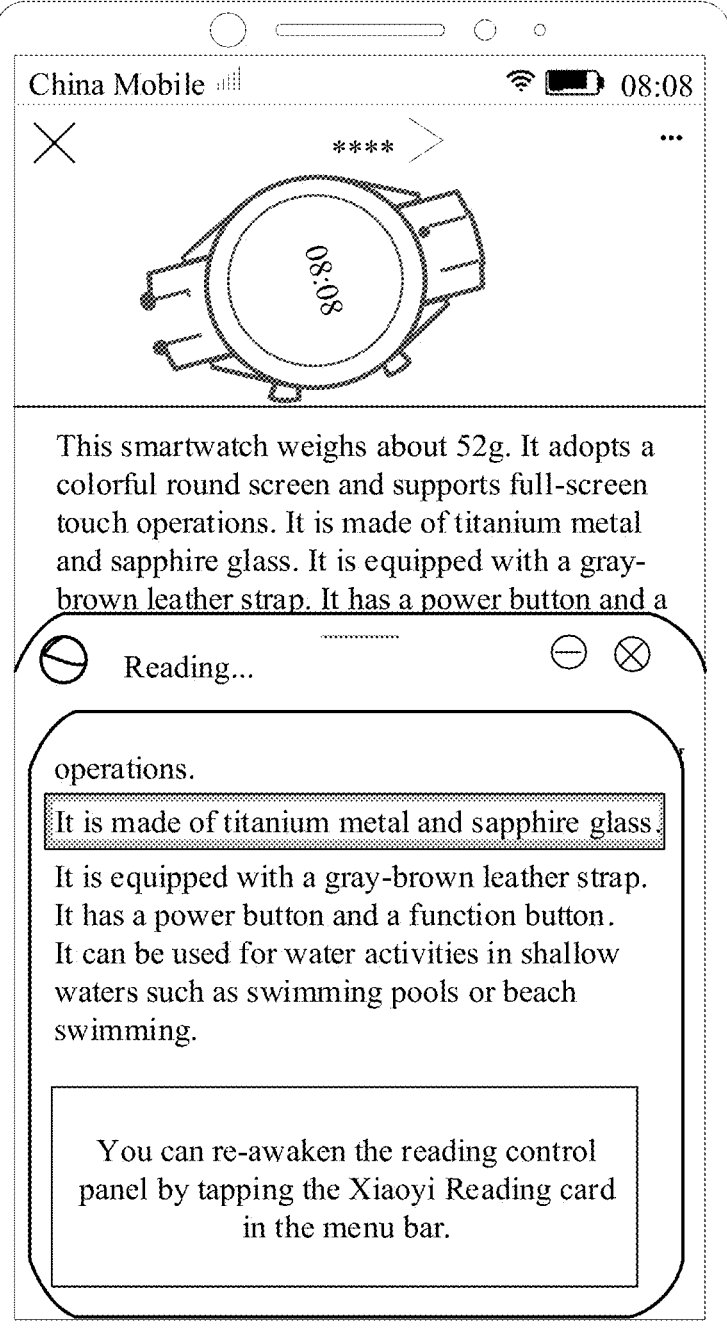
Figure 11B:
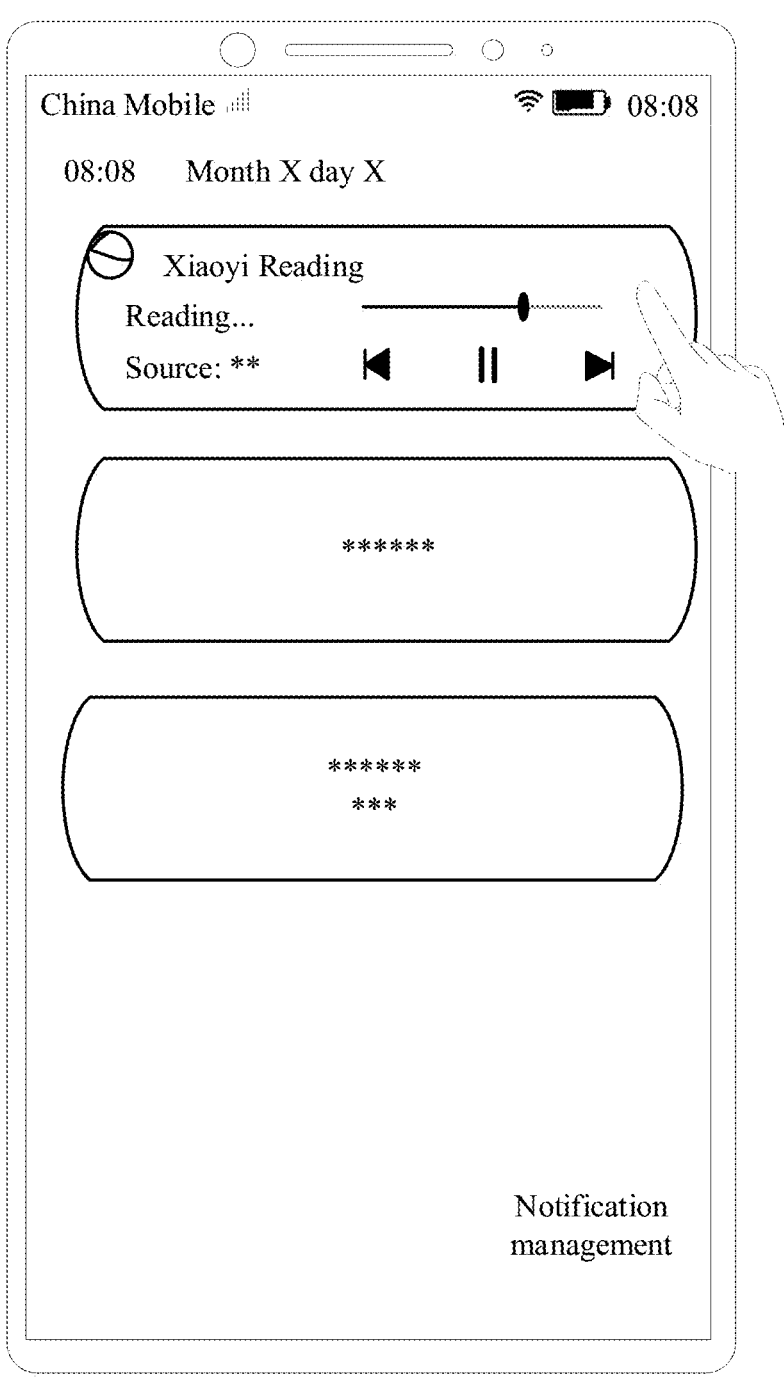
Figure 11C:
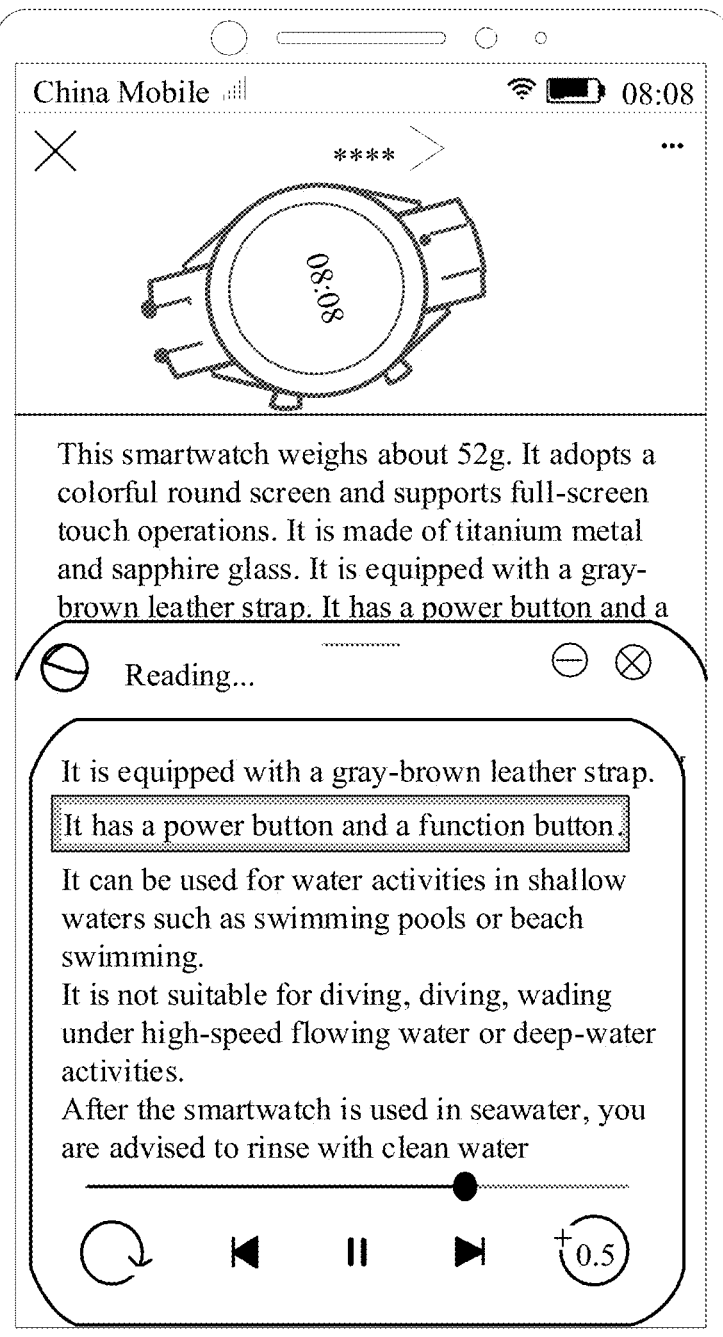
Figure 12A:
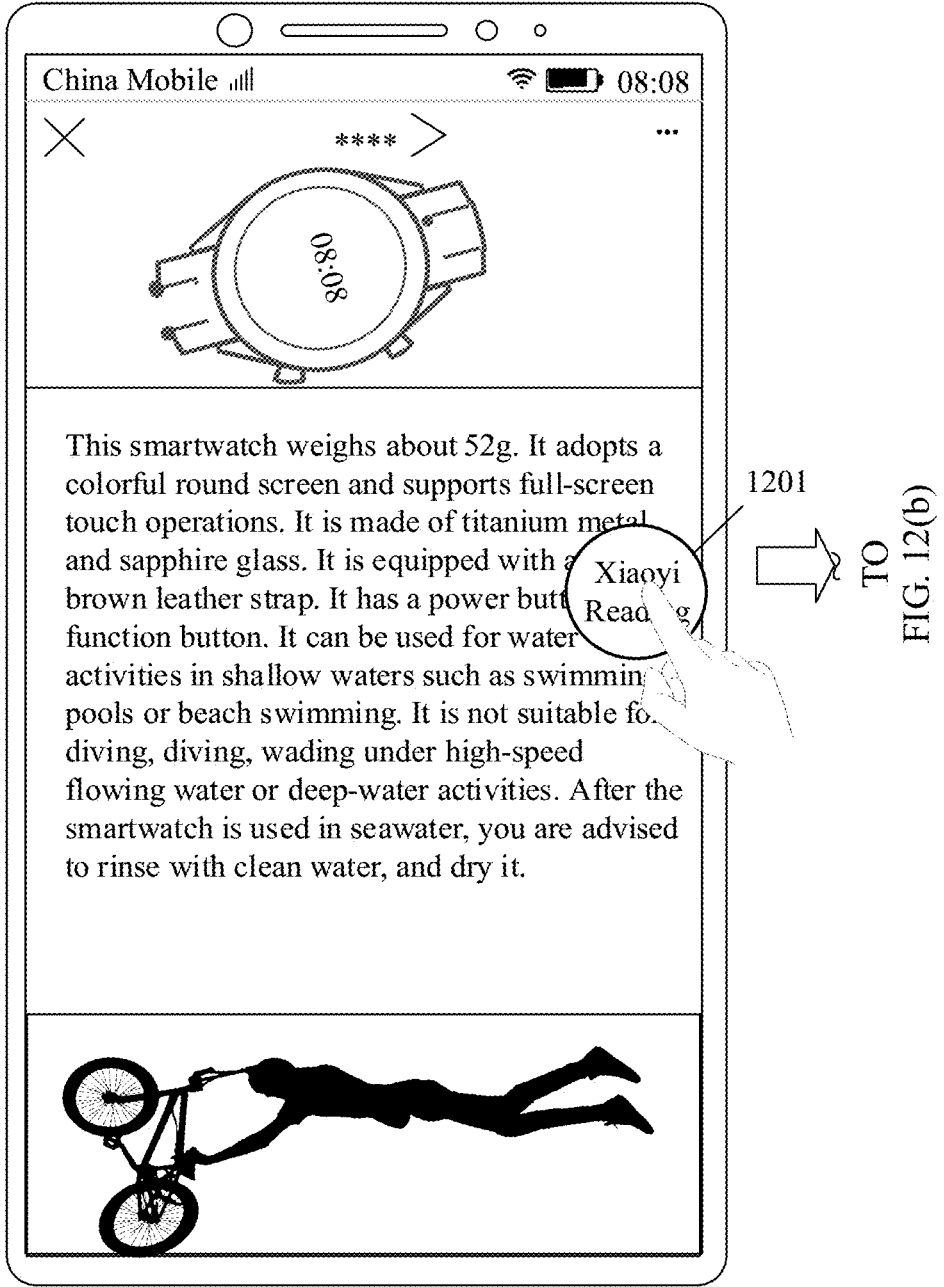
Figures 12A, 12B:
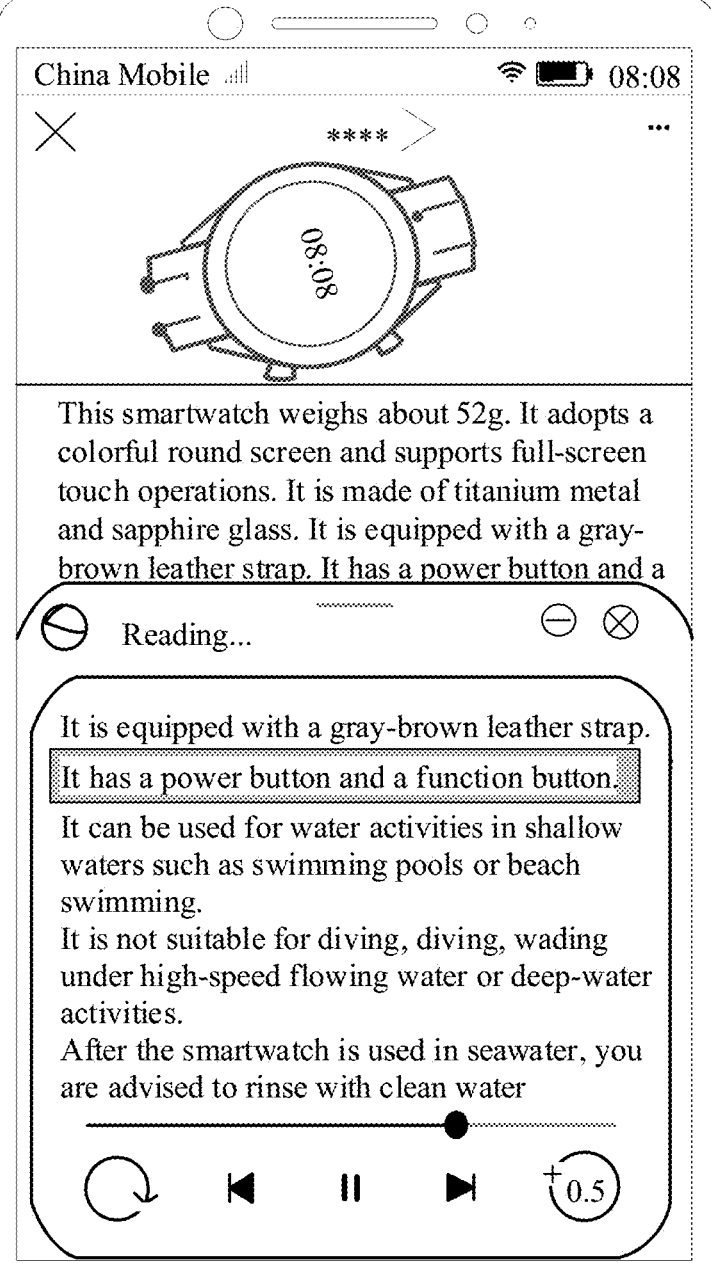
Figure 13A:
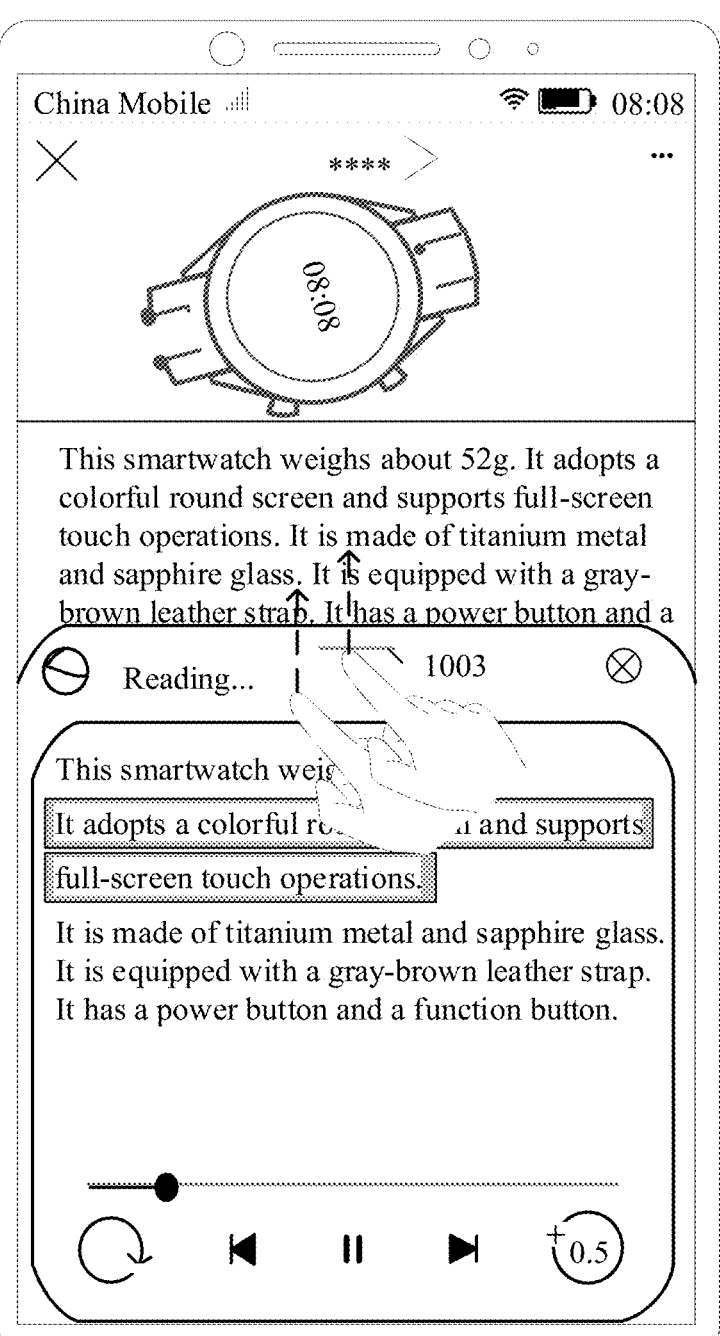
Figure 13A:
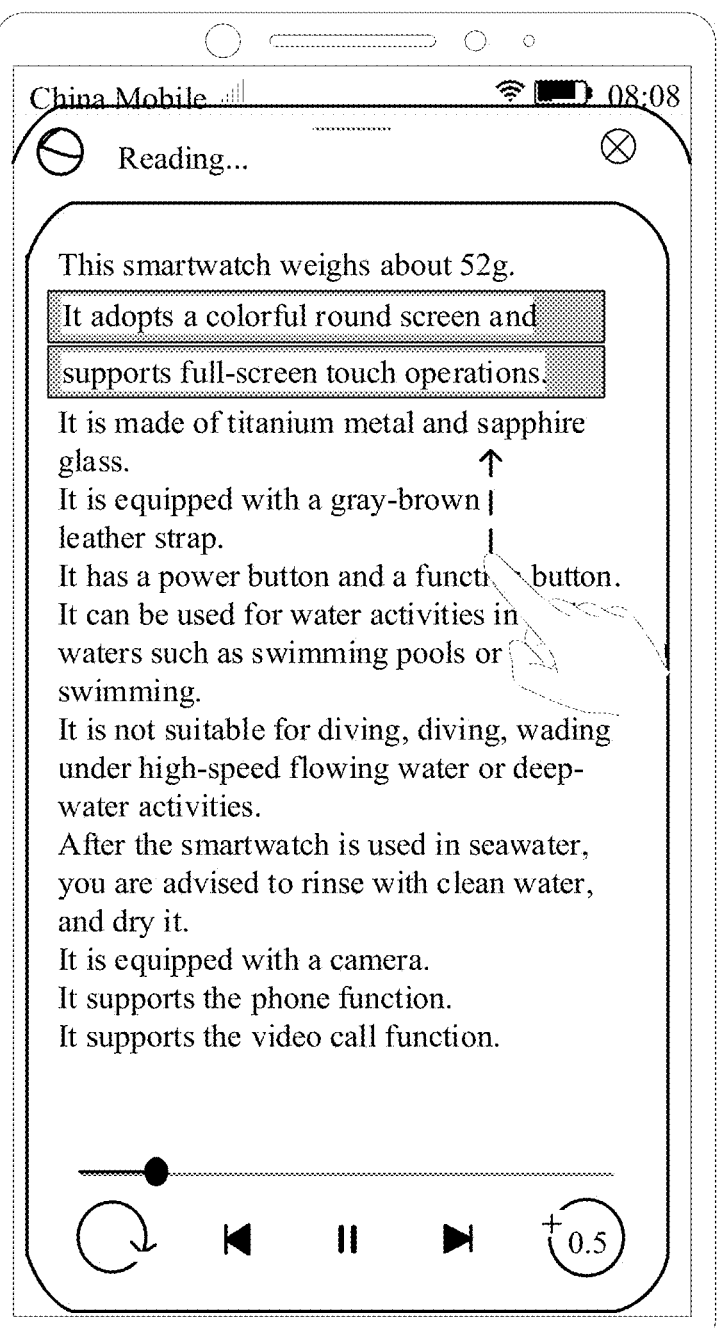
Figure 13A:
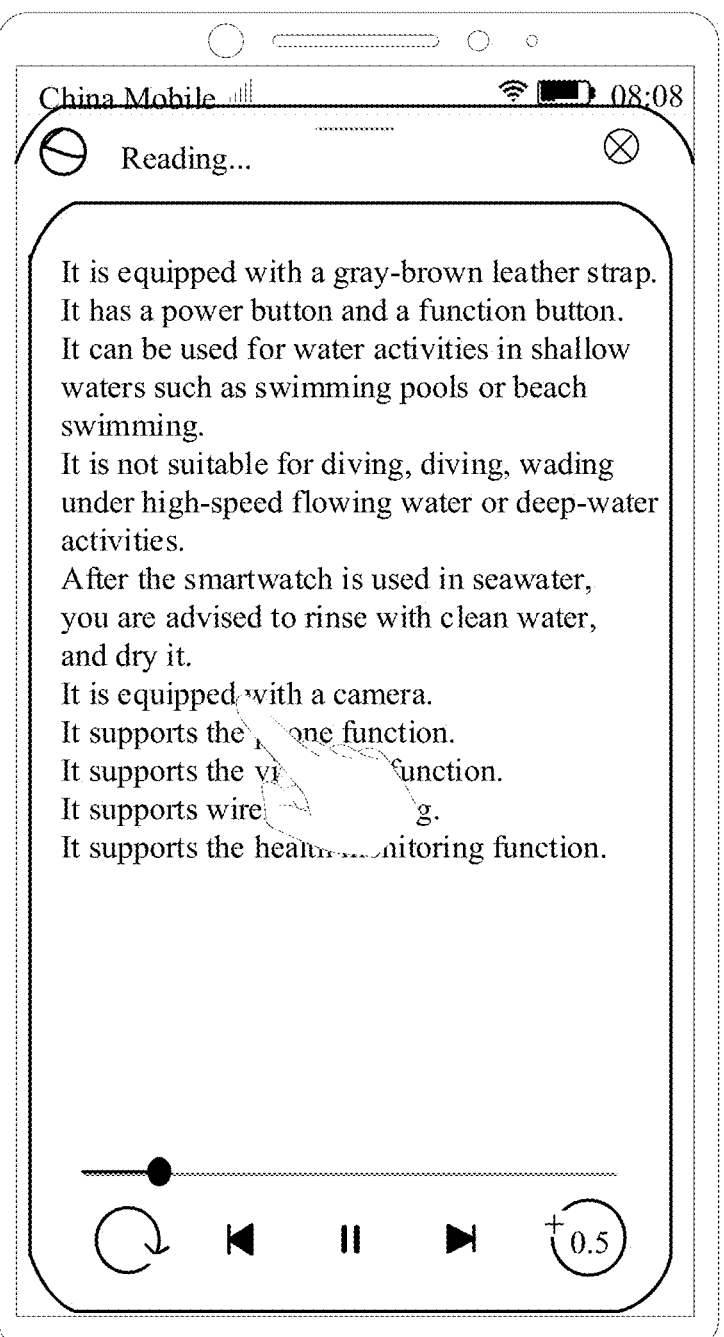
Figure 13A:
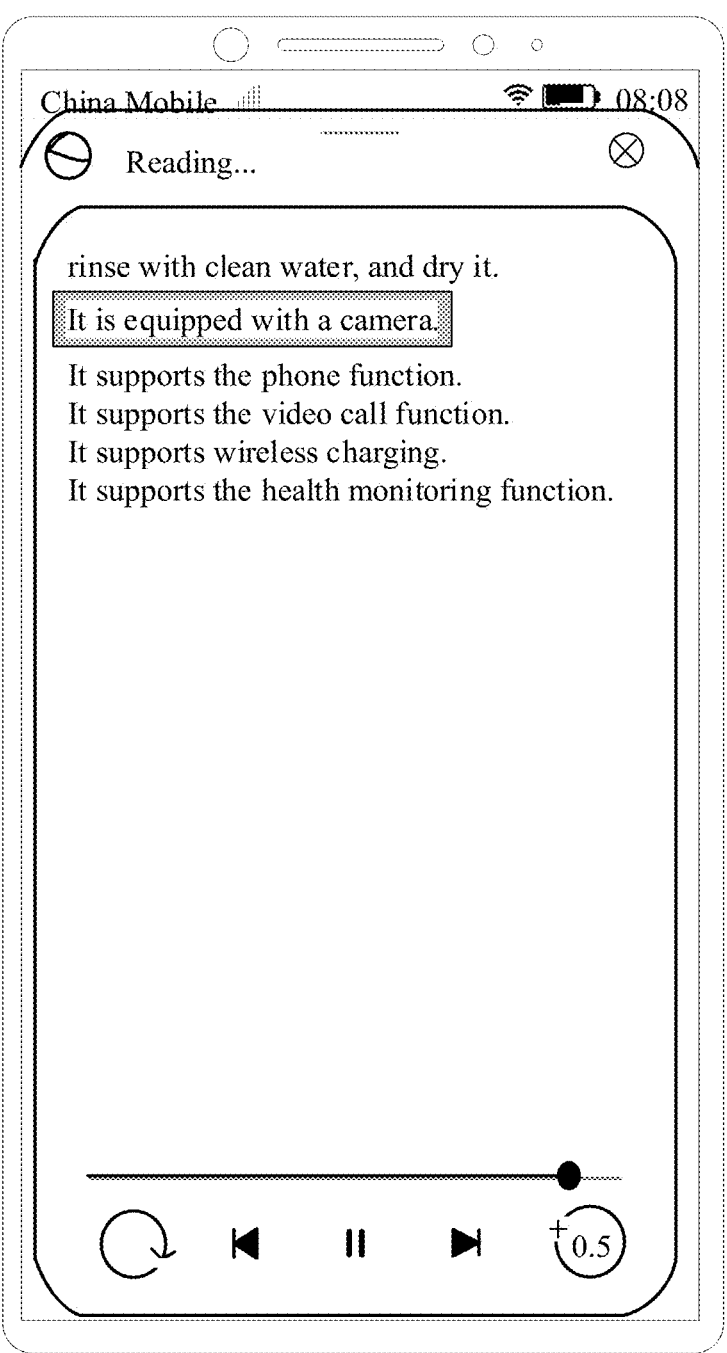
Figure 13A:
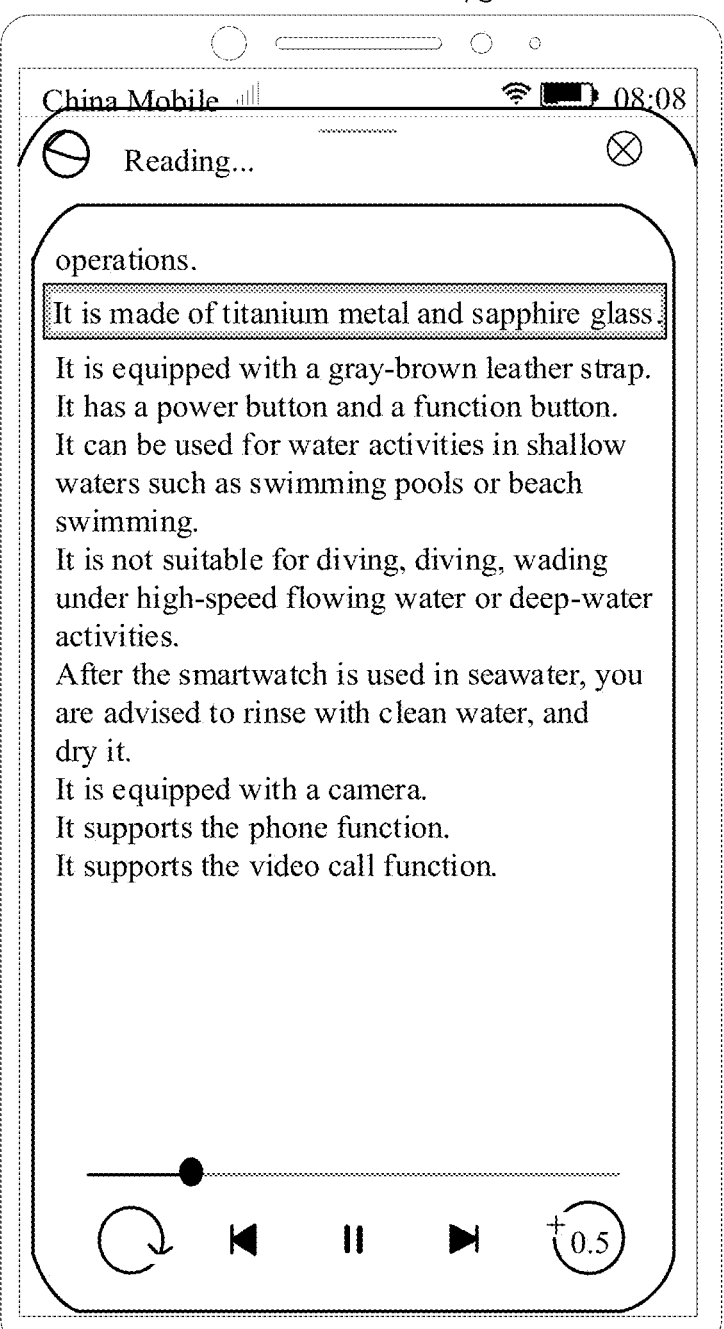
Figure 13B:
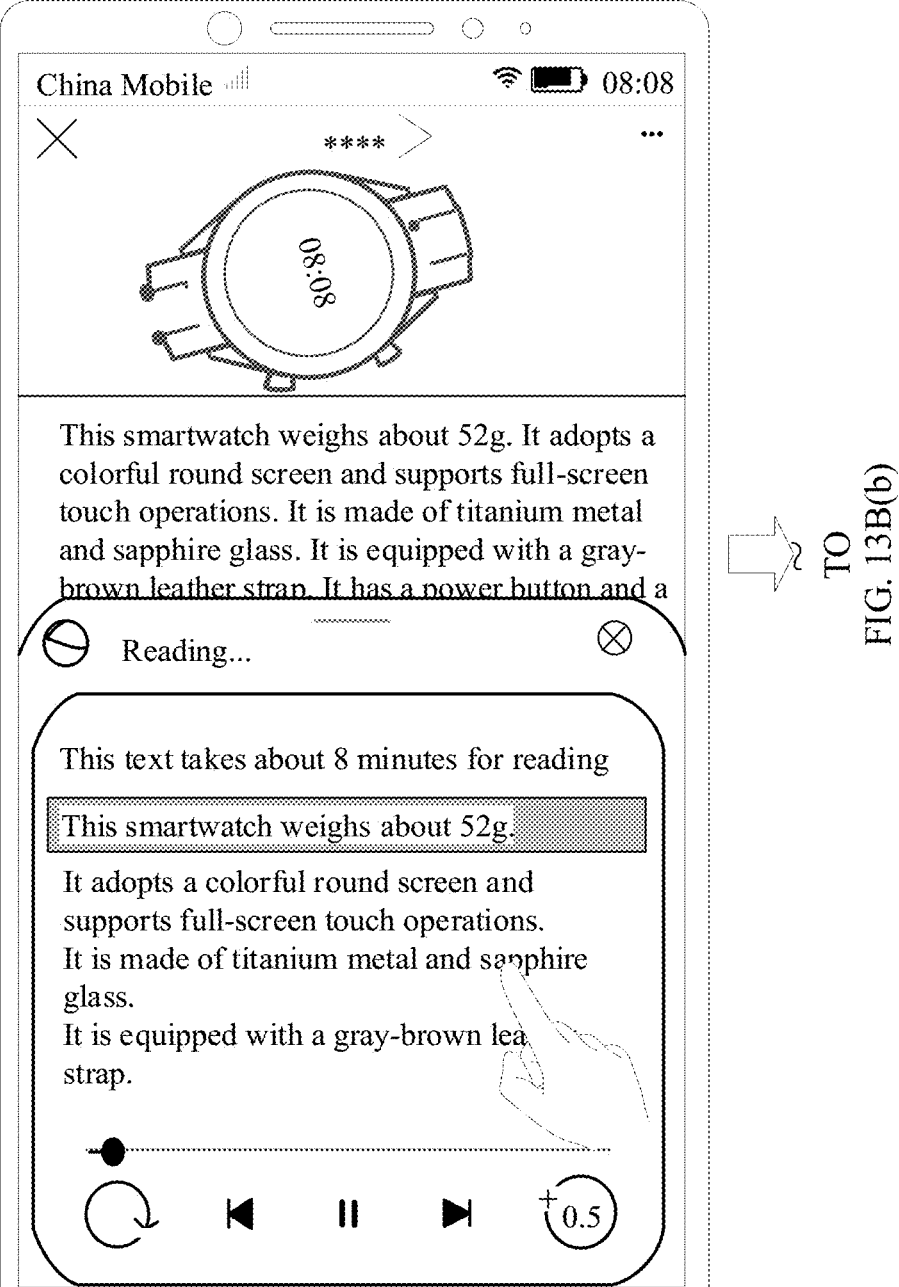
Figure 13B:
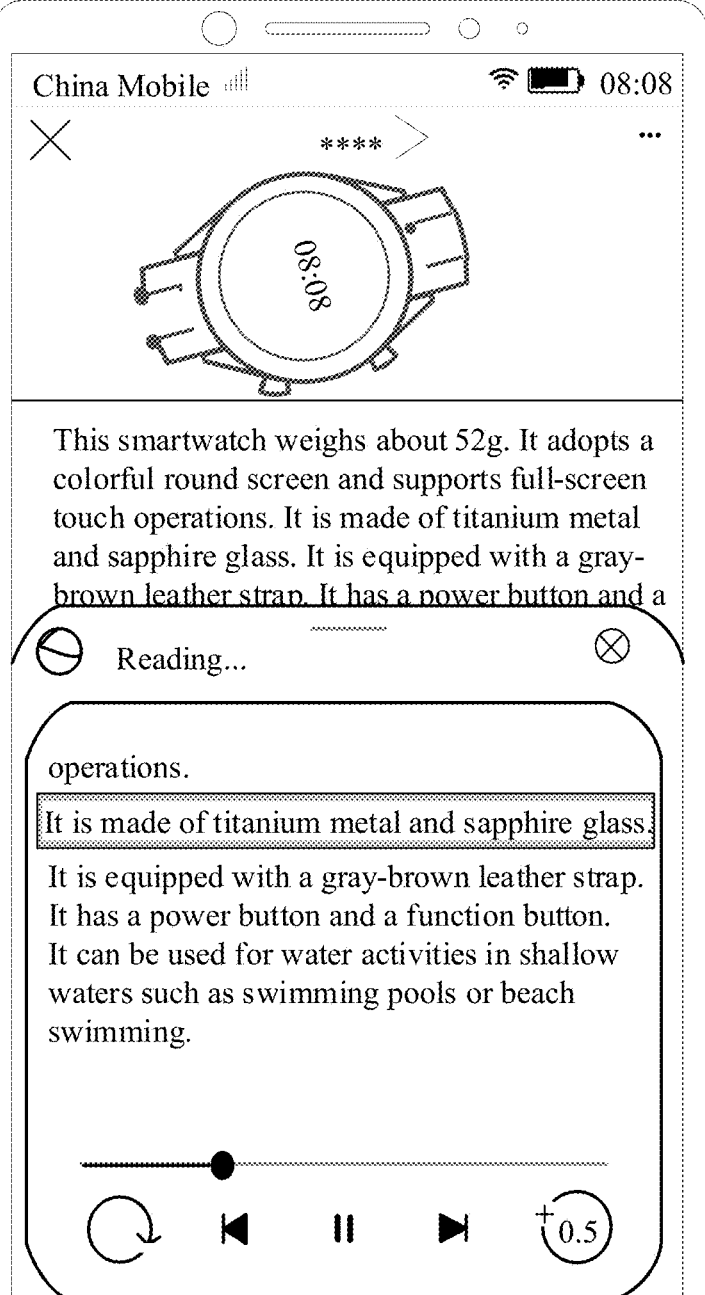
Figure 14:
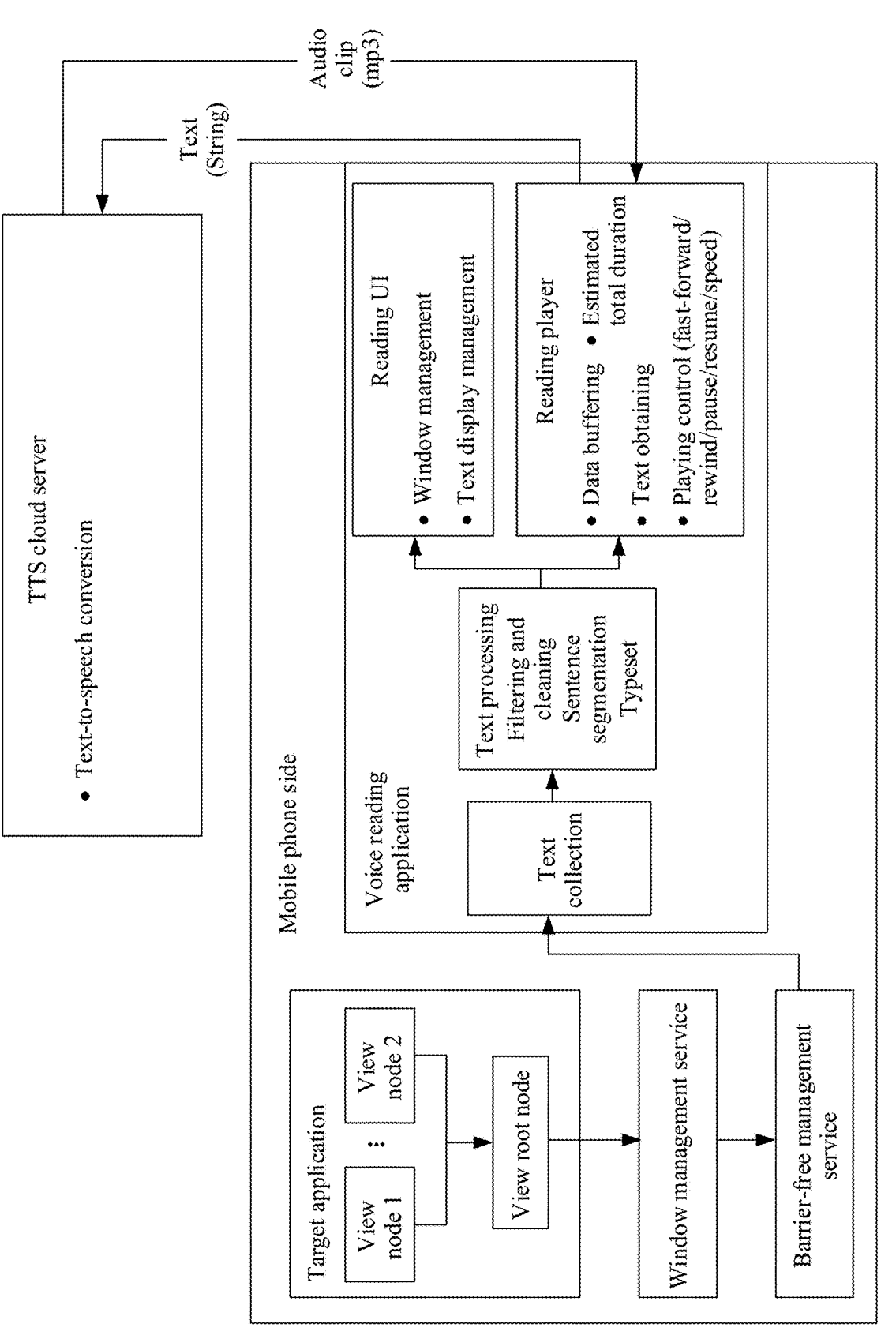
Figure 15:
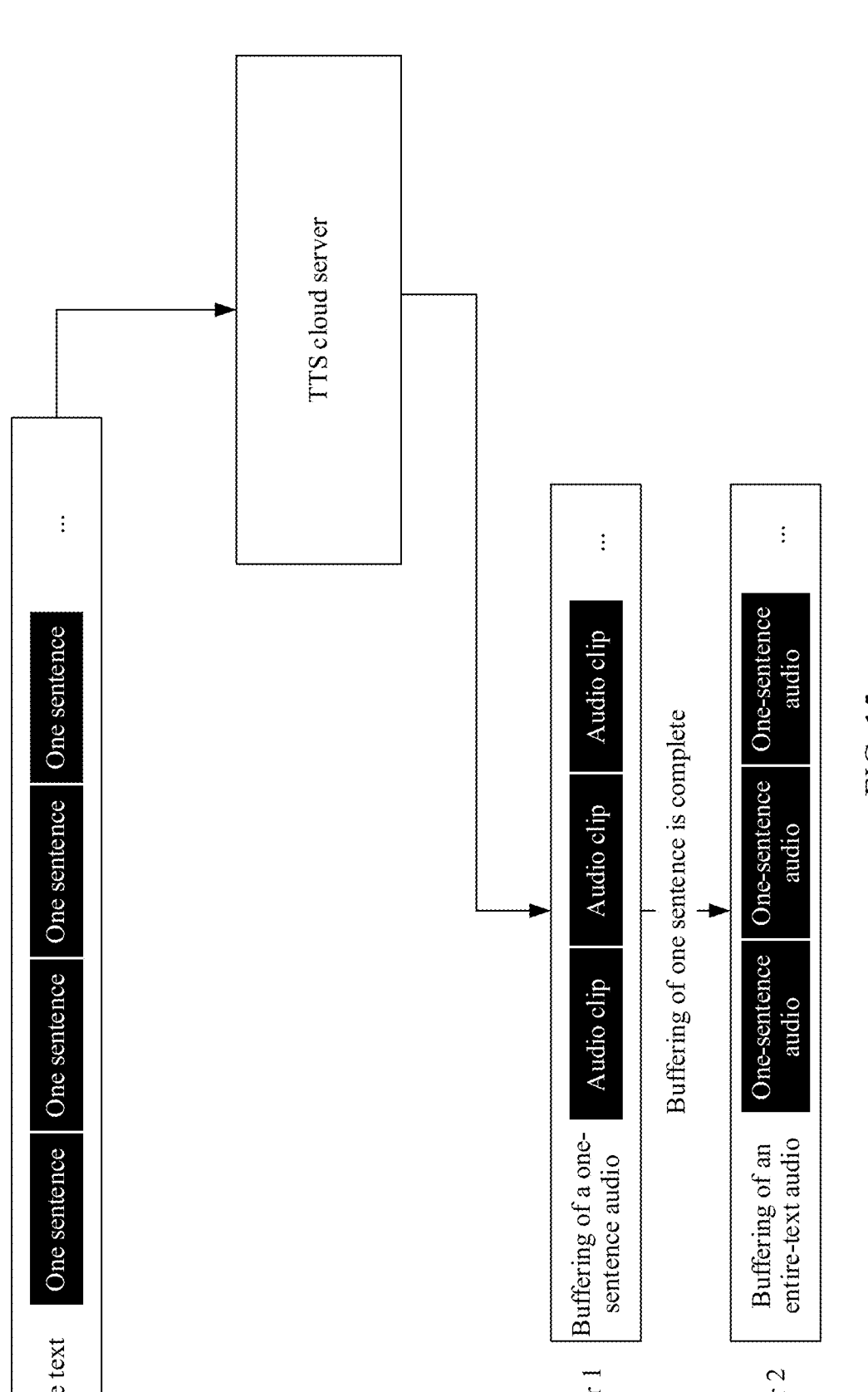
Figure 18:
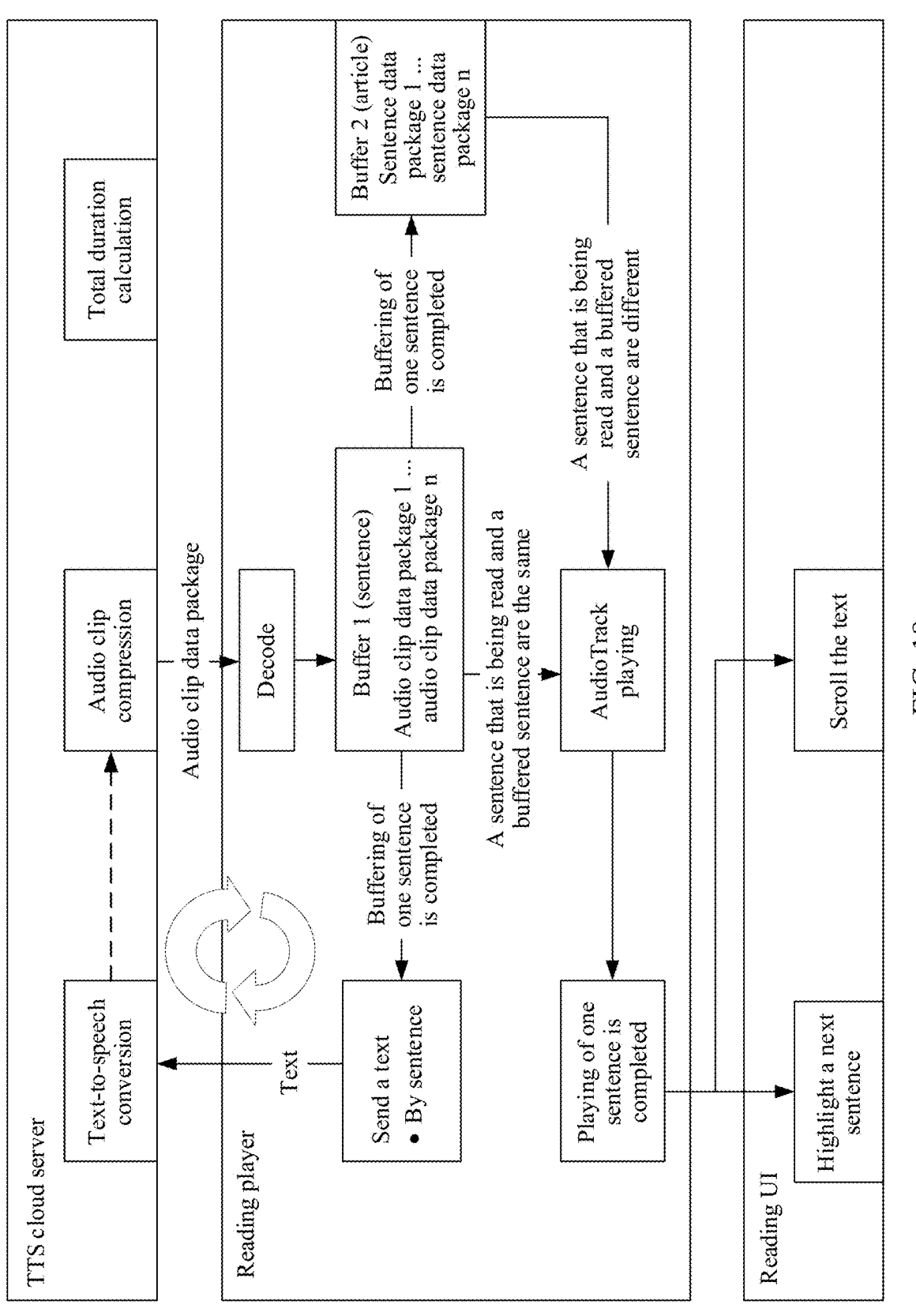
Figure 19:
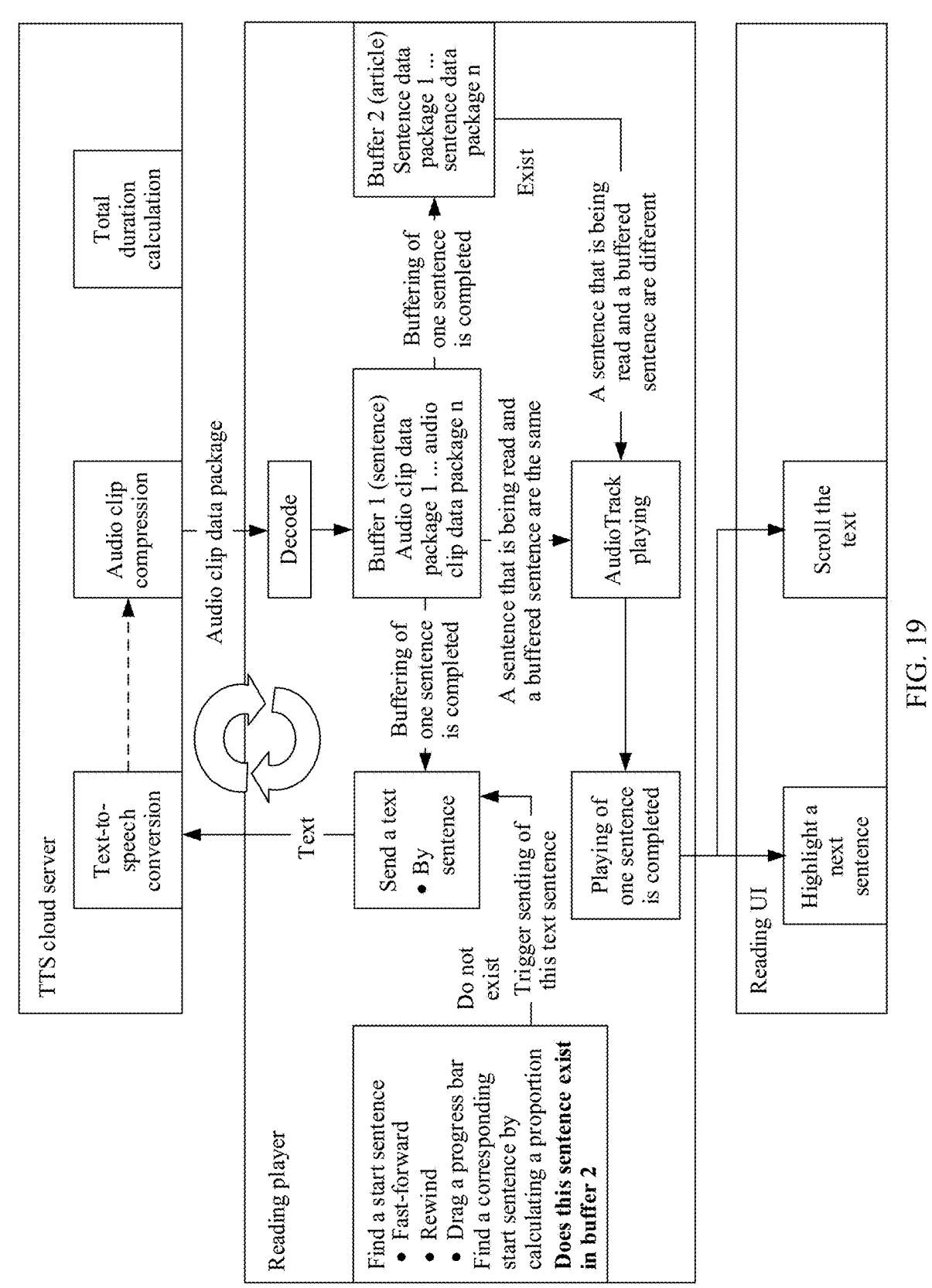
Figure 20A:
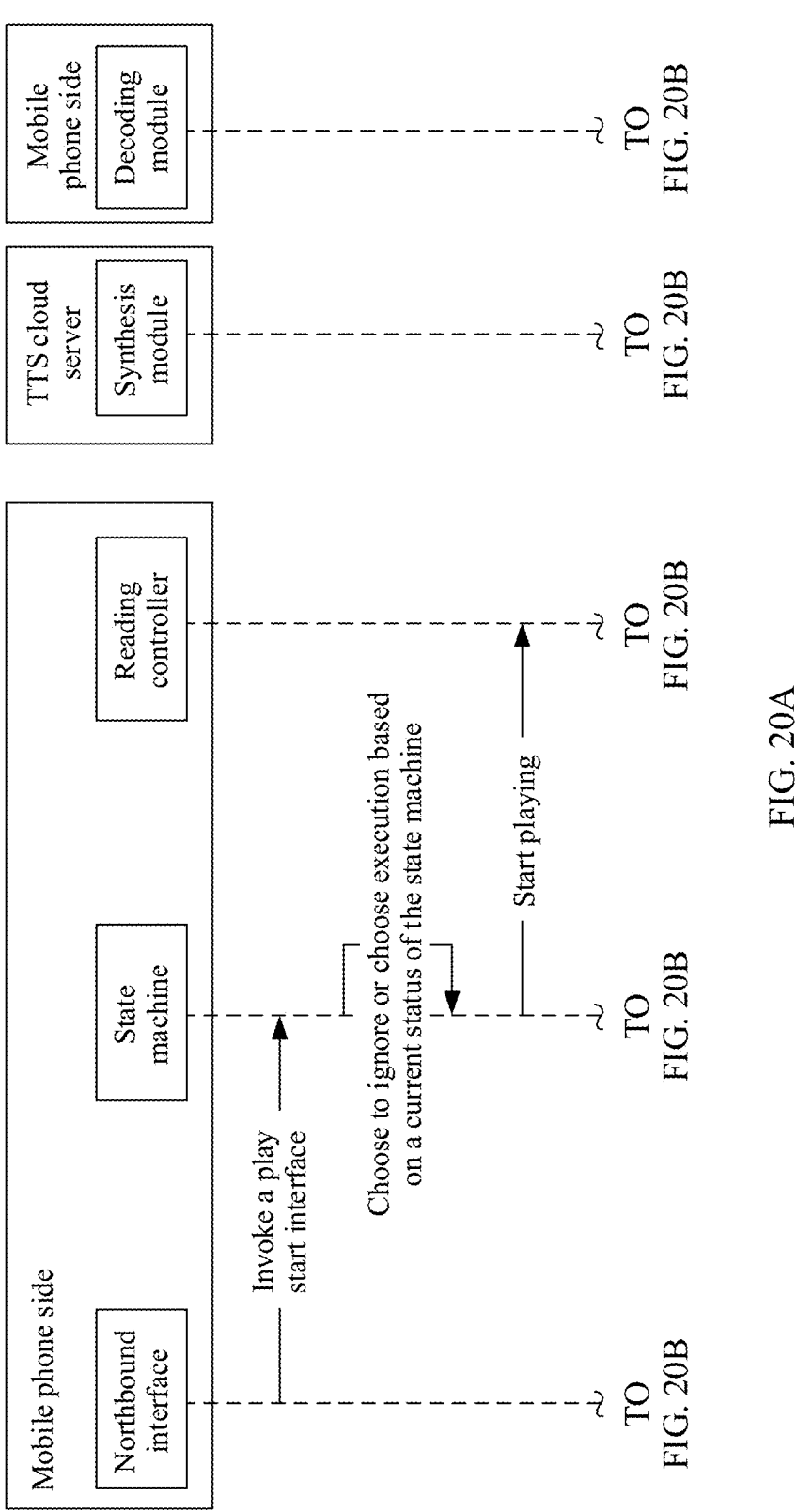
Figure 20B:
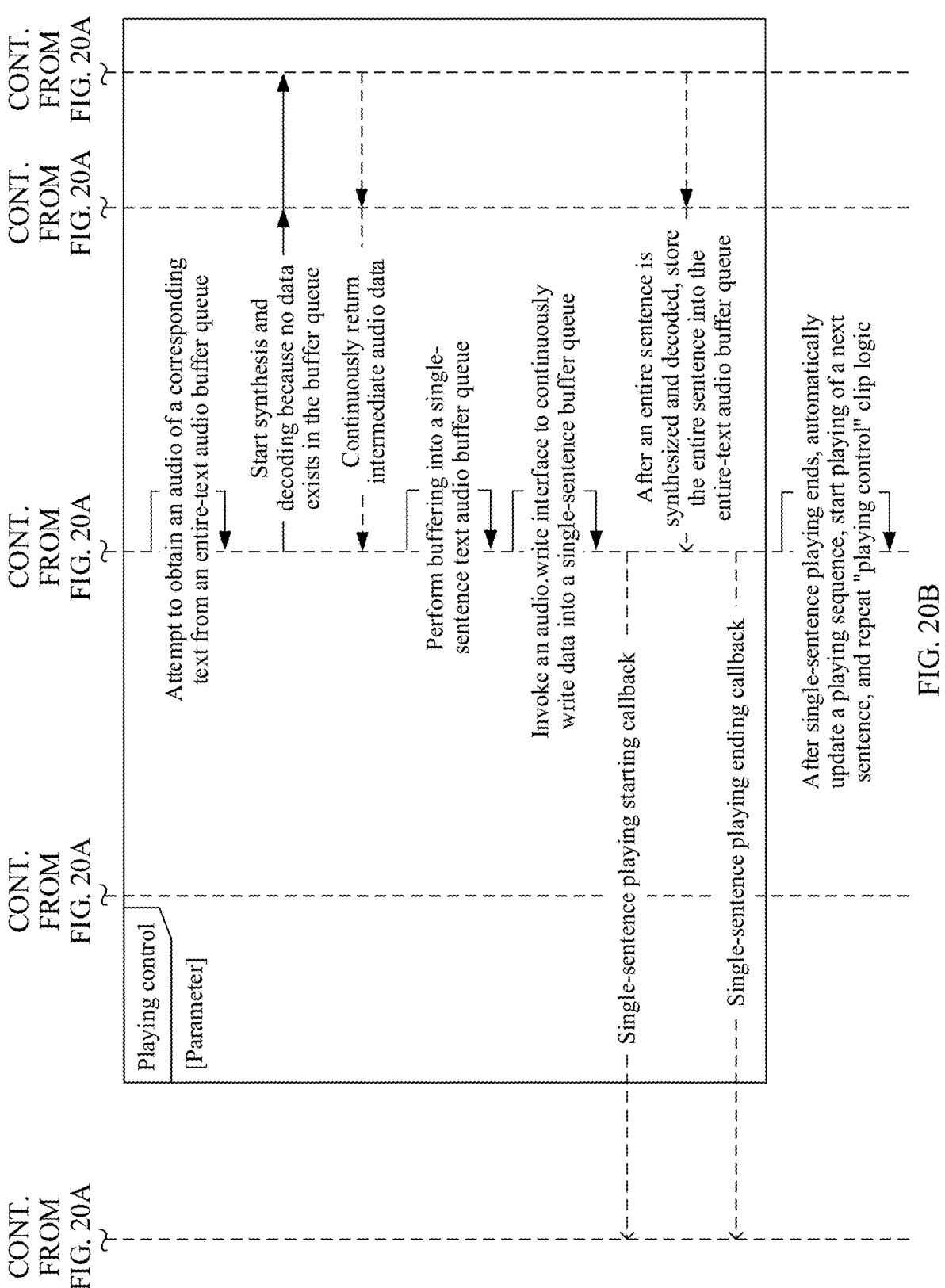
Figure 22:
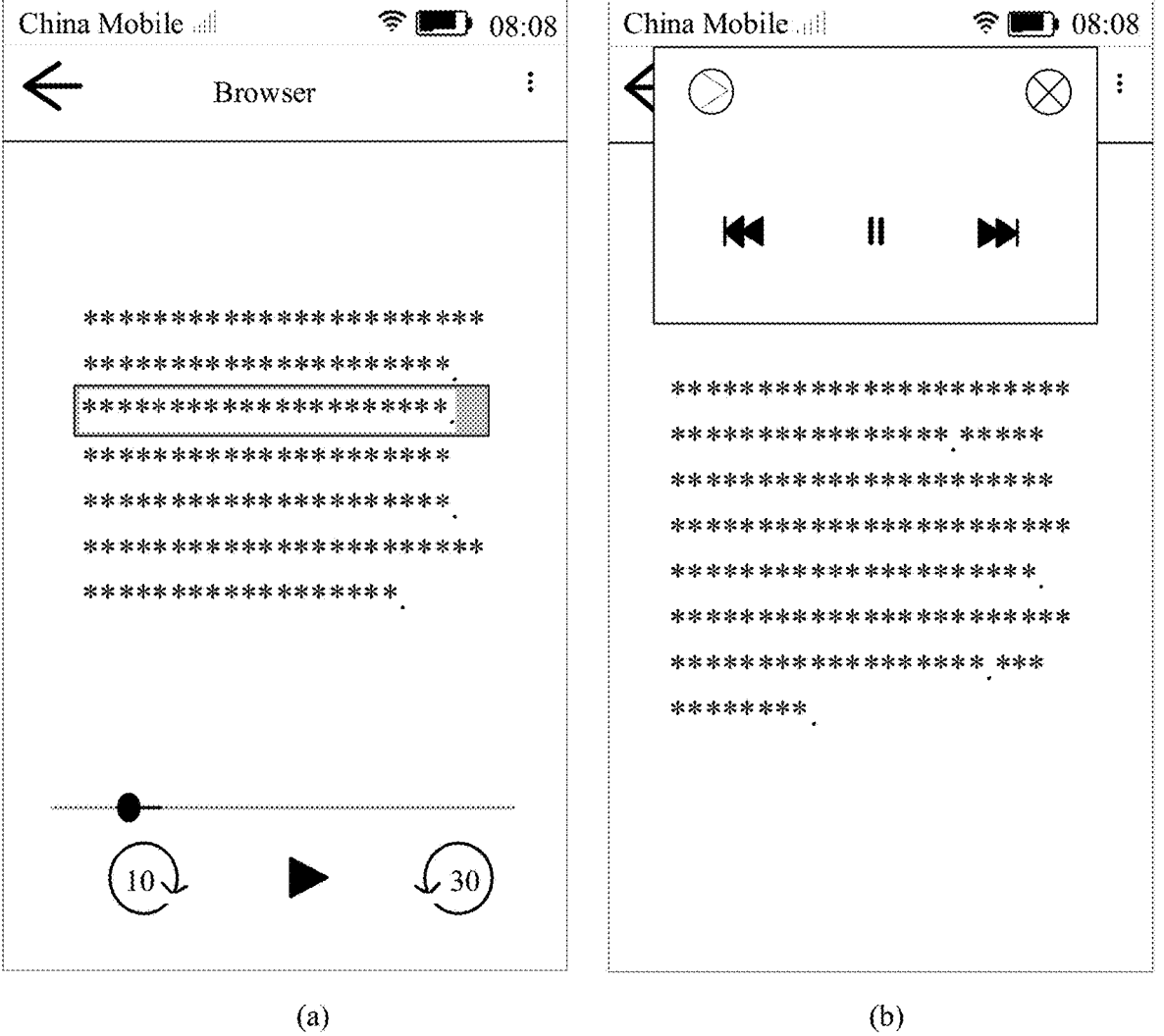
Figure 23:
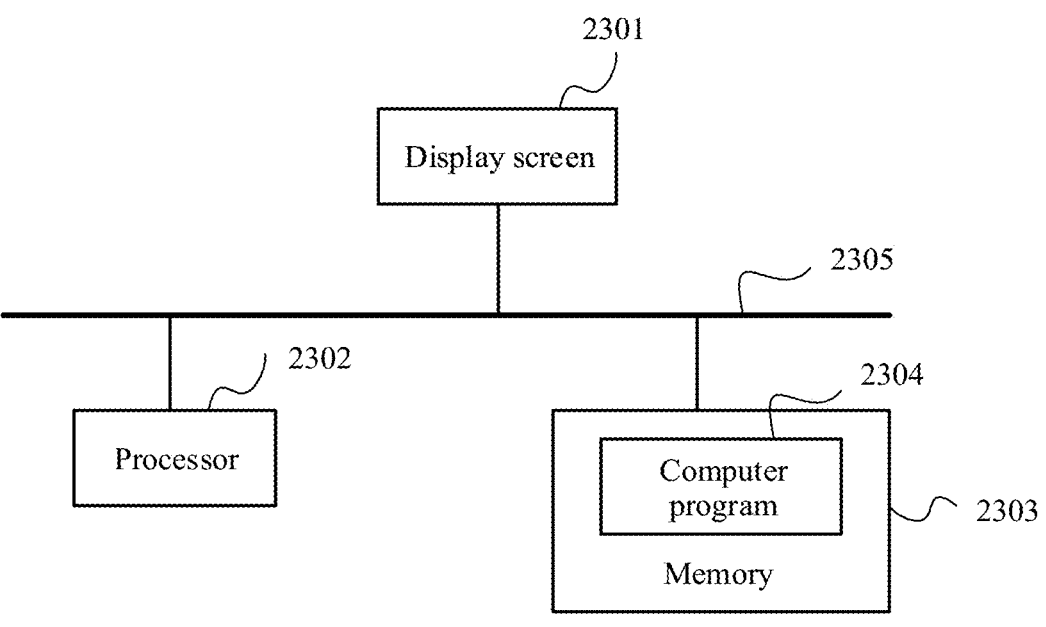

FIG. 8B(a) and FIG. 8B(b) are schematic diagrams of another group of interfaces according to an embodiment of this application;

FIG. 8C(a) and FIG. 8C(b) are schematic diagrams of another group of interfaces according to an embodiment of this application;

FIG. 8D(a) and FIG. 8D(b) are schematic diagrams of another group of interfaces according to an embodiment of this application;

FIG. 8E is a schematic diagram of dragging a drag point according to an embodiment of this application;

FIG. 9A(a) and FIG. 9A(b) are schematic diagrams of another group of interfaces according to an embodiment of this application;

FIG. 9B(a) and FIG. 9B(b) are schematic diagrams of another group of interfaces according to an embodiment of this application;

FIG. 9C(a) to FIG. 9C(d) are schematic diagrams of another group of interfaces according to an embodiment of this application;

FIG. 10($a$) to FIG. 10($c$) are schematic diagrams of another group of interfaces according to an embodiment of this application;

FIG. 11($a$) to FIG. 11($c$) are schematic diagrams of another group of interfaces according to an embodiment of this application;

FIG. 12($a$) and FIG. 12($b$) are schematic diagrams of another group of interfaces according to an embodiment of this application;

FIG. 13A(a) to FIG. 13A(f) are schematic diagrams of another group of interfaces according to an embodiment of this application;

FIG. 13B(a) and FIG. 13B(b) are schematic diagrams of another group of interfaces according to an embodiment of this application;

FIG. 14 is a schematic diagram of module interaction according to an embodiment of this application;

FIG. 15 is a schematic diagram of a type of buffering according to an embodiment of this application;

FIG. 16 is a schematic diagram of another type of buffering according to an embodiment of this application;

FIG. 17 is a schematic diagram of another type of buffering according to an embodiment of this application;

FIG. 18 is a logical block diagram of text reading according to an embodiment of this application;

FIG. 19 is a logical block diagram of another text reading according to an embodiment of this application;

FIG. 20A and FIG. 20B are a module interaction sequence diagram according to an embodiment of this application;

FIG. 21 is a flowchart of a reading method according to an embodiment of this application;

FIG. 22 is an interface diagram of another text reading solution according to an embodiment of this application; and FIG. 23 is a schematic diagram of a structure of another electronic device according to an embodiment of this application.

DESCRIPTION OF EMBODIMENTS

The following describes technical solutions in embodiments of this application with reference to accompanying drawings in embodiments of this application. In the descriptions in embodiments of this application, unless otherwise specified, "/" means "or". For example, A/B may represent A or B. In this specification, "and/or" is merely an association relationship for describing associated objects and represents that three relationships may exist. For example, A and/or B may represent the following three cases: only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly indicate that one or more features are included. In the description of embodiments, unless otherwise specified, "a plurality of" means two or more.

In embodiments of this application, the word "example", "for example", or the like is used to represent giving an example, an illustration, or a description. Any embodiment or design scheme described as "example" or "for example" in embodiments of this application shall not be construed as being more preferred or having more advantages than another embodiment or design scheme. Exactly, use of the term "example", "for example", or the like is intended to present a relative concept in a specific manner.

For a pain point of inconvenience for people to read an article on an electronic device in some scenarios, an embodiment of this application provides a text reading method, so as to convert text in a user interface of an electronic device into audio data for reading, and further to prompt a user in real time with a location at which reading content is located. In addition, a reading sentence can be switched at any time based on an instruction of the user.

For example, the electronic device may be a mobile terminal, such as a mobile phone, a tablet computer, a wearable device (for example, a smart watch), a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
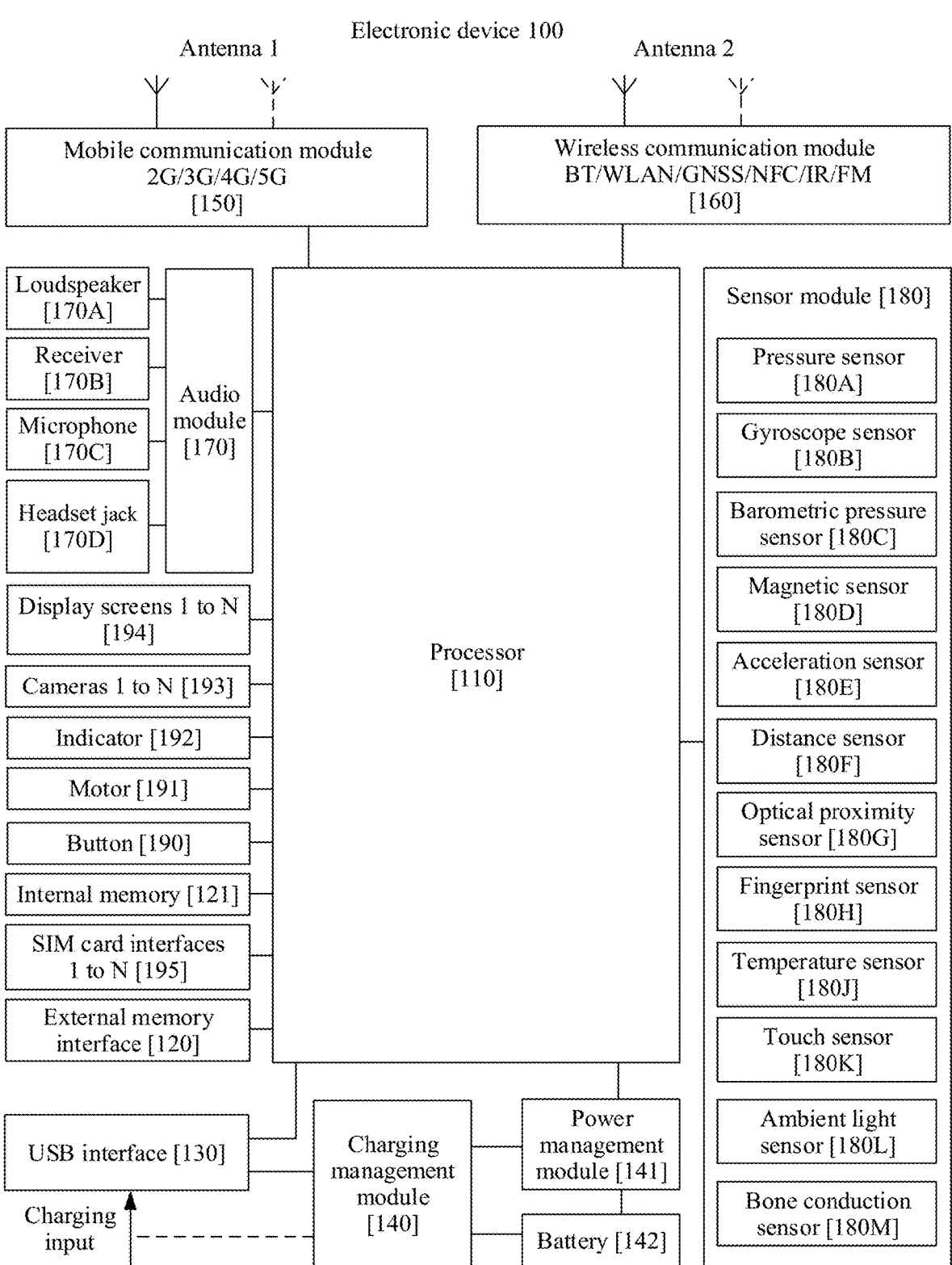
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 160, a loudspeaker 160A, a receiver 160B, a microphone 160C, a headset jack 160D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control on instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or data again, the processor 110 may directly invoke the instructions or data from the memory. This avoids repeated access, reduces a waiting time of the processor 110, and improves system efficiency.

In some embodiments, the antenna 1 of the electronic device 100 is coupled to the mobile communication module 150, and the antenna 2 is coupled to the wireless communication module 160, so that the electronic device 100 can communicate with other devices such as a network and a text-to-speech (text to speech, TTS) technology cloud server by using a wireless communication technology. Therefore, the electronic device 100 may send a text to the TTS cloud server, and obtain, from the TTS cloud server, audio data converted from the text.

The electronic device 100 implements a display function by using the GPU, the display screen 194, the application processor, and the like. The GPU is a microprocessor for graphics processing, and is connected to the display screen 194 and the application processor. The GPU is configured to perform mathematical and geometric calculations, and render images. The processor 110 may include one or more GPUs, and the GPUs execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), and the like. In some embodiments, the electronic device 100 may include one or N display screens 194, where N is a positive integer greater than 1. For example, the display screen 194 may be configured to display an application interface, display a reading control panel, and display a reading control card, and the like.

An internal memory 121 may be configured to store computer executable program code, and the executable program code includes instructions. The processor 110 runs the instructions stored in the internal memory 121, to perform various functional applications and data processing of the electronic device 100. The internal memory 121 may include a program storage area and a data storage area. The program storage area may store an operating system, an application required by at least one function (for example, a sound playing function, an image playing function), and the like. The data storage area may store data (for example, audio data, a phone book) created in a process of using the electronic device 100, and the like. In addition, the internal memory 121 may include a high speed random access memory, and may further include a non-volatile memory, for example, at least one magnetic disk storage device, a flash memory device, a universal flash storage (universal flash storage, UFS), and the like.

The electronic device 100 may implement an audio function, through the audio module 160, the loudspeaker 160A, the receiver 160B, the microphone 160C, the headset jack 160D, the application processor, and the like. For example, music playing, recording, and the like.

The audio module 160 is configured to convert digital audio information into an analog audio signal output, and is also configured to convert an analog audio input into a digital audio signal. The audio module 160 may be further configured to encode and decode an audio signal. In some embodiments, the audio module 160 may be disposed in the processor 110, or a part of functional modules in the audio module 160 is disposed in the processor 110. For example, the audio module 160 may obtain a voice instruction of the user, and read the text to the user.

The loudspeaker 160A, also referred to as a "speaker", is configured to convert an audio electrical signal into a sound signal. The electronic device 100 may listen to music or answer a hands-free call through the loudspeaker 160A.

The receiver 160B, also referred to as an "earpiece", is configured to convert an audio electrical signal into a sound signal. When a call is answered or voice information is received by the electronic device 100, the receiver 160B may be put close to a human ear to listen to a voice.

The microphone 160C, also referred to as a "mike" or a "mic", is configured to convert a sound signal into an electrical signal. When making a call or sending voice information, the user may make a sound by putting a mouth of the user close to the microphone 160C, to input a sound signal to the microphone 160C. At least one microphone 160C may be disposed in the electronic device 100. In some other embodiments, two microphones 160C may be disposed in the electronic device 100, not only to collect a sound signal, but also to implement a noise reduction function. In some other embodiments, three, four, or more microphones 160C may further be disposed in the electronic device 100, to implement functions, such as collecting a sound signal, noise reduction, and recognizing a sound source, a directional recording, and the like.

The touch sensor 180K is also referred to as a "touch panel". The touch sensor 180K may be disposed on the display screen 194. The touch sensor 180K and the display screen 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. A visual output related to the touch operation may be provided through the display screen 194. In some other embodiments, the touch sensor 180K may further be disposed on a surface of the electronic device 100 and at a location different from that of the display screen 194. For example, the touchscreen may detect a touch operation of the user, so as to trigger the mobile phone to enable a text reading function or perform reading control.

It may be understood that the structure shown in embodiments of this application does not constitute a specific limitation on the electronic device 100. In some other embodiments of this application, the electronic device 100 may include more or fewer components than those shown in the figures, some components may be combined, or some components may be split, or different component arrangements may be used. The components shown in the figures may be implemented by hardware, software, or a combination of software and hardware.

In embodiments of this application, the display screen 194 may display an interface of a target application, and the processor 110 controls, by running the instructions stored in the internal memory 121, the audio module 160 to play audio data corresponding to the currently displayed text in the interface of the target application, to implement the text reading function. The display screen 194 may further display a reading control panel and the like, so as to help the user interact and control playing. In addition, the processor 110 may control, in response to a touch operation performed by the user on any sentence on the reading control panel, the electronic device 100 to read downward from the sentence. In addition, with a change of a playing progress such as fast-forward, rewind, the reading control panel may highlight a sentence that is currently being read in real time. Therefore, user experience is relatively high.

The following describes the text reading method provided in an embodiment of this application by using an example in which the electronic device is a mobile phone having a structure shown in FIG. 1. As shown in FIG. 2, the method may include the following steps.

201: The mobile phone enables a text reading function.

When a user wants the mobile phone to read a text in a currently displayed user interface, the user may indicate the mobile phone to enable the text reading function, so as to read the text in the user interface for the user. The text reading function may have a specific name, for example, Xiaoyi Reading. A user interface that the user wants the mobile phone to read may be referred to as a first user interface. In the following embodiments, the user interface may be referred to as an interface for short.

It may be understood that any user interface displayed on the mobile phone may correspond to a specific application on the mobile phone. For example, a desktop displayed on the mobile phone may also be understood as an interface of a desktop management application. That is, the first user interface is an interface of a specific target application. When the user wants the mobile phone to read the text in the currently displayed interface of the target application, the user may indicate the mobile phone to enable the text reading function.

In some embodiments of this application, the target application may be any application of the mobile phone, and may be specifically a local system application, or may be a third-party application. A specific type of the target application is not limited in this embodiment of this application. For example, the target application may be a novel application, a browser application, a news application, or the like. That is, the mobile phone may read text displayed in any application interface, and may read content seen by the user based on any application interface. That is, the mobile phone may read a text in any user interface.

In some other embodiments, the target application is a preset first specific application, for example, an application related to an article, or an application usually with a relatively large amount of text content in an interface. For example, the target application may be a news application, an official account, Zhihu®, or the like. The mobile phone may read a preset text in the user interface of the first specific application.

In some other embodiments, the target application is an application other than a preset second specific application. For example, an application blacklist is set in the mobile phone, the blacklist includes the second specific application (for example, a financial application that is not suitable for reading), and an interface of the second specific application is not allowed to be read. The mobile phone may read a text in a user interface of another application other than the second specific application.

In some other embodiments, the mobile phone may read a text in a user interface that meets a preset rule. Specific content of the preset rule is not limited in this embodiment of this application. For example, the preset rule includes: an amount of the text in the user interface is greater than or equal to a preset value.

In the following embodiments, the user interface of the target application may also be referred to as an interface of the target application or an application interface for short.

The mobile phone may enable the text reading function in a plurality of manners. For example, the mobile phone may enable the text reading function in response to a voice instruction of the user. For example, with reference to FIG. 3, after detecting the voice instruction "Xiaoyi" of the user, the mobile phone wakes up a voice assistant; and then after detecting the voice instruction "read" of the user, the voice assistant wakes up a reading module to enable the text reading function. Specific content of the voice instruction of enabling the text reading function by the user is not limited in this embodiment of this application.

Figure 4:
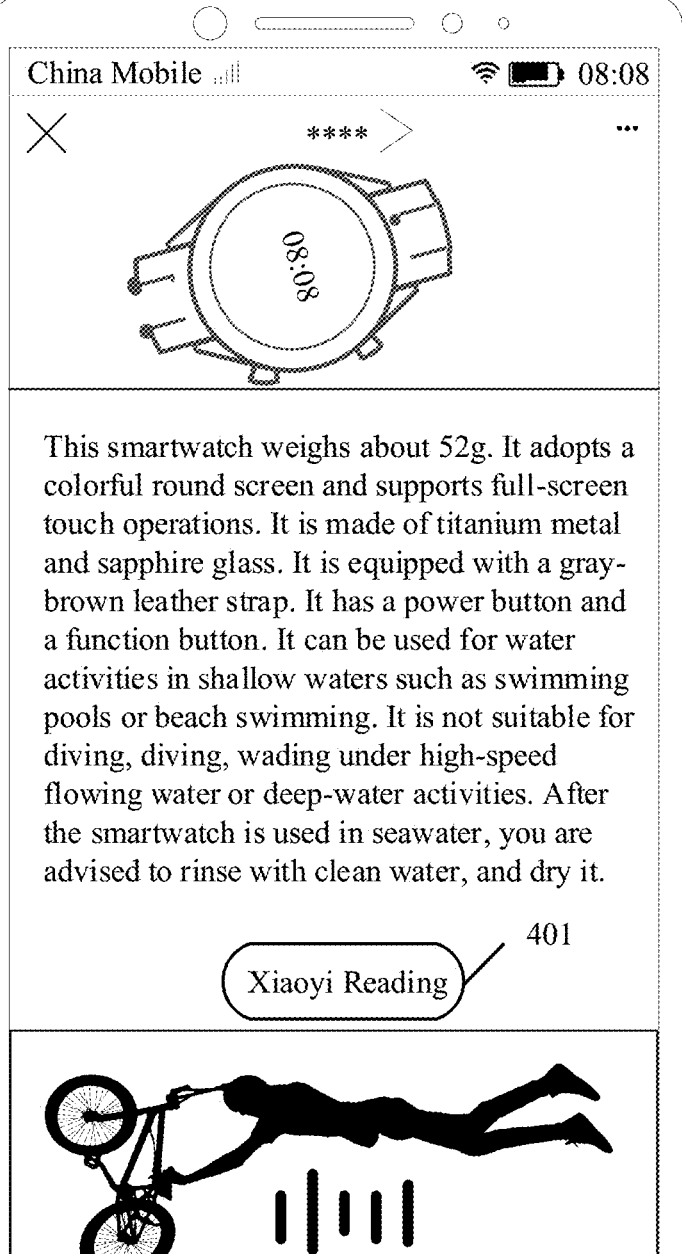
FIG. 4 is a schematic diagram of another interface according to an embodiment of this application.

For another example, the mobile phone may display a reading control in the application interface, and the mobile phone may enable the text reading function in response to an operation performed by the user on the reading control. The reading control is configured to prompt the user that the mobile phone may be used to read the text in the interface, and help the user quickly enable the text reading function by using the control. In some embodiments, the mobile phone displays a reading floating ball in the application interface, and the reading floating ball is the reading control. After detecting an operation of tapping the reading floating ball by the user, the mobile phone enables the text reading function. In some other embodiments, the mobile phone displays, in an interface of the first specific application that may perform text reading, a reading control 401 in a capsule form as shown in FIG. 4.

For another example, the mobile phone displays the reading control in the application interface only after detecting a voice instruction preset by the user. In response to an operation of the user on the reading control, the mobile phone enables the text reading function.

For another example, after enabling a HiTouch function (for example, enabling the HiTouch function after detecting a long press operation performed by a user in the application interface), the mobile phone may display the reading control in the interface. The mobile phone enables the text reading function in response to an operation of the user on the reading control.

For another example, after detecting a shortcut gesture (for example, a three-finger pull-down gesture or an air gesture) preset by the user, the mobile phone enables the text reading function.

It should be noted that the mobile phone may further enable the text reading function in response to an operation such as another touch operation, a voice instruction, or a gesture of the user. A specific manner of triggering the mobile phone to enable the text reading function is not limited in this embodiment of this application. The user's operation of indicating the mobile phone to enable the text reading function may be referred to as a first operation.

In some embodiments, if a specific application does not support the text reading function, after detecting an operation that the user indicates to enable the function, the mobile phone may prompt the user that reading the interface or the text reading function is not supported by referring to examples in (a) and (b) in FIG. 5.

202: The mobile phone reads the text in the currently displayed application interface.

After enabling the text reading function, the mobile phone obtains the text in the currently displayed application interface, and reads the text for the user. For example, after enabling the text reading function, the mobile phone first obtains currently displayed interface content of the target application (that is, obtains first content of the first user interface). The interface content includes information about each view node in the interface, for example, information such as a text and a picture. Then, the mobile phone obtains the text in the application interface from the obtained interface content.

In some embodiments, that the mobile phone obtains the text in the application interface includes: obtaining a text part that has been loaded in the application interface (the loaded text may be content displayed on one screen, for example, content displayed on a current screen, or may be content displayed on more than one screen, for example, content of a subsequent page in addition to the content displayed on the current screen, which is not limited), where the text part does not include a text part that is currently not loaded in the application interface. If no refresh operation is performed, the text part not loaded is no longer obtained. In some other embodiments, that the mobile phone obtains the text in the application interface includes: obtaining a text part that has been loaded in the application interface, where the text part further includes a text part that is not previously loaded in the application interface and that is continuously obtained during reading.

Figure 6:
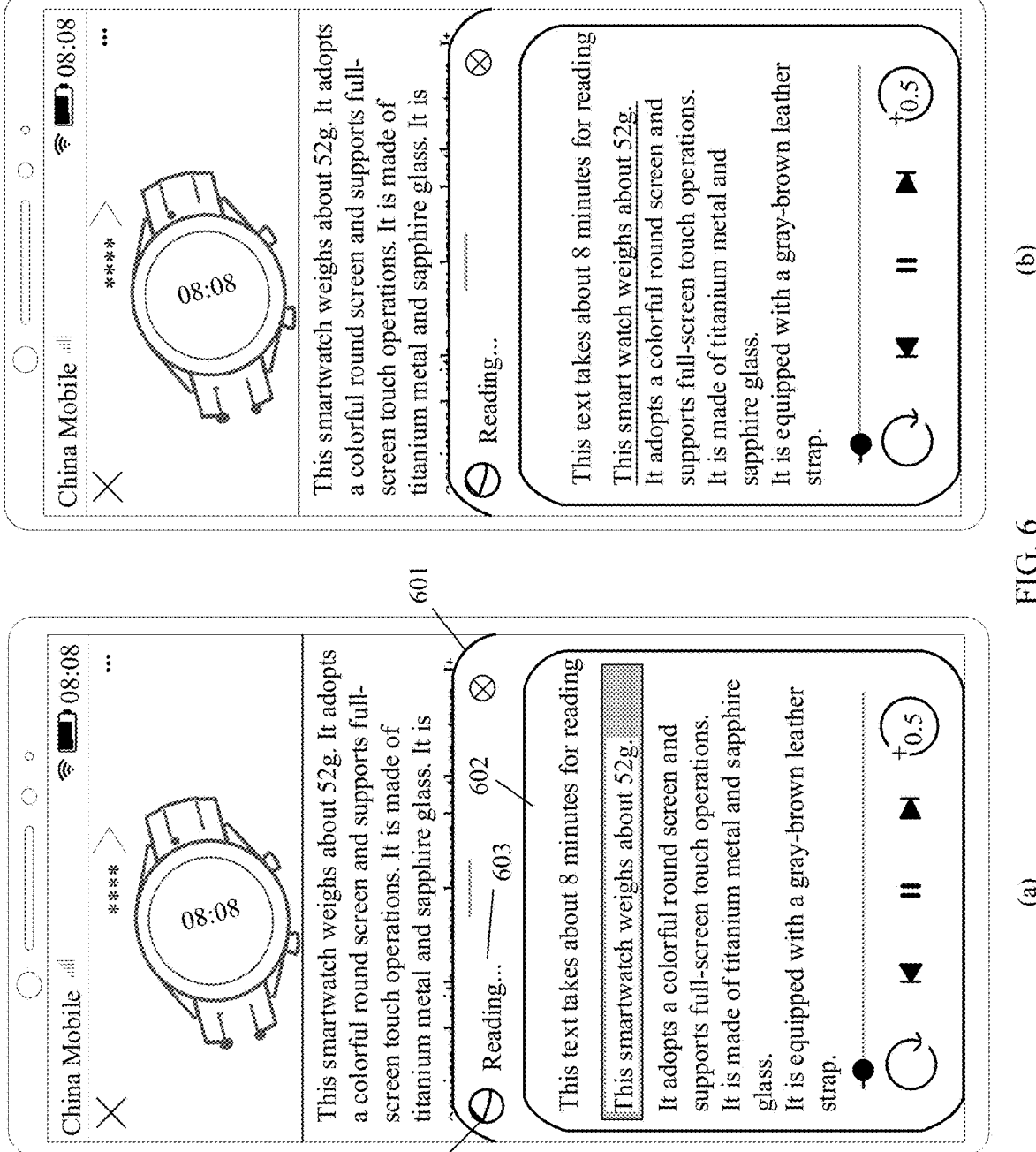
FIG. 6 is a schematic diagram of another interface according to an embodiment of this application.

After the mobile phone enables the text reading function, as shown in (a) in FIG. 6, a reading control panel 601 is superimposed on the application interface for display. In this case, the reading control panel displayed by the mobile phone may also be referred to as a second user interface. The second user interface is different from the first user interface corresponding to the application interface to be read, and the second user interface at least covers a part of a display area of the first user interface. In some embodiments, a window size of the reading control panel is less than a window size of the application interface, so that when displaying the reading control panel, the mobile phone may further help the user learn an application interface corresponding to a text that is currently being read and a target application. For example, after the mobile phone enables the text reading function, the reading control panel may be displayed in a half-screen manner. The reading control panel may be displayed on a lower half of the screen. The bottom of the reading control panel may be aligned with the bottom of the application interface. The reading control panel may be configured to interact with the user, so as to help the user view reading content or perform an operation such as reading control.

Figure 7:
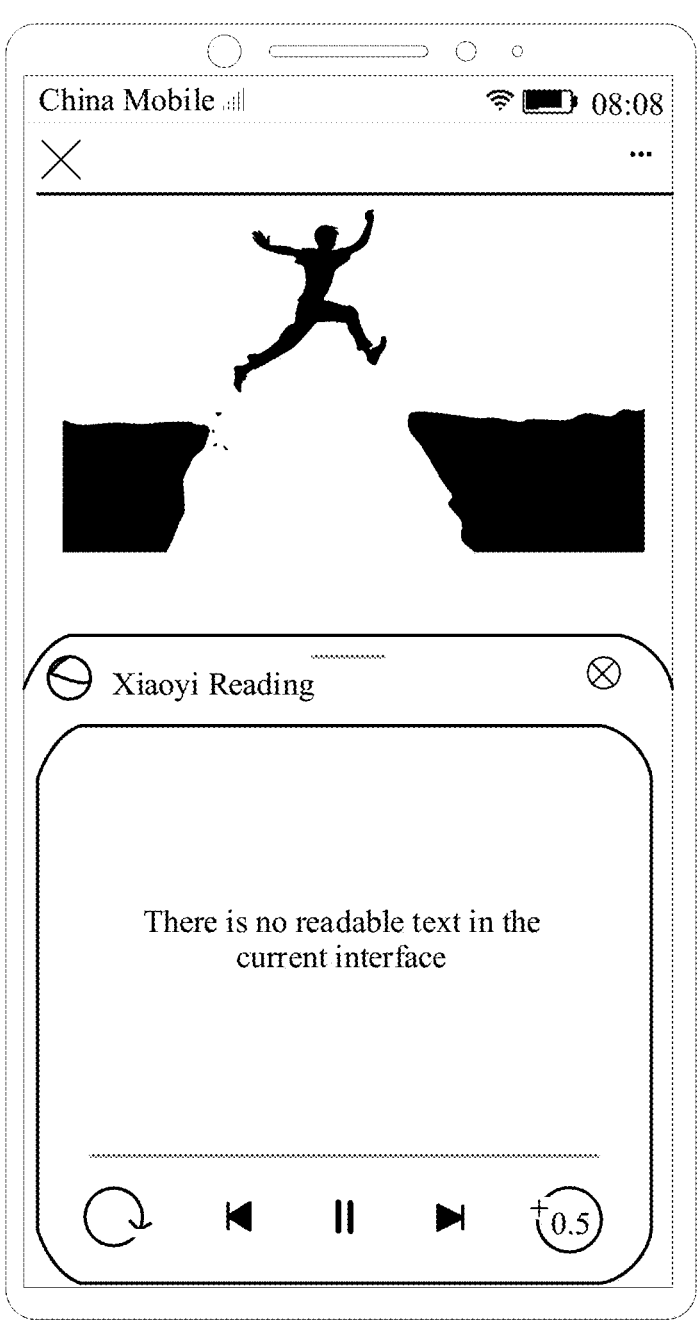
FIG. 7 is a schematic diagram of another interface according to an embodiment of this application.

After the mobile phone enables the text reading function, if there is no readable text in a current application interface, with reference to the example shown in FIG. 7, the mobile phone may prompt the user that there is no readable text in the current interface.

After the mobile phone enables the text reading function, if there is a readable text in a current application interface, the reading control panel 601 may display the text in the application interface, where the text may include one or more sentences. The text can be recognized by sentence, and one sentence is divided into one paragraph.

In some embodiments, after enabling the text reading function, the mobile phone may prompt, based on an amount of the readable text on the to-be-read application interface in a plurality of manners such as voice playing or text display, the user with estimated total duration for reading the text in the current application interface. For example, the mobile phone may display, on the reading control panel 601, total reading duration prompt information 602: "This text takes about less than one minute for reading", "This text takes about xx minutes for reading", "This text takes about more than 30 minutes for reading", or the like. In an implementation solution, the duration prompt information 602 may be displayed in the first row on the reading control panel, so that the user can quickly and intuitively learn the total duration required for the reading. During subsequent reading, the mobile phone may further prompt, on the reading control panel, the user with duration-related information such as read duration and/or remaining reading duration.

The mobile phone may further prompt the user with a current reading status in a plurality of manners such as voice playing or text display. For example, the reading control panel 601 may display reading status prompt information 603. The reading status prompt information 603 may include a reading state such as "reading" (or during reading), "reading paused", or "reading ended". After the mobile phone starts to read the text content in the application interface, the reading status is "reading".

In addition, the reading control panel may further include information such as an icon 604 for the text reading function and/or a name (for example, Xiaoyi Reading) of the text reading function.

In some embodiments, a sentence that is currently being read by the mobile phone may be displayed at a preset fixed location on the reading control panel 601, for example, may be displayed at a location close to the top on the reading control panel 601. For example, the sentence that is currently being read may be displayed starting from a location of the second row on the reading control panel, so as to help the user quickly and intuitively position the text content that is currently being read, thereby improving user experience. The reading control panel 601 may further display a sentence after the sentence that is being read. In the following embodiment, an example in which the preset fixed location is the second row is used for description.

With reference to FIG. 8A(a) and FIG. 8A(b), as the reading progresses, when the mobile phone reads a next sentence, text content displayed on the reading control panel scrolls upward, and a sentence that is currently being read is automatically pushed to the location of the second row. In some embodiments, the first row on the reading control panel may display a sentence previous to the sentence that is currently being read, and the total reading duration is no longer displayed. In some other embodiments, the first row on the reading control panel does not display the total reading duration, but displays the remaining reading duration and/or the read duration.

In the reading status, if an audio focus held by the voice reading service is preempted by another application (for example, an incoming call, music, video playing, or an audio/video call), the mobile phone automatically suspends text reading, the reading control panel stops displaying, and the reading control card is generated in a menu bar (or referred to as a notification bar). In other words, the reading control panel is switched to the reading control card in the menu bar. After the audio focus is released by the another application and the voice reading service re-holds the audio focus, the mobile phone resumes text reading.

In the reading status, if the mobile phone exits the current interface display, and displays the desktop, displays another application interface, or locks the screen, in an implementation, the mobile phone continues reading the text, and the reading control panel is switched to the reading control card in the menu bar. In another implementation, the mobile phone suspends text reading, and the reading control panel is switched to the reading control card in the menu bar. In another implementation, the mobile phone stops reading the text, the reading control panel disappears and exits the text reading function.

In some embodiments, the mobile phone displays, on the reading control panel, marking information of the text corresponding to the sentence that is currently being read, so as to highlight, intuitively and dynamically in real time, text content that is currently being read and a reading location to the user, thereby improving interaction and user experience.

For example, the marking information may be text information of a sentence that is currently being read, and the reading control panel displays only the text information of the sentence that is currently being read, and does not display text information of another sentence.

For another example, the marking information may be the text information of the sentence that is currently being read, the reading control panel displays the sentence that is currently being read and text information of several adjacent sentences, and the text information of the sentence that is being read is displayed differently from that of another sentence. For example, as shown in (a) in FIG. 6, the marking information is text information of the sentence that is currently being read and highlighted for display on the reading control panel, or as shown in (b) in FIG. 6, the marking information is text information of the sentence that is currently being read and underlined, or the marking information may be text information of the sentence that is currently being read and highlighted in bold.

In some other embodiments, marking information of the text corresponding to the sentence that is currently being read and that is displayed by the mobile phone on the reading control panel is text information of a line that is being read in the sentence that is currently being read. The text information of this line may be displayed differently from that of another line.

In this embodiment of this application, the reading control panel may further include some player controls, configured to control a reading progress, a reading speed, or the like. For example, the player control may be configured to perform control such as reading a previous sentence, reading a next sentence, pause/resume, fast-forward, rewind, playback speed control, refresh, minimize, or exit.

For example, as shown in FIG. 8A(b), the reading control panel includes a next sentence control 801 (which may also be referred to as a move-down control or another name). After detecting an operation of tapping the next sentence control 801 by the user, the mobile phone reads the next sentence text, and as shown in FIG. 8A(c), automatically pushes the next sentence text to a location (that is, the foregoing preset fixed location) of the second row on the reading control panel and highlights the next sentence text. If the mobile phone is currently reading the last sentence in the application interface, after detecting that the user taps a next sentence control, the mobile phone determines that the reading ends, the reading status is switched to "reading ended", and the next sentence control becomes invalid. In addition, a display status of the next sentence control changes. For example, with reference to FIG. 8A(d), after the reading ends, the invalid next sentence control 801 becomes grayed out (which is briefly referred to as grayed below), so as to be displayed differently from a state of another valid control. After the user taps the next sentence control 801, the mobile phone does not respond.

After the last sentence of the text in the application interface is read, the mobile phone may play "the reading ends" to remind the user, and the reading status is switched from "reading" to "reading ended". In some embodiments, after the reading ends, if the mobile phone does not detect, within preset duration, a related operation of the user on the text reading, the mobile phone automatically exits the text reading function. In some other embodiments, after the reading ends, the mobile phone does not automatically exit the text reading function, but exits the text reading function only after detecting an operation that the user indicates to exit.

For another example, as shown in FIG. 8B(a), the reading control panel includes a previous sentence control 802 (which may also be referred to as a move-up control or another name). After detecting an operation of tapping the previous sentence control 802 by the user, the mobile phone reads a previous sentence text, and as shown in FIG. 8B(b), highlights the previous sentence text for display and automatically pushes it up to the second row on the reading control panel. If the mobile phone is currently reading the first sentence of the application interface, the previous sentence control becomes invalid.

For another example, as shown in FIG. 8C(a), the reading control panel includes a pause/resume control 803. When the reading status is "reading", the mobile phone stops reading the text after detecting an operation of tapping the control 803 by the user. In this case, as shown in FIG. 8C(b), the reading status is switched from "reading" to "reading paused". Then, after detecting the operation of tapping the control 803 by the user again, the mobile phone resumes reading the text content. In this case, as shown in FIG. 8C(a), the reading status is switched from "reading paused" to "reading".

In some embodiments, the reading control panel may further include a fast-forward control, and the next sentence control may also be used for fast-forward control. After the mobile phone detects an operation of long pressing or tapping the next sentence control for a plurality of times by the user, or after the mobile phone detects an operation of tapping the fast-forward control by the user, the mobile phone determines a start location of a to-be-read sentence based on a proportion relationship between a text progress obtained after fast-forward corresponding to the user operation and an entire text of the currently displayed application interface, and reads downward starting from the start location.

In some embodiments, the reading control panel may further include a rewind control, and the previous sentence control may also be used for rewind control. After the mobile phone detects an operation of long pressing or tapping the previous sentence control for a plurality of times by the user, or after the mobile phone detects an operation of tapping the rewind control by the user, the mobile phone determines a start location of a to-be-read sentence based on a proportion relationship between a text progress obtained after rewind corresponding to the user operation and an entire text, and reads downward starting from the start location.

In addition, the reading control panel may further include a progress bar. After detecting an operation of dragging the progress bar by the user, the mobile phone determines, based on a proportional relationship between a text progress corresponding to the dragging operation and the entire text, a start location of a to-be-read sentence corresponding to a dragging point on the progress bar, and reads downward starting from the start location. During a process in which the user drags the progress bar without releasing a hand, the text reading is not interrupted. After the user drags the progress bar and releases the hand, the mobile phone reads the text downward starting from a location obtained after the dragging.

It may be understood that, when the user indicates to fast-forward or rewind, a location of a drag point on the progress bar also moves forward/backward correspondingly. The mobile phone may determine a start location of a to-be-read sentence corresponding to the drag point on the progress bar, and read the to-be-read sentence downward from the start location.

In this embodiment of this application, the mobile phone may index the one or more recognized sentences, the progress bar matches an index of the sentence, and the mobile phone may perform control based on a granularity of the recognized sentence. For example, each sentence may correspond to one node, and the progress bar matches a node of the sentence. After the user drags the progress bar, a drag point may correspond to a node of a specific sentence based on a proportional relationship, and the mobile phone reads the sentence corresponding to the node. For example, after the user drags the progress bar 800 shown in FIG. 8D(a), if the drag point 80 shown in FIG. 8D(b) corresponds to a third sentence, the mobile phone starts to read the third sentence.

In an implementation, as shown in FIG. 8E(a), when the user drags the progress bar, the drag point can be dragged only to a discrete location corresponding to a sentence node. After the dragging is stopped, the mobile phone reads downward starting from a sentence location corresponding to a node at which the drag point is located.

In another implementation, a sentence node location corresponds to a start location of a sentence, and as shown in FIG. 8E(b). When the user drags the progress bar, the drag point may be dragged to any location. After the drag point is dragged to a location between two sentence nodes and the hand is released, the drag point automatically corresponds to a location of a next node, and the mobile phone reads downward starting from a sentence location corresponding to the next node.

In another implementation, a sentence node location corresponds to a start location of a sentence, as shown in FIG. 8E(c). When the user drags the progress bar, the drag point may be dragged to any location. After the drag point is dragged to a location between two nodes and a hand is released, the drag point automatically corresponds to a location of a previous node, and the mobile phone reads downward starting from a sentence location corresponding to the previous node.

In addition, as shown in FIG. 8A(b), the reading control panel includes a playback speed control 804. After detecting an operation of tapping the playback speed control 804 by the user to select a target playback speed, the mobile phone reads the text at a speed corresponding to the target playback speed. For example, the target playback speed may include a 0.5× playback speed, a 1× playback speed, a 2× playback speed, or the like.

The reading control panel may further include a refresh control. After detecting an operation of tapping the refresh control by the user, the mobile phone re-obtains interface content of an application interface (that is, re-obtains second content of the first user interface), obtains a text from the interface content, and reads the text. For example, due to a network or another reason, a text of the application interface may not be completely loaded, and the mobile phone cannot read all text content of the interface. In this case, the user may re-obtain the text by using the refresh control, so that the mobile phone can load and read all the text in the interface. For example, as shown in FIG. 9A(a), when the mobile phone has been reading for a period of time, if an operation of tapping the refresh control 805 by the user is detected, the mobile phone re-obtains the text of the application interface, and start again to read as shown in FIG. 9A(b), and the progress bar also moves from the beginning. It may be understood that, compared with content obtained before the refreshing, content such as a text or a picture included in the application interface after the refreshing may have changed.

As shown in FIG. 9B(a), the reading control panel further includes an exit control 806. After detecting an operation of tapping the exit control 806 by the user, the mobile phone exits the text reading function, and stops reading the text, and the reading control panel disappears, as shown in FIG. 9B(b).

In the state of "reading ended", if the mobile phone detects an operation of tapping the pause/resume control by the user, the mobile phone reads the text content in the interface from the beginning. If the mobile phone detects an operation of tapping the refresh control by the user, the mobile phone re-obtains the text and reads the text content in the interface from the beginning. Alternatively, in the state of "reading ended", if the mobile phone determines that the user has not performed any operation within preset duration (which may be, for example, 5s or 10s), the mobile phone exits the text reading function, and the reading control panel disappears.

In addition, with reference to FIG. 9C(a) to FIG. 9C(d), after the mobile phone enables the text reading function, if an exception occurs in a network (for example, no network is available, the network is weak, or a network connection times out during text capturing and audio synthesis), the text in the application interface cannot be obtained, or the text cannot be read after being obtained, resulting in an exception result. In this case, the mobile phone may prompt the user with an exception, or remind the user to try again later. In these cases, the refresh control is valid, and other controls are invalid (for example, grayed out). After the user taps these controls, there is no response. In some embodiments, in these cases, if the reading is not started within the preset duration and no user operation is detected, the mobile phone exits the text reading function.

In some other embodiments of this application, the mobile phone may further perform, in response to a voice instruction of the user, control related to the reading progress, speed, or exit, such as reading a previous sentence, reading a next sentence, pause/resume, fast-forward, rewind, playback speed control, refresh, minimize, or exit. For example, after detecting a voice instruction (that is, "reading a next sentence") of the user, the mobile phone stops reading the current sentence and reading the next sentence. For another example, after detecting a voice instruction (that is, "Xiaoyi, Xiaoyi, suspend reading") of the user, the mobile phone stops reading the text content. For another example, after detecting a voice instruction "Read starting from the sentence "Come to Beijing from Harbin"" of the user, the mobile phone switches to read downward starting from the sentence.

In some embodiments, a form, a window size, a location, or the like of the reading control panel may be further adjusted. For example, when the reading control panel is displayed in a half-screen manner, the mobile phone may move a display location of the reading control panel on the screen in response to an operation of dragging a frame of the reading control panel by the user.

For another example, with reference to FIG. 10(*a*), the reading control panel includes a minimization control 807. After detecting an operation of tapping the minimization control 807 by the user, the mobile phone minimizes the reading control panel, and keeps text reading without interruption. Alternatively, after detecting an operation of tapping a back (back) button, a home (home) button, a menu (menu) button, or the like on the screen by the user, the mobile phone minimizes the reading control panel, and keeps text reading without interruption. Alternatively, the mobile phone may minimize the reading control panel in response to a pull-down operation of the user on the reading control panel, or in response to a pull-down operation of the user on a control 1003 or a nearby area.

Alternatively, when the reading control panel is displayed in a half-screen manner, with reference to FIG. 10(*a*), when detecting that the user reads an area outside the reading control panel, the mobile phone minimizes the reading control panel. In some embodiments, a mask layer is superimposed on the application interface. When detecting that the user taps the mask layer in an area outside the reading control panel, the mobile phone minimizes the reading control panel.

In some embodiments of this application, minimizing the reading panel means zooming out the reading control panel to the bottom of the screen, that is, zooming out to a control with a relatively small size at the bottom of the screen, for example, a narrow-strip zoom-out bottom control 1001 shown in FIG. 10(*b*), including a player control, an icon or a name of the text reading function, and the like. It may be understood that, the zoom-out bottom control 1001 shown in the accompanying drawings is merely an example for description. The zoom-out bottom control may also be in another form, and more or fewer controls may be displayed on the zoom-out bottom control 1001. This is not limited. Alternatively, in some other embodiments of this application, minimizing the reading panel means disappearing from the application interface. When the user calls out a menu bar (for example, pulls down from a top of the screen), as shown in FIG. 10(*c*), the mobile phone may display a reading control card 1002 in the menu bar.

After the reading control panel is zoomed out to the bottom of the screen for the first time/each time, as shown in FIG. 10(*b*), the mobile phone may further prompt the user that you can pull up the panel to re-awaken the reading control panel again. Then, after detecting the pull-up operation of the user starting from the location of the control 1001, as shown in FIG. 10(*a*), the mobile phone resumes displaying the reading control panel; or after detecting the pull-up operation of the user starting from the bottom of the screen, the mobile phone restores to display the reading control panel. After the reading control panel is switched to the reading control card for the first time/each time, as shown in FIG. 11(*a*), the mobile phone may further prompt the user that you can tap the Xiaoyi reading card to re-awaken the reading control panel.

The reading control card may include a name, an icon, or the like of the text reading function, to indicate that the card is used to perform reading function control. When the user taps the reading control card, the mobile phone may resume displaying the reading control panel. For example, in the case shown in FIG. 11(*b*), if the mobile phone detects that the user taps the reading control card, display of the reading control panel shown in FIG. 11(*c*) may be restored. It may be understood that the reading progress is updated as the reading progresses. The reading control card may further include some player controls, configured to control the reading progress or speed, and may include, for example, a plurality of controls such as reading paused/resumed, reading a previous sentence, reading a next sentence, fast-forward, rewind, playback speed control, refresh, progress bar, or exit. The reading card may further include one or more types of information such as a reading status, read duration, remaining reading duration, or a sentence that is being read. In some embodiments, the reading control card may further prompt that there is related information of the target application, so as to help the user learn a source of a text that is being read by the mobile phone.

In this embodiment of this application, the operation of indicating, by the user, to minimize the reading control panel may be referred to as a fourth operation. For example, the fourth operation may be an operation of tapping the minimization control 807 by the user.

For another example, after the mobile phone detects an operation of minimizing the reading control panel by the user, the reading control panel disappears from the current interface, and the mobile phone may display a reading control floating ball 1201 shown in FIG. 12(*a*), and continue reading the text without interruption. Then, even if the mobile phone displays another interface, the text reading process still progresses. When the user taps the reading control floating ball 1201, as shown in FIG. 12(*b*), the mobile phone may resume displaying the reading control panel. In some embodiments, the reading control floating ball 1201 may display related information (for example, an application name or an icon) of the target application, to indicate, to the user, a source of a text that is currently being read.

In some embodiments, the mobile phone may have a plurality of text reading tasks. When one of the text reading tasks is performed, other text reading tasks are suspended. In a technical solution, the menu bar may include reading control cards respectively corresponding to a plurality of text reading tasks, and the user may tap a corresponding card as required to indicate the mobile phone to read a corresponding text. In some other technical solutions, each text reading task has a corresponding reading control floating ball, and the user may tap the corresponding reading control floating ball as required to indicate the mobile phone to read a corresponding text. In some other technical solutions, the mobile phone displays a reading control floating ball. When there are a plurality of reading tasks, the user may tap the reading control floating ball to sequentially switch between different reading tasks. The reading control floating ball may display related prompt information such as a name or an icon of an application corresponding to a current reading task, so as to indicate, to the user, a source of a text that is currently being read. After the reading control floating ball is dragged by the user to an edge of the screen, a part of the reading control floating ball may be hidden to reduce coverage on a lower layer interface. After the user drags the reading control floating ball to the screen, a complete reading control floating ball is displayed.

For another example, the mobile phone may adjust a window size of the reading control panel in response to a third operation of the user. For example, with reference to FIG. 13A(a) and FIG. 13A(b), when the reading control panel is displayed in a half-screen manner, the mobile phone may display the reading control panel in a full-screen manner in response to a pull-up operation of the user on the reading control panel, or in response to a pull-up operation of the user on the control 1003 or a nearby area. In addition, the adjusting the window size of the reading control panel may further include minimizing the reading control panel, or switching the reading control panel that is zoomed out to the bottom of the screen to the reading control panel displayed in a half-screen manner, or the like.

In some embodiments, the text displayed on the reading control panel may scroll up/down in response to the fifth operation (for example, a sliding operation) of the user. For example, with reference to FIG. 13A(b), the reading control panel is displayed in a full-screen manner. After detecting an operation of sliding up on the reading control panel by the user, the mobile phone scrolls up to display the text, as shown in FIG. 13A(c). Then, as shown in FIG. 13A(d) and FIG. 13A(e), if the mobile phone detects an operation (which may be referred to as a second operation, for example, a touch operation on a specific sentence such as tap, double-tap, or long-press) performed by the user on the specific sentence on the reading control panel, the mobile phone reads downward starting from a sentence location specified by the user, and the read sentence is highlighted and is automatically pushed to the location of the second row. Alternatively, as shown in FIG. 13A(d) and FIG. 13A(e), if the mobile phone detects an operation (which may also be referred to as the second operation, for example, a touch operation on a specific location such as tap, double-tap, or long-press) performed by the user on a specific location on the reading control panel, the mobile phone reads downward starting from a sentence corresponding to a location specified by the user, and the read sentence is highlighted and is automatically pushed to a location of the second row.

Alternatively, after the text on the reading control panel is displayed in a scrolling manner, if the mobile phone has not detected the reading control operation of the user within the preset duration, as shown in FIG. 13A(f), the mobile phone automatically pushes a sentence that is being read at this moment to the location of the second row. It may be understood that, over time, a sentence that is being read by the mobile phone at this moment may no longer be a sentence that is being read before the text is displayed in a scrolling manner.

It should be noted that, when the reading control panel is displayed in a half-screen manner, the text on the reading control panel may also be scrolled, and the user may also trigger reading downward starting from any sentence location. Details are not described herein. For example, with reference to FIG. 13B(a), the reading control panel is displayed in a half-screen manner. If it is detected that an operation (which may also be referred to as the second operation, for example, tap, double-tap, or long-press) performed by the user on a specific sentence on the reading control panel, as shown in FIG. 13B(b), the mobile phone reads downward starting from a sentence location specified by the user, and the read sentence is highlighted and is automatically pushed to the location of the second row.

In some other embodiments, the mobile phone may alternatively read only a specific sentence in response to an operation performed by the user on the sentence, but does not continue to read a sentence after the sentence.

It should be noted that the text displayed on the reading control panel is divided by using one sentence as a unit, each sentence corresponds to a display control on the reading control panel, and each display control has an identifier of the display control. After detecting a touch operation performed by the user on a specific sentence that is expected to be read, the mobile phone may trigger a display control corresponding to the sentence. In response to the display control event, the mobile phone obtains the sentence corresponding to the display control, and reads starting from the location of the sentence, so that the user can perform flexible, refined, and precise reading control by using one sentence as a granularity.

In addition, in some other embodiments, after the text reading function is enabled, total reading duration on the reading control panel stops displaying after the total reading duration is displayed for the preset duration (for example, 10s), and a sentence that is being read is automatically pushed to the location in the first row. In a subsequent reading process, the sentence that is being read is also automatically pushed to the location in the first row.

In this embodiment of this application, the mobile phone configured to perform the text reading method may use a plurality of operating systems such as Android (Android) or HarmonyOS, and may specifically use a form of a software architecture such as a layered architecture, an event-driven architecture, a micro-core architecture, a micro-service architecture, or a cloud architecture. A software system and an architecture form used by the mobile phone are not limited in embodiments of this application. The following describes, from a perspective of software implementation, the text reading method provided in embodiments of this application.

Embodiments of this application use an Android system of a layered architecture as an example to describe a software structure of the mobile phone. The Android system may be divided into four layers: an application layer, an application framework layer, an Android runtime (Android runtime) and a system library, and a kernel layer from top to bottom. The application layer may include a series of application packages. The application framework layer provides an application programming interface (application programming interface, API) and a programming framework for applications at the application layer. The application framework layer includes some predefined functions. The Android Runtime includes a kernel library and a virtual machine. The Android runtime is responsible for scheduling and management of the Android system. The kernel library includes two parts: functions that Java language need to call and a kernel library of Android. The application layer and the application framework layer are run on the virtual machine. The virtual machine executes Java files of the application layer and the application framework layer as binary files. The virtual machine is configured to implement functions such as object life cycle management, stack management, thread management, security and exception management, and garbage collection. The system library may include a plurality of functional modules. For example, a surface manager (surface manager), a media library (Media Libraries), a three-dimensional graphics processing library (for example, OpenGL ES), and a 2D graphics engine (for example, SGL). The kernel layer is a layer between hardware and software. The kernel layer includes at least a display driver, a camera driver, an audio driver, and a sensor driver.

In this embodiment of this application, as shown in FIG. 14, the application layer of the mobile phone may include a target application and a voice reading application, and the application framework layer may include modules such as a window management service and a barrier-free management service. Interface content of the target application is presented by using a control. For example, the control may be a button, a progress bar, an option box, a text box, or the like.

The application interface may correspond to one view, each control may correspond to one view node, and the application interface may include a view root node and a plurality of view nodes. The voice reading application includes modules such as text collection, text processing, a reading user interface (user interface, UI), and a reading player. The window management service is used to display control and manage windows and programs, may obtain a display screen size, determine whether there is a status bar, lock the screen, and capture the screen.

In this embodiment of this application, the target application may be registered with the barrier-free management service. The mobile phone may obtain, by using the barrier-free management service, node information (namely, the foregoing first content of the first user interface) of all view nodes of the application interface that is currently displayed by the target application. The node information includes a plurality of types of information such as a text, a picture, and a width, a height, an attribute, or a type of a control. The voice reading application may obtain a text in the application interface from the node information, so as to perform reading. Because the barrier-free management service is a system service, node information of all view nodes displayed by the mobile phone is obtained in real time. Therefore, the mobile phone may obtain, in such a manner, a text displayed in any application interface.

It should be noted that content obtained by the mobile phone from the node information includes information such as a visible text in the application interface and a type and a height of a node. To enable a valid text part to be read after the text reading function is enabled, the mobile phone may preprocess the information, to remove non-text information, and obtain a readable text part.

Then, the mobile phone uses one sentence as a division unit. The mobile phone displays the preprocessed text to the user by using the reading control panel. Besides, the mobile phone uploads the preprocessed text to the TTS cloud server on the cloud by using the reading player for text-to-speech conversion. A converted audio file (or referred to as an audio clip, audio data, an audio stream, a voice stream, a voice package, or the like) is returned to the reading player for playing, so as to implement the text reading function.

Based on the software modules shown in FIG. 14, a text reading process provided in this embodiment of this application may specifically include the following steps.

The interface content of the target application is displayed by using the window management service, and node information of the interface content is transferred to the barrier-free management service. A text collection module implemented by the voice reading application obtains the node information from the barrier-free management service. Then, a text processing module in the voice reading application preprocesses the node information obtained by the text collection module, so as to obtain a readable text. The readable text for the voice reading application is not limited to Chinese, and further includes English and other languages. A language type of the readable text is not limited in this embodiment of this application.

It may be understood that the mobile phone may also obtain the interface content in another manner instead of using the barrier-free management service, to obtain the text in the application interface, for example, obtain the text in the application interface, by using optical character recognition (optical character recognition, OCR) or a reader interface. A specific manner of obtaining the text in the application interface is not limited in this embodiment of this application.

In this embodiment of this application, a preprocessing process of the text processing module includes: filtering, cleaning, typesetting, sentence segmentation, and the like.

A text in a text-related control included in the application interface is usually a body text of interface content, and may be read. The text processing module may filter obtained text data by retaining the text in the text-related control, to retain a readable text part and remove a text part that does not need to be read, such as a type or a height of a view node. Text information in the text-related control is usually readable valid text information. For example, the text-related control includes but is not limited to:

Android control android.widget.TextView android.widget.EditText android.widget.AutoCompleteTextView android.widget.MultiAutoCompleteTextView android.webkit.WebView Huawei control com.huawei.uikit.hwtextview.widget.HwTextView com.huawei.uikit.hwedittext.widget.HwEditText Text cleaning is used to sort text data and remove a part that the user does not expect to read, for example, characters such as tags, picture addresses, tables, or websites.

For example, the text processing module may remove, by using the following regular expressions, a character of a tag type that the user does not expect to read:

```
private          static          final          Pattern
    PATTERN_LABEL=Pattern.compile("(?:<([a-zA-Z]+
    ?)(?:(?:(?:\\s[^< >\\s]+?=[^< >\\s]+?)*?)|(?:=[^< >\\s]+
    ?))\\s?>.*?(?:</\\1>))|"+"(?:<[a-zA-Z]+?(?:(?:=
    [^<    >\\s]+?\\s?/>)|(?:(?:\\s[^<    >\\s]+?=[^<    >\\s]+
    ?)*?\\s?/>)))");
private static final Pattern PATTERN_IMG=
Pattern.compile("[a-zA-Z0-9_]+?\\?[a-zA-Z0-9_]+?=
    [^&\\s]+(?:&[a-zA-Z0-9_]+?=[^&\\s]+)*");
private          static          final          Pattern
    PATTERN_JAVA_SCRIPT=Pattern.compile
    ("^javascript:.*?(?:(?:\\(.*?\\))|;)").
```

For another example, the text processing module may remove, in the following manner, a character that the user does not expect to read and that does not include content such as Chinese, English, or a number:

```
private          static          final          Pattern
    PATTERN_INVALID_CHARACTERS=Pattern.compile
    ("^[\\u4e00-\\u9fa5a-zA-Z0-9]*$").
```

For another example, the text processing module may remove, in the following manner, meaningless content that the user does not expect to read, for example, content that includes at least one uppercase letter, at least one lowercase letter, and at least one digit, and that includes only an uppercase letter, a lowercase letter, a number, and some special characters !#$%^&*_-=?.:+/@, and has a length greater than 20 characters:

```
private           static           final           Pattern
    PATTERN_SPECIAL_CHARACTERS=Pattern.compile
    ("^(?=.*?[A-Z])(?=.*?[a-z])(?=.*?[0-9])[a-zA-Z0-
    9!#$%^&*_\\-=?.:+/@]{20,}$").
```

The text processing module may perform sentence segmentation on a filtered and cleaned text, so as to recognize one or more sentences. For example, the text processing module may perform sentence segmentation by using a standard punctuation mark. For example, the following first type of punctuation marks may be used for sentence segmentation:

Period (.): a type of punctuation mark at the end of a sentence, which mainly indicates a statement tone of a sentence.

Question mark (?): a type of punctuation mark at the end of a sentence, which mainly indicates a question tone of a sentence.

Exclamation mark (!): a type of punctuation mark at the end of a sentence, which mainly indicates an exclamation tone of a sentence.

Ellipsis ( . . . ): a type of punctuation mark, which indicates an omission of specific content in a paragraph, discontinuity of a meaning, and the like.

English period (.): a type of punctuation mark at the end of a sentence, which mainly indicates a statement tone of a sentence.

For another example, the following second type of punctuation marks cannot be used for sentence segmentation:

Quotation marks (" " '): a type of punctuation marks, which indicate directly quoted content in a paragraph or a component that especially need to be pointed out. The quotation marks further include ([ ]Brackets (( )): a type of punctuation marks, which indicate comment content, supplementary description, or another sentence with a specific meaning in a paragraph. The brackets further include [ ], [ ], [ ], { }, and the like.

Book title marks (《》 〈〉):types of punctuation marks, which indicate names of various works appearing in a paragraph.

In this way, when second-type punctuation marks include a first-type punctuation mark, sentence segmentation cannot be performed based on the first-type punctuation mark. When the first-type punctuation mark is not included in second-type punctuation marks, sentence segmentation may be performed based on the first-type punctuation mark.

For another example, in the following cases, an English period (.) cannot be used for sentence segmentation:

English abbreviation: Mr. Wed.

between digits: (an ip address, a date, a number with a decimal, and a dot following a paragraph number) (192.168.0.1, 2009.3.1, 3.1415926, 1.)

email: 89745859@qq.com; and website: https://login.tom.com/login/

Typesetting may be further performed on the text obtained after the sentence segmentation. The text processing module may first perform basic sorting on the text based on the view node, and then perform auxiliary adjustment based on height information of each view node, to adjust adjacent rows of a same height to a same row. For example, each row in the application interface includes four application icons. If typesetting is not performed, a name of each application icon obtained by the voice reading application occupies one row. After typesetting is performed, names of the four application icons are arranged in a same row. Each sentence obtained after typesetting independently becomes a paragraph.

Then, the text processing module may send an entire text obtained after typesetting to a reading UI for display. The reading UI performs window management and text display management, so that each sentence in the entire text independently becomes a paragraph and is displayed on the reading control panel. Each sentence has a corresponding number. In some embodiments, each sentence may correspond to one display control. After detecting an operation performed by the user on the display control, the mobile phone may determine that the user selects the sentence corresponding to the display control.

As described above, a text is split by sentence, each sentence has a corresponding number, and the number may be used to index the sentence. The text processing module transfers a preprocessed text to the reading player. In some embodiments, as shown in FIG. 14, the reading player estimates the total reading duration based on parameters such as a quantity of characters of the preprocessed text, a reading speed experience value, and the like. In some other embodiments, the reading player may send the preprocessed text to the TTS cloud server. The TTS cloud server estimates total reading duration based on parameters such as the quantity of characters of the text and a text-to-audio conversion and synthesis speed, and notifies the reading player of the total reading duration.

Then, the reading player performs initialization, displays the estimated total reading duration, and sequentially sends each sentence in the preprocessed text to the TTS cloud server on the cloud. With reference to FIG. 15, the TTS cloud server performs text-to-speech conversion processing on a text by sentence. For each sentence, the TTS cloud server may generate a plurality of audio clips. Each time the TTS cloud server synthesizes an audio clip (for example, in a voice stream mp3 format), the TTS cloud server outputs the audio clip, and sends the audio clip to the reading player on the mobile phone side. For example, the TTS cloud server may separately deliver each audio clip to the mobile phone side through an interface of a hypertext transfer protocol (hypertext transfer protocol, http) protocol. Playing duration of each audio clip is relatively short, for example, 20 ms to 50 ms. Each audio clip corresponds to a relatively small quantity of words, for example, one or two words. The reading player adds the received audio clip to buffer 1 (or referred to as buffer queue 1) for buffering. The reading player starts to play when the first audio clip is buffered. In this way, the reading player starts to play after one audio clip is synthesized, that is, the user can quickly hear a reading sound after waiting for the synthesis of one audio clip. A time for the user to wait for starting to read is short, and the time for starting to read may be reduced to a 10-ms level. Real-timeliness of reading is relatively good, and user experience is relatively high.

As shown in FIG. 16, each sentence may be divided into a plurality of audio clips for voice conversion and playing. Each sentence may be understood as a text batch. The TTS cloud server may return several batches of audio clip data to the reading player. After receiving the data, the reading player stores the data into buffer 1, and extracts the data for playing, so as to implement real-time streaming playing.

In addition, after an audio file of each sentence is buffered, the TTS cloud server sends an end identifier, and the reading player triggers sending of a next sentence to the TTS cloud server. In addition, as shown in FIG. 15, the reading player adds the buffered audio file of the entire sentence to buffer 2 (or referred to as buffer queue 2). As shown in FIG. 17, an entire text (namely, a text corresponding to the application interface, which may also be referred to as an article) may include a plurality of sentences (that is, include a plurality of batches), and buffer 2 may buffer a complete audio file of each batch. In addition, because a TTS synthesis speed is much faster than a playing speed, all audios are quickly synthesized and buffered during playing. In this way, a sentence buffered in buffer 2 is generally ahead of a sentence that is being played. When the user drags the progress bar (which may be dragged backward or forward), if the progress obtained after the dragging falls into buffer 2, a corresponding audio file may be obtained from buffer 2, so as to achieve an effect of immediately playing without waiting. Therefore real-time response is strong, and user experience is relatively high. If the progress obtained after the user drags the progress bar falls into a sentence that does not exist in buffer 2, synthesis and buffering of text-to-speech after the sentence are immediately triggered.

To be specific, as shown in FIG. 17, buffer 2 is configured to buffer audio information corresponding to a complete single-sentence text. During an attempt to obtain audio data of a specific sentence from buffer 2, if the audio data does not exist, it indicates that the sentence does not have a synthesized audio file. In this case, a synthesis and decoding process of the sentence is initiated in real time. In the synthesis and decoding process, audio data is returned for several times. After receiving the audio data, the audio data is buffered in the queue, and is extracted for starting playing, so as to implement real-time streaming playing.

It should be noted that buffer 1 and buffer 2 may be different buffer queues, or may be two parts in a same buffer queue. This is not limited in this embodiment of this application. The foregoing buffer design of buffer 1 and buffer 2 can achieve an effect that concurrent processing for playing control, without affecting each other.

In addition, the reading player may further perform playing control during reading. For example, for an operation such as dragging the progress bar by the user, the reading player finds, based on a proportion of a dragging point in the progress bar, a sentence corresponding to a corresponding proportion, and performs playing starting from the sentence, or sends the sentence and a subsequent text to the TTS cloud server for voice synthesis. Fast-forward and rewind operations may also be converted to this proportion for corresponding processing.

For an operation of adjusting a playback speed by the user, the reading player adjusts the playing speed by setting a corresponding control parameter such as AudioTrack.

For an operation of pausing/resuming by the user, the reading player pauses/resumes to request audio data from the TTS cloud server, and at the same time, suspends/resumes the playing of AudioTrack.

For an operation of tapping a refresh button by the user, the voice reading application re-obtains the text data from the application interface, and re-performs a playing process.

For operations such as tapping a minimization "-" control, back (Back), and menu (Menu) by the user, the reading control panel is minimized, a background continues playing the voice, and the reading control panel is zoomed out to the menu bar.

For an operation of tapping an exit "X" control by the user, the voice reading application stops reading the text, releases a resource occupied by the voice reading application, and destroys the reading UI.

For example, after opening an article in a news application interface, the user indicates to enable the text reading function, and the voice reading application obtains a headline article and preprocesses the article. Then, text information of the article is sent to the TTS cloud server on the cloud. The audio data output by the TTS cloud server is continuously transferred to the voice reading application. The voice reading application buffers the data and starts to play the data. The user can perform operations such as pause, resume, fast-forward, rewind, refresh, or exit.

In addition, FIG. 18 is a logical block diagram of text reading according to an embodiment of this application. As shown in FIG. 18, a reading player uses a sentence as a unit to transfer text to a TTS cloud server sentence by sentence. After receiving a sentence, the TTS cloud server converts a text of the sentence into an audio clip corresponding to a voice stream, and transfers, to the reading player, an audio file (for example, an audio file compressed in an mp3 format) obtained after the audio clip is compressed. The reading player decodes the received audio file of the sentence, and stores a corresponding audio file into buffer 1 by using one audio clip as a unit. For example, buffer 1 includes audio clip data packages: (package) 1, package 2, . . . , package n. One package is a package of voice data and corresponds to one audio clip. After a sentence is buffered, the sentence is sent to buffer 2. In addition, after an audio file of one sentence text is buffered in buffer 1, the reading player may send a next sentence text to the TTS cloud server, and repeatedly perform the foregoing process. For example, buffer 2 includes sentence data packages: (sentence) 1, sentence 2, . . . , sentence n. One sentence corresponds to a complete audio file of one sentence.

As shown in FIG. 18, when a text that is being read and an audio file stored in buffer 1 belong to a same sentence, AudioTrack obtains the audio file from buffer 1 and plays the audio file. When a text that is being read and an audio file stored in buffer 1 do not belong to a same sentence, AudioTrack reads the audio file of the sentence from buffer 2 and plays the audio file. In addition, after a sentence text is played, the reading player controls a reading UI to highlight a next sentence of the sentence and scroll the text.

As shown in FIG. 19, if the to-be-read sentence changes because the user indicates to perform an operation such as fast-forward, rewind, dragging a progress bar, and continuously tapping a previous sentence or a next sentence, the reading player may perform calculation by using a proportion of a text progress corresponding to the user operation, and find a corresponding start sentence, that is, find the to-be-read sentence. If the reading player determines that the to-be-read sentence exists in buffer 2, AudioTrack reads an audio file of the sentence from buffer 2 and immediately plays the audio file. If the reading player determines that the to-be-read sentence does not exist in buffer 2, sending of the sentence to the TTS cloud server is triggered. In this case, a sentence that is being buffered and a sentence that is being read by buffer 1 belong to a same sentence, and AudioTrack reads the audio file from buffer 1 and plays the audio file in real time.

An embodiment of this application further provides a module interaction sequence diagram. As shown in FIG. 20A and FIG. 20B, a mobile phone side includes a northbound interface, a state machine, a reading player, and a decoding module, and a TTS cloud server includes a synthesis module. In this embodiment of this application, the northbound interface may include a playing control interface such as a play (play) interface, a pause (pause) interface, or a stop (stop) interface, and may be invoked by an upper-layer voice reading application.

After the play start interface of the northbound interface is invoked by the voice reading application, the state machine of the reading player chooses to ignore playing or perform playing based on a current playing status of the reading player. If the state machine determines, based on the current status, to perform playing, one sentence is used as a unit to start to perform playing control logic. The broadcast control logic may specifically include: The reading player (which may also be referred to as a playing control center) attempts to obtain audio data of a to-be-played sentence from buffer 2. If the audio data of the sentence does not exist in buffer 2, the audio data is sent to the synthesis module in the TTS cloud server for audio synthesis, and a synthesized audio file is decoded by the decoding module of the mobile phone side. During synthesis and decoding, intermediate audio files are continuously returned to the reading player. Then, the reading player may store the audio file into buffer 1. The reading player may invoke an audio.write interface to continuously write data into buffer 1. The reading player may perform single-sentence playing starting callback. In addition, after the entire sentence is synthesized and decoded, the entire sentence is stored into buffer 2. After the text is played, the reading player may perform single-sentence playing ending callback. The reading player automatically updates a playing sequence, starts playing of a next sentence, and then repeats the playing control logic.

In conclusion, an embodiment of this application provides a text reading method. A mobile phone may read a text in any application interface to a user, and provide a reading control panel to interact with the user. The mobile phone may intuitively, explicitly, and dynamically notify the user of a current reading location in a form of highlighted text, so as to prevent the user from getting lost without knowing where to read. The user may conveniently perform a reading control operation such as pause/resume, going to a previous sentence, going to a next sentence, fast-forward, rewind, dragging a progress bar, playback speed control, or refreshing an interface text, and may also randomly tap any paragraph on the reading control panel, and trigger reading from this location, so that the user may conveniently re-listen to a part that is not understood at any time, or skip a part that is not interested, and jump to an important part that the user is interested in playing. After the user drags the progress bar, the highlighted text is switched dynamically as a sentence that is being read after the dragging is switched, so as to notify the user of a current reading location in real time, thereby improving interaction experience. In addition, the buffer design may implement quick and real-time starting of reading, and implement quick starting of reading after a reading location is changed due to, for example, fast-forward, rewind, or dragging a progress bar, so that user experience is relatively high.

In addition, with reference to the foregoing embodiments and the corresponding accompanying drawings, another embodiment of this application provides a method for reading displayed content. The method may be implemented on an electronic device having the structure shown in FIG. 1. Related content in the foregoing embodiments and the accompanying drawings is applicable to this embodiment, and details are not described herein again. With reference to FIG. 21, the method includes the following steps.

2101: The electronic device displays a first user interface.

As described above, the first user interface may be any interface displayed by a mobile phone, an interface of a first specific application, an interface of an application other than the first specific application, or the like.

2102: The electronic device receives a first operation of a user.

The first operation may indicate the electronic device to enable a text reading function and obtain to-be-read text content. For example, the first operation may be an operation of triggering a voice instruction "Xiaoyi, please read" by the user, or an operation of tapping a reading control by the user, or the like.

2103: The electronic device obtains first content of the first user interface in response to the first operation.

The first content includes text information in the first user interface. For example, the first content may be node information of each view node in the first user interface.

2104: The electronic device displays a second user interface, where content displayed in the second user interface includes a text in the first content, and the second user interface covers a part of a display area of the first user interface.

For example, the second user interface may be an interface corresponding to the foregoing reading control panel.

2105: The electronic device reads a first sentence in the content of the second user interface, and displays marking information of a text that is in the second user interface and that corresponds to the first sentence that is being read.

The marking information is used to prompt the user with sentence content that is currently being read.

The electronic device can read a text in the first user interface, and display the marking information by using the second user interface superimposed on a part of the display area of the first user interface, so as to dynamically and intuitively prompt the user with content that is being read. Interaction with the user is good, and user experience is relatively high. For example, the first user interface may be an interface of a target application, and the second user interface may be an interface corresponding to the reading control panel.

It may be understood that, the foregoing description is provided by using an example in which the electronic device is a mobile phone. When the electronic device is another device such as a tablet computer, the method described in the foregoing embodiments may still be used for text reading. Details are not described herein again.

In another text reading solution, as shown in (a) in FIG. 22, a voice assistant of the mobile phone may support a browser of a specific manufacturer and some applications of the manufacturer to perform text reading. This solution is limited to applications of the specific manufacturer and is not suitable for another application of manufacturer other than the specific manufacturer. In this solution, the reading progress may be forward or backward by time, and a text that is being read may be highlighted based on the original text. However, when the reading progress bar is dragged, the highlighted text does not change accordingly in real time. In addition, the user is not supported to tap any paragraph of an article to trigger reading starting from this location.

In another text reading solution, as shown in (b) in FIG. 22, the mobile phone may enter a barrier-free mode in response to an operation performed by the user on a floating control, and then perform text reading in this mode. Because the barrier-free mode is provided for the disabled, it is not convenient for normal users to use. In addition, in this solution, content that is being read is not displayed, interaction with the user is limited, and interaction such as dragging the progress bar, highlighting the text, and tapping to start reading is not supported. In addition, the floating control displayed in the interface disturbs the user to a relatively large extent.

It may be understood that, to implement the foregoing functions, the electronic device includes corresponding hardware and/or software modules for performing various functions. With reference to algorithm steps of examples described in embodiments disclosed in this specification, this application can be implemented by a form of hardware or a combination of hardware and computer software. Whether a specific function is performed by hardware or hardware driven by computer software depends on specific applications and design constraints of a technical solution. A person skilled in the art may use, with reference to embodiments, different methods for each specific application to implement the described functions, but such an implementation shall not be considered as going beyond the scope of this application.

In embodiments of this application, the electronic device may be divided into functional modules based on the foregoing method examples. For example, each functional module may be obtained through division based on each corresponding function, or two or more functions may be integrated into one processing module. The foregoing integrated module may be implemented in a form of hardware. It should be noted that, in this embodiment, the division of modules is used as an example, and is merely logical function division, and may have another division manner during actual implementation. For example, in some embodiments, the electronic device may include modules such as a display unit, a processing unit, and a reading unit.

An embodiment of this application further provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the text reading method in the foregoing embodiment.

An embodiment of this application further provides an electronic device. As shown in FIG. 23, the electronic device includes a display screen (or referred to as a screen) 2301, one or more processors 2302, a memory 2303, and one or more computer programs 2304. The foregoing components may be connected through one or more communication buses 2305. The one or more computer programs 2304 are stored in the foregoing memory 2303 and are configured to be executed by the one or more processors 2302. The one or more computer programs 2304 include instructions, and the foregoing instructions may be used to perform the steps in the foregoing embodiments. All related content of the steps in the foregoing method embodiments may be cited in function descriptions of corresponding physical components. Details are not described herein again.

For example, the foregoing processor 2302 may be specifically the processor 110 shown in FIG. 1, the foregoing memory 2303 may be specifically the internal memory 121 shown in FIG. 1, and the foregoing display screen 2301 may be specifically the display screen 194 shown in FIG. 1.

An embodiment of this application further provides a computer readable storage medium. The computer readable storage medium stores computer instructions. When the computer instructions are run on an electronic device, the electronic device is enabled to perform the foregoing related method steps, to implement the text reading method in the foregoing embodiment.

An embodiment of this application further provides a computer program product. When the computer program product is run on a computer, the computer is enabled to perform the foregoing related steps, to implement the text reading method performed by the electronic device in the foregoing embodiment.

In addition, an embodiment of this application further provides an apparatus. This apparatus may be specifically a chip, a component, or a module. The apparatus may include a processor and a memory that are connected to each other. The memory is configured to store computer executable instructions. When the apparatus runs, the processor may execute the computer executable instructions stored in the memory, so that the chip performs the text reading method performed by the electronic device in the foregoing method embodiments.

The electronic device, the computer readable storage medium, the computer program product, or the chip provided in embodiments are configured to perform the corresponding method provided above. Therefore, for beneficial effects that can be achieved, refer to the beneficial effects in the corresponding method provided above. Details are not described herein again.

Based on descriptions of the foregoing implementations, a person skilled in the art may understand that, for purposes of convenient and brief description, division of the foregoing functional modules is merely used as an example for illustration. In actual application, the foregoing functions may be allocated, as required, to different functional modules for implementation. In other words, an inner structure of the apparatus is divided into different functional modules to implement all or some of the functions described above.

In several embodiments provided in this application, it should be understood that the disclosed apparatus and methods may be implemented in other manners. For example, the apparatus embodiment described above is merely an example. For example, the division of module or unit is merely logical function division and may be other division during actual implementation. For example, a plurality of units or components may be combined or integrated into another apparatus, or some features may be ignored or not performed. In addition, the displayed or discussed mutual coupling or direct coupling or communication connection may be indirect coupling or communication connection through some interfaces, apparatuses or units, and may be implemented in electrical, mechanical, or other forms.

The units described as separate components may be or may not be physically separate, and components displayed as units may be one or more physical units, that is, may be located in one place, or may be distributed in a plurality of different places. Some or all of the units may be selected according to actual requirements to achieve the objectives of a solution in this embodiment.

In addition, functional units in embodiments of this application may be integrated into one processing unit, each of the units may physically exist alone, or two or more units are integrated into one unit. The foregoing integrated unit may be implemented in a form of a hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or a part contributing to the conventional technology, or all or some of the technical solutions may be represented in the form of a software product. The software product is stored in a storage medium and includes several instructions for enabling a device (which may be a single-chip microcomputer, a chip, or the like) or a processor (processor) to perform all or some of the steps of the methods described in the embodiments of this application. The foregoing storage medium includes medium that may store program code, such as a USB flash disk, a removable hard disk, a read only memory (read only memory, ROM), a random access memory (random access memory, RAM), a magnetic disk, or an optical disk.

The foregoing descriptions are merely specific implementations of this application, but the protection scope of this application is not limited thereto. Variation or replacement may readily be figured out by any person skilled in the art, within a technical scope disclosed in this application, shall fall within the protection scope of this application. Therefore, the protection scope of this application shall be subject to the protection scope of the claims.

What is claimed is:

1. A method for reading displayed content, applied to an electronic device, wherein the method comprises:

displaying a first user interface;

receiving a first operation of a user;

obtaining first content of the first user interface in response to the first operation;

displaying a second user interface, wherein content displayed in the second user interface comprises a text in the first content, and the second user interface covers a part of a display area of the first user interface; and reading a first sentence in the content in the second user interface, and displaying marking information of a text that is in the second user interface and that corresponds to the first sentence that is being read;

detecting a fourth operation of the user; and minimizing, in response to the fourth operation, the window corresponding to the second user interface, and continuing reading current text content without interruption; and after the minimizing the window corresponding to the second user interface, the method further comprises:

restoring the second user interface by using a card corresponding to a reading function, and displaying the currently read text content and a progress.

2. The method according to claim 1, wherein before the displaying a second user interface, the method further comprises:

recognizing one or more sentences for the obtained first content of the first user interface.

3. The method according to claim 2, wherein the method further comprises:

indexing the one or more recognized sentences, wherein the method further comprises:

the content displayed in the second user interface further comprises a player control, and the player control is capable of controlling a reading progress or a reading speed;

the player control comprises a progress bar, and the progress bar matches an index of the one or more sentences, and is used for control based on a granularity of the recognized sentence; and the player control comprises a move-down control, the move-down control is configured to control a current reading progress to switch to a next sentence; and/or the player control comprises a move-up control, and the move-up control is configured to control a current reading progress to switch to a previous sentence.

4. The method according to claim 2, wherein the method further comprises:

separately sending the one or more recognized sentences to a server for text-to-speech conversion processing;

receiving and buffering a voice obtained through processing by the server; and reading, in real time, the voice obtained through processing by the server, or sequentially buffering, based on the one or more recognized sentences, the voice obtained through processing by the server.

5. The method according to claim 4, wherein the method further comprises:

buffering, by the electronic device by using two queues, the voice obtained through processing by the server, wherein a first queue is used to buffer one or more voice packages of a sentence that is currently being processed by the server; and a second queue is used to buffer a voice corresponding to one or more sentences that have been processed by the server; and the reading a first sentence in the content in the second user interface comprises:

if a voice currently received from the server is a voice of the first sentence, obtaining, from the first queue, the voice corresponding to the first sentence for reading; or if a voice currently received from the server is not a voice of the first sentence, obtaining, from the second queue, the voice corresponding to the first sentence for reading.

6. The method according to claim 2, wherein before the displaying a second user interface, the method further comprises:

processing the obtained first content of the first user interface to remove non-text information to obtain the text in the first content; and displaying the processed text in the second user interface.

7. The method according to claim 6, wherein before the displaying a second user interface, the method further comprises:

performing sentence segmentation on the processed text based on a special punctuation mark, to obtain the one or more recognized sentences.

8. The method according to claim 1, wherein the method further comprises:

detecting a second operation of the user; and controlling, in response to the second operation based on a text location or text content corresponding to the second operation, the electronic device to read a second sentence corresponding to the second operation, or read from a location of the second sentence.

9. The method according to claim 8, wherein the method further comprises:

displaying marking information of a text that is in the second user interface and that corresponds to the second sentence that is being read.

10. The method according to claim 8, wherein the method further comprises:

when the second operation is a touch operation performed by the user on a text location corresponding to the second sentence displayed in the second user interface, determining, based on the detected touch operation, to obtain a voice corresponding to the second sentence, and reading the voice.

11. The method according to claim 10, wherein the method further comprises:

displaying the second user interface based on the one or more recognized sentences, wherein each of the one or more sentences displayed in the second user interface corresponds to one control; and the determining, based on the detected touch operation, to obtain a voice corresponding to the second sentence, and reading the voice specifically comprises:

triggering, based on the touch operation corresponding to the second operation, a control corresponding to the second sentence; and obtaining, in response to the control event, the voice of the second sentence corresponding to the control, and reading the voice.

12. The method according to claim 1, wherein the method further comprises:

detecting a third operation of the user; and adjusting, in response to the third operation, a size of a window corresponding to the second user interface.

13. The method according to claim 1, wherein the player control comprises a refresh control, and the method further comprises:

stopping, in response to the refresh control, reading the current text, and re-obtaining second content of the first user interface for reading.

14. The method according to claim 1, wherein the method further comprises:

controlling the reading progress or the reading speed in response to a voice instruction of the user.

15. The method according to claim 1, wherein the method further comprises:

detecting a fifth operation of the user; and displaying text content in the second user interface in a scrolling manner in response to the fifth operation of the user, and continuing reading the current text content without interruption.

16. An electronic device, comprising:

a screen, configured to display a user interface;

one or more processors; a memory containing computer instructions for execution by the one or more processors and which comprise one or more computer programs which, when executed by the processor cause the device to perform the steps of displaying a first user interface;

receiving a first operation of a user;

obtaining first content of the first user interface in response to the first operation;

displaying a second user interface, wherein content displayed in the second user interface comprises a text in the first content, and the second user interface covers a part of a display area of the first user interface; and reading a first sentence in the content in the second user interface, and displaying marking information of a text that is in the second user interface and that corresponds to the first sentence that is being read;

detecting a fourth operation of the user; and minimizing, in response to the fourth operation, the window corresponding to the second user interface, and continuing reading current text content without interruption; and after the minimizing the window corresponding to the second user interface, the device further performs the steps of: restoring the second user interface by using a card corresponding to a reading function, and displaying the currently read text content and a progress.

17. The electronic device according to claim 16, wherein before the displaying a second user interface, the device further performs the steps of: recognizing one or more sentences for the obtained first content of the first user interface.

18. The electronic device according to claim 16, further including instructions to cause the device to perform the steps of:

detecting a second operation of the user; and controlling, in response to the second operation based on a text location or text content corresponding to the second operation, the electronic device to read a second sentence corresponding to the second operation, or read from a location of the second sentence.

19. The electronic device according to claim 18, further including instructions to cause the device to perform the steps of: displaying marking information of a text that is in the second user interface and that corresponds to the second sentence that is being read.

20. A non-transitory computer readable storage medium, comprising computer instructions which, when executed by one or more processors of a device, cause the device to perform the steps of:

displaying a first user interface;

receiving a first operation of a user;

obtaining first content of the first user interface in response to the first operation;

displaying a second user interface, wherein content displayed in the second user interface comprises a text in the first content, and the second user interface covers a part of a display area of the first user interface; and reading a first sentence in the content in the second user interface, and displaying marking information of a text that is in the second user interface and that corresponds to the first sentence that is being read;

detecting a fourth operation of the user; and minimizing, in response to the fourth operation, the window corresponding to the second user interface, and continuing reading current text content without interruption; and after the minimizing the window corresponding to the second user interface, the method further comprises:

restoring the second user interface by using a card corresponding to a reading function, and displaying the currently read text content and a progress.

\* \* \* \* \*